(12) United States Patent
Kim et al.

(10) Patent No.: US 11,501,794 B1
(45) Date of Patent: Nov. 15, 2022

(54) MULTIMODAL SENTIMENT DETECTION

(71) Applicant: Amazon Technologies, Inc., Seattle, WA (US)

(72) Inventors: Yelin Kim, Sunnyvale, CA (US); Yang Liu, Los Altos, CA (US); Dilek Hakkani-tur, Los Altos, CA (US); Thomas Nelson, San Francisco, CA (US); Anna Chen Santos, Mountain View, CA (US); Joshua Levy, Cambridge, MA (US); Saurabh Gupta, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 228 days.

(21) Appl. No.: 16/875,425

(22) Filed: May 15, 2020

(51) Int. Cl.
| | |
|---|---|
| *G10L 25/63* | (2013.01) |
| *G10L 15/26* | (2006.01) |
| *G10L 15/18* | (2013.01) |
| *H04N 5/247* | (2006.01) |
| *H04N 5/232* | (2006.01) |
| *G05D 1/00* | (2006.01) |
| *G05D 1/02* | (2020.01) |
| *G06T 7/70* | (2017.01) |
| *G06V 20/10* | (2022.01) |
| *G06V 40/10* | (2022.01) |
| *G06V 40/16* | (2022.01) |

(52) U.S. Cl.
CPC ............ *G10L 25/63* (2013.01); *G05D 1/0088* (2013.01); *G05D 1/0251* (2013.01); *G06T 7/70* (2017.01); *G06V 20/10* (2022.01); *G06V 40/10* (2022.01); *G06V 40/161* (2022.01); *G10L 15/1815* (2013.01); *G10L 15/26* (2013.01); *H04N 5/23299* (2018.08); *H04N 5/247* (2013.01); *G06T 2207/30201* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 10,569,420 B1 * | 2/2020 | Cohen | B25J 13/084 |
| 11,276,399 B2 * | 3/2022 | Shin | B25J 13/003 |
| 2018/0286432 A1 * | 10/2018 | Shimada | G10L 15/24 |
| 2020/0114521 A1 * | 4/2020 | Mahoor | G10L 25/63 |
| 2020/0372906 A1 * | 11/2020 | Jang | H04L 12/282 |
| 2021/0049349 A1 * | 2/2021 | Farokhi | G06V 20/10 |

(Continued)

*Primary Examiner* — Stella L. Woo
(74) *Attorney, Agent, or Firm* — Pierce Atwood LLP

(57) ABSTRACT

Described herein is a system for improving sentiment detection and/or recognition using multiple inputs. For example, an autonomously motile device is configured to generate audio data and/or image data and perform sentiment detection processing. The device may process the audio data and the image data using a multimodal temporal attention model to generate sentiment data that estimates a sentiment score and/or a sentiment category. In some examples, the device may also process language data (e.g., lexical information) using the multimodal temporal attention model. The device can adjust its operations based on the sentiment data. For example, the device may improve an interaction with the user by estimating the user's current emotional state, or can change a position of the device and/or sensor(s) of the device relative to the user to improve an accuracy of the sentiment data.

20 Claims, 35 Drawing Sheets

(56) References Cited

U.S. PATENT DOCUMENTS

| | | | |
|---|---|---|---|
| 2021/0050011 A1* | 2/2021 | Sawata | B25J 13/003 |
| 2021/0294414 A1* | 9/2021 | Nomura | G05D 1/0223 |
| 2021/0394369 A1* | 12/2021 | Oh | A61B 5/0205 |

* cited by examiner

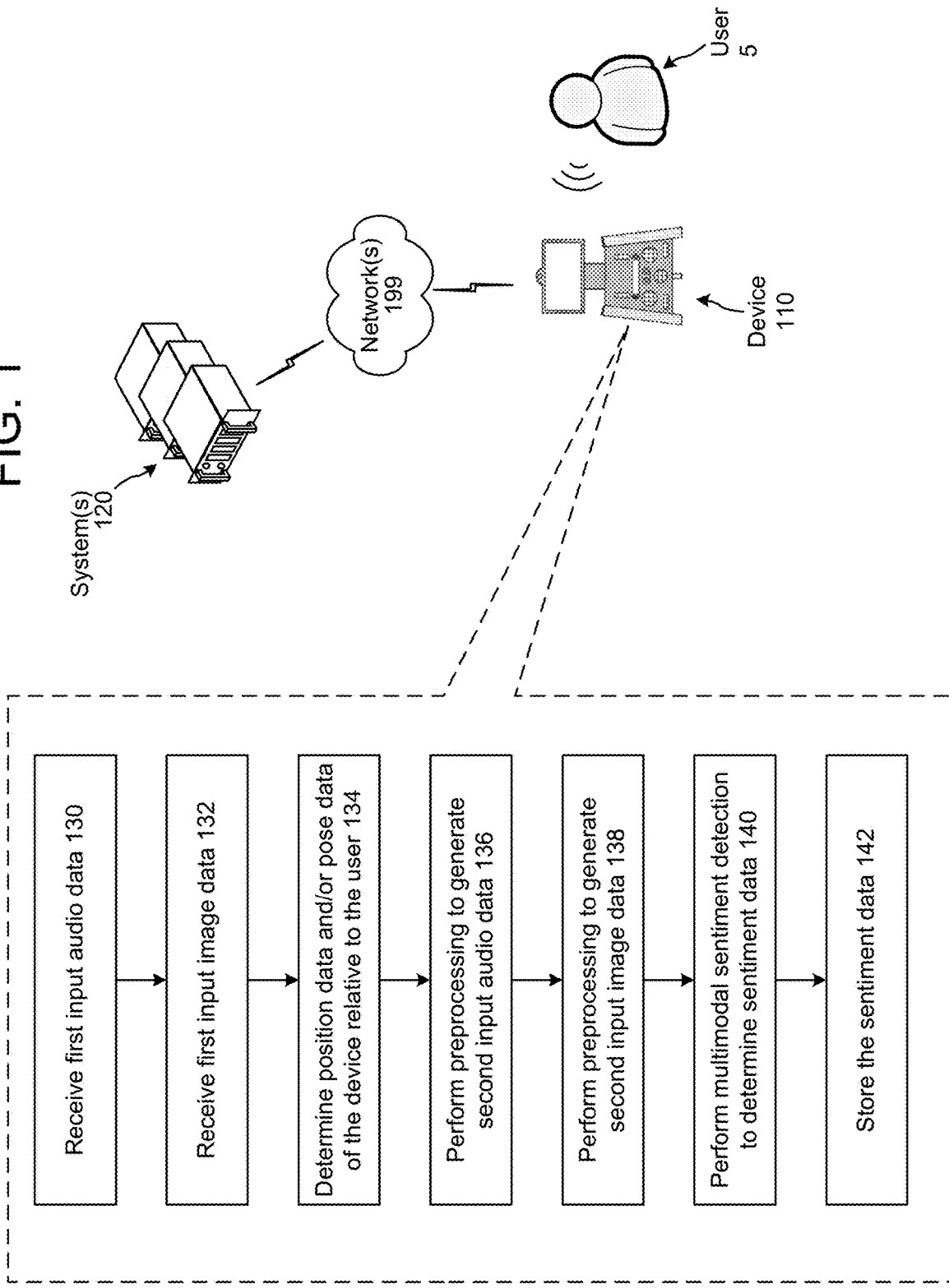

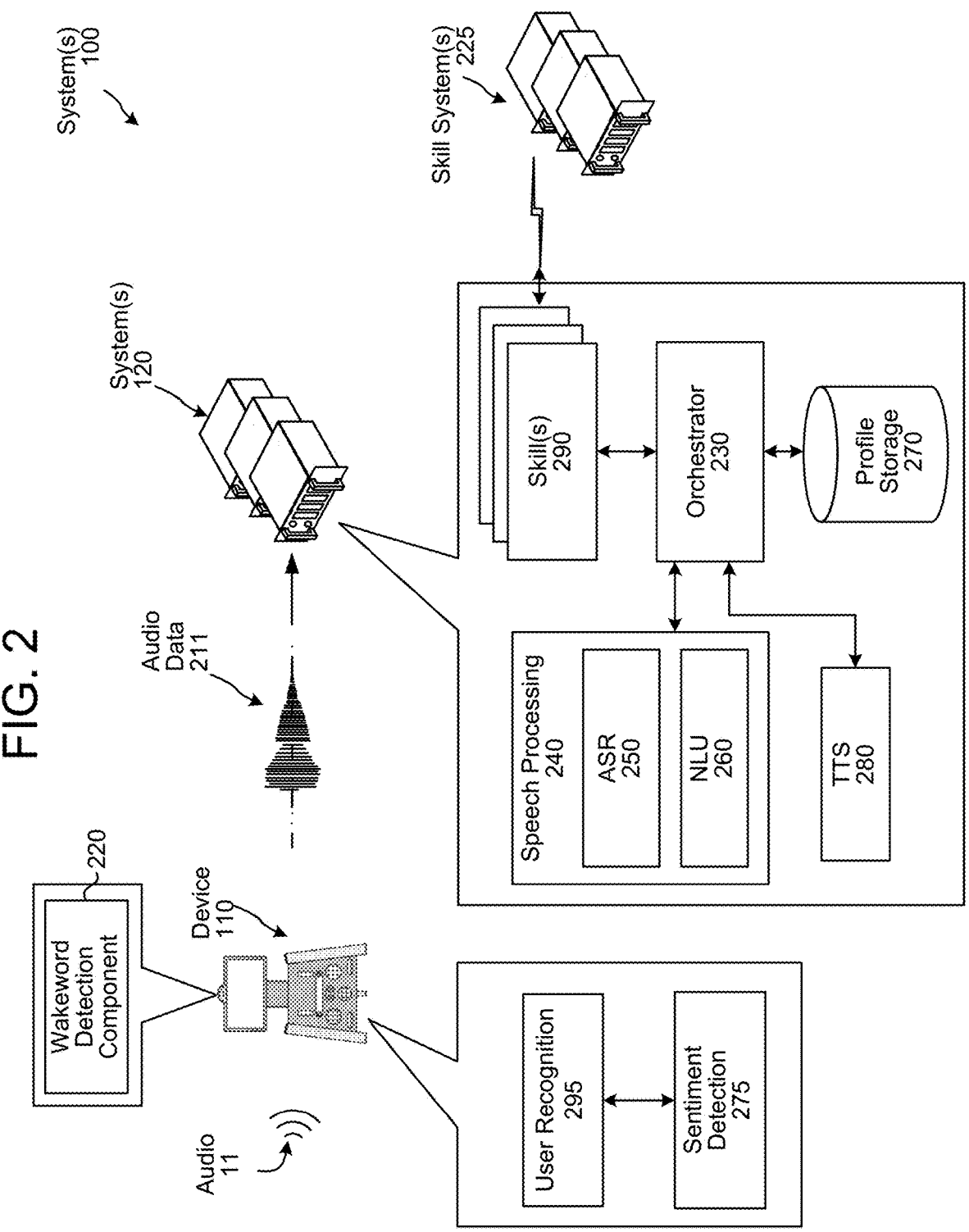

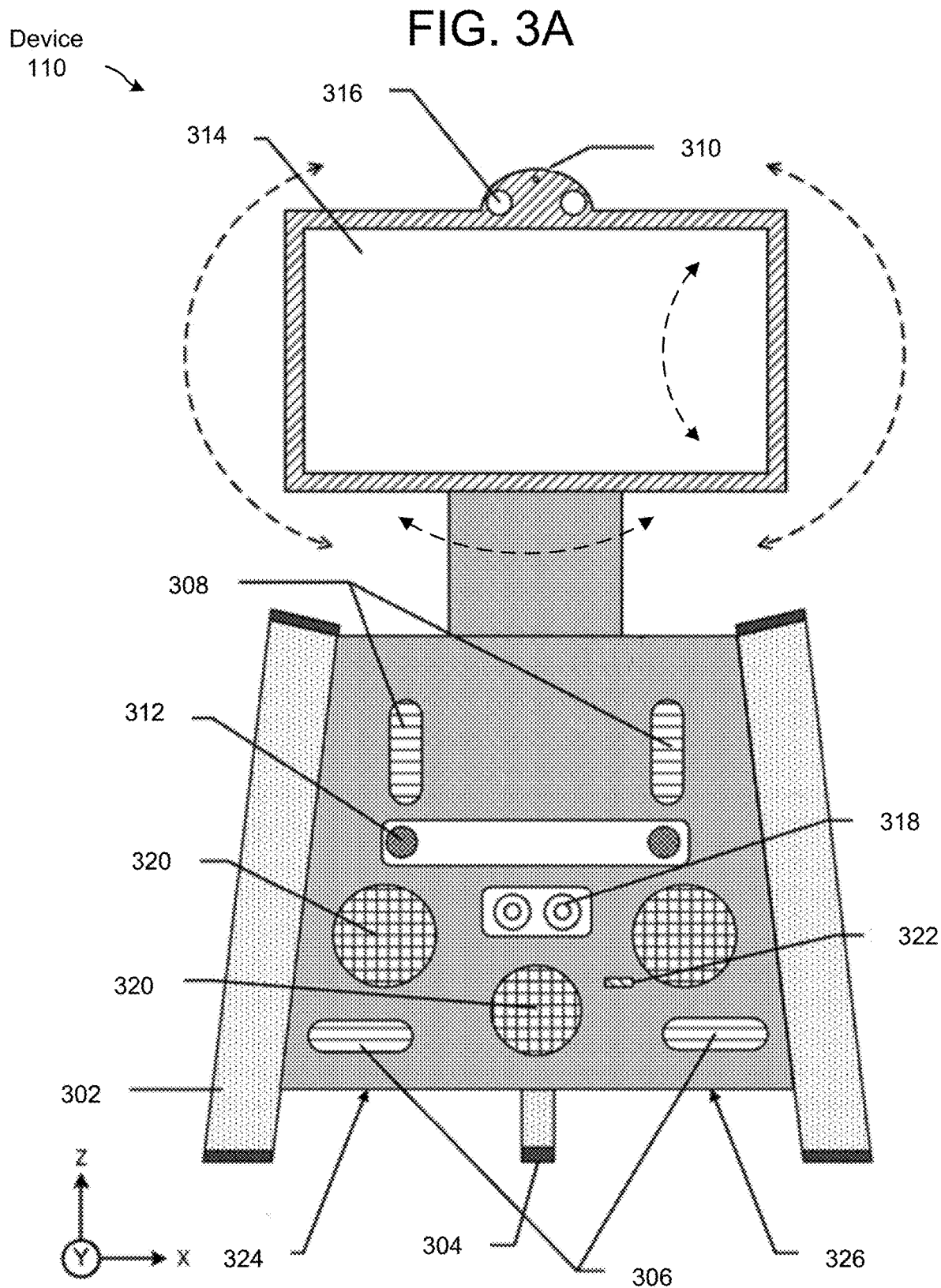

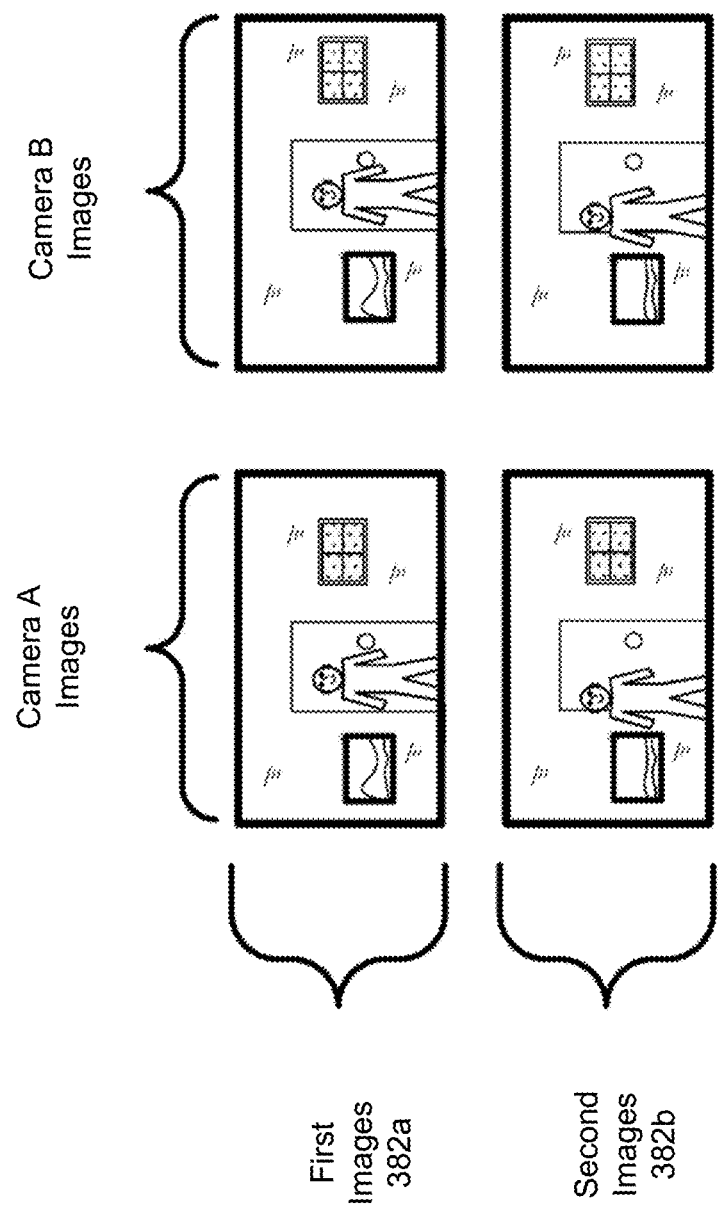

FIG. 4
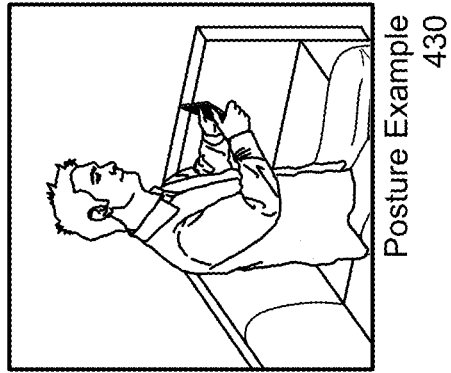
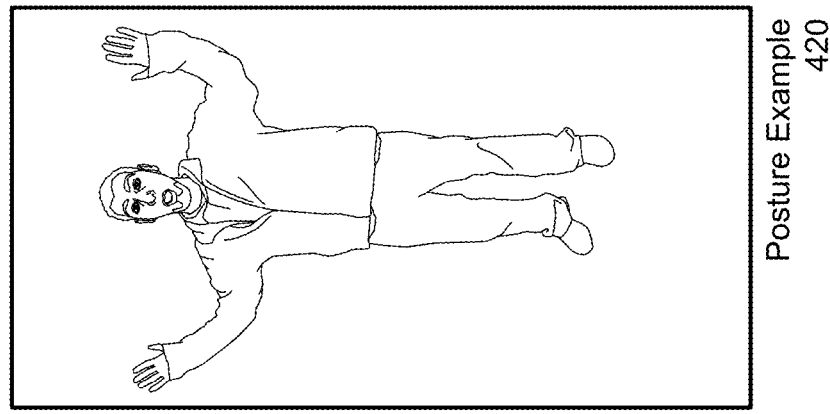
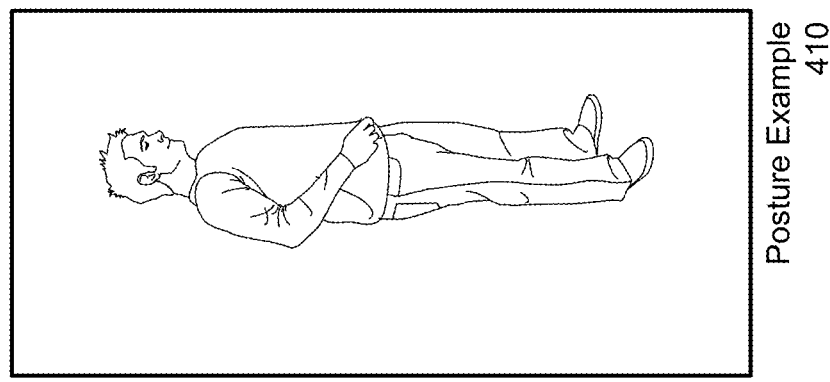

MULTIMODAL SENTIMENT DETECTION

BACKGROUND

Speech recognition systems have progressed to the point where humans can interact with computing devices using their voices. Such systems employ techniques to identify the words spoken by a human user based on the various qualities of a received audio input. The audio input may also indicate an emotion or sentiment of the user when speaking the words.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to perform sentiment detection according to embodiments of the present disclosure.

FIG. 2 is a conceptual diagram of speech processing components of a system according to embodiments of the present disclosure.

FIGS. 3A, 3B, and 3C illustrate views of an autonomously motile device according to embodiments of the present disclosure.

FIGS. 3E and 3F illustrate images captured by an autonomously motile device in an environment according to embodiments of the present disclosure.

FIG. 4 illustrates examples of the autonomous motile device determining posture data according to embodiments of the present disclosure.

DETAILED DESCRIPTION

Figure 3B:
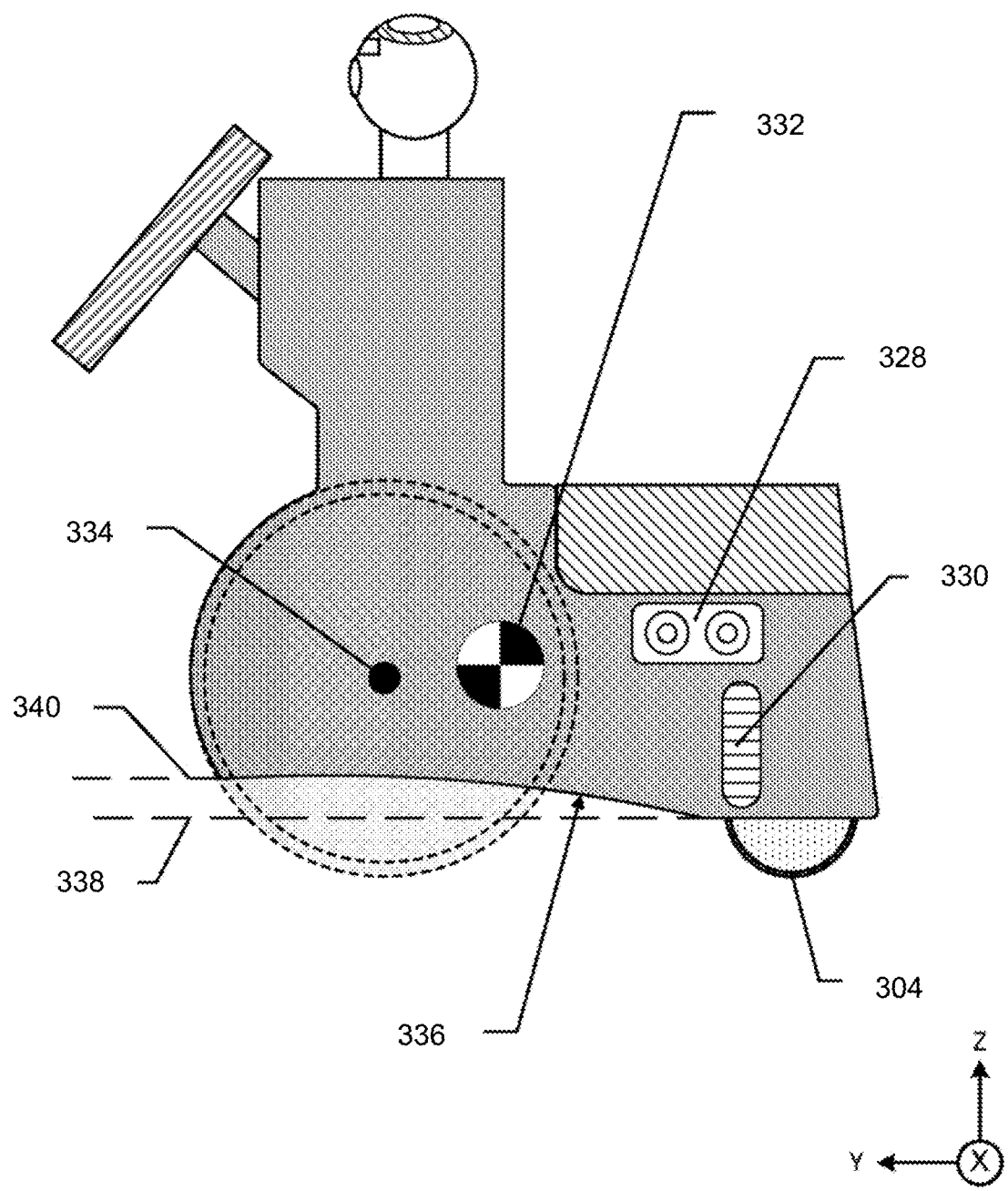

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

To improve an interaction with the user, the device may detect a sentiment (e.g., emotion) of a user while speaking to the system or to another person. Sentiment recognition can be an integral part of modern human computer interaction systems. Described herein is, among other things, new technology directed to performing cross-modal sentiment detection processing to estimate a sentiment of the user.

To improve sentiment detection, devices, systems and methods are disclosed that perform cross-modal or multi-modal sentiment detection using multiple inputs. For example, an autonomous motile device is configured to generate audio data and/or image data and perform sentiment recognition processing. The device may process the audio data and the image data using a multimodal temporal attention model to generate sentiment data that estimates a sentiment score and/or a sentiment category. In some examples, the device may also process language data (e.g., lexical information) using the multimodal temporal attention model. The device can adjust its operations based on the sentiment data. For example, the device may improve an interaction with the user by estimating the user's current emotional state. In some examples, the device may preprocess the input data, change a position of the device relative to the user (e.g., move the device from a first location to a second location that is closer to the user), change a position of sensors relative to the device and/or user (e.g., move the sensors from a first position to a second position, such as rotating a camera), and/or the like to improve an accuracy of the sentiment data.

FIG. 1 illustrates a system configured to perform sentiment detection according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user 5, and one or more system(s) 120 connected across one or more network(s) 199. In some examples, the system(s) 120 may be associated with a first location that is remote from a second location associated with the device 110. Thus, the device 110 may communicate with the system(s) 120 using a plurality of different networks. However, the disclosure is not limited thereto and in some examples, the system(s) 120 may be associated with the second location in proximity to the device 110 without departing from the disclosure. For example, the system(s) 120 may correspond to a home server and the device 110 may communicate with the system(s) 120 using a single local area network (LAN) or wireless local area network (WLAN). The operations are generally described herein as being performed by the device 110. However, it should be understood that one or more of the operations may also be performed by the system(s) 120.

As illustrated in FIG. 1, a device 110 (e.g., motile device, autonomously motile device, etc.) may be associated with a user 5 and may communicate with system(s) 120 using one or more network(s) 199. The user 5 may interact with the device 110, such as requesting that the device 110 and/or the system(s) 120 perform an action. Additionally or alternatively, the device 110 may interact with the user 5, such as following the user 5 and/or moving sensors 114 relative to the user 5 to improve input data generated by the sensors 114.

In some examples, the device 110 may be a speech-enabled device and may detect audio 11 spoken by the user 5. The device 110 may determine that the audio 11 includes a wakeword and may then send audio data corresponding to the audio 11 to the system(s) 120. The system(s) 120 may receive the audio data from the device 110 and process the audio data, for example using speech processing such as automatic speech recognition (ASR) processing, natural language understanding (NLU) processing, and/or the like, to determine that the audio data represents a request to perform an action. The system(s) 120 may perform the action and/or send a command to another device (not illustrated) to perform the action. Additionally or alternatively, the user 5 may provide input data other than audio data without departing from the disclosure. Although FIG. 1 illustrates a single example of a device 110, many other devices may be used without departing from the disclosure, such as a smartphone, television, computer, appliance, or other device depending on system configuration.

As the device 110 is motile (e.g., capable of motion), the device 110 may perform the action by moving towards the user 5, relative to the user 5, and/or the like without departing from the disclosure. For example, the device 110 may be at a first location and may move to a location of the user 5 to perform the action for the user 5.

In addition to moving in response to a voice command from the user 5, in some examples the device 110 may move relative to the user 5 to improve an interaction with the user 5. For example, the device 110 may determine that the user 5 is upset and may move out of a path of the user 5 and/or away from the user 5. Additionally or alternatively, the device 110 may determine that input data satisfies a condition and may move the device 110 and/or sensors of the device 110 to improve a quality of the input data. For example, the device 110 may move closer to the user 5 to improve sentiment detection processing by improving input data corresponding to the user 5.

As illustrated in FIG. 1, the device 110 may be a motile device (e.g., autonomously motile device) capable of moving within the environment independently of the user without departing from the disclosure. In some examples, the device 110 may determine a location of the device 110 and/or the user 5 using sensor data (e.g., location sensor data, such as Global Positioning System (GPS) data), wireless signals (e.g., (Ultra)-Sound signals, Bluetooth, etc.), wireless network data (e.g., wireless communication networks in range, such as WiFi, Long Term Evolution (LTE) network, WiMAX network, 3G network, 4G network, 5G network, etc.), audio processing (e.g., beamforming relative to other devices), image processing (e.g., object recognition and/or the like), and/or a combination thereof without departing from the disclosure.

Additionally or alternatively, the device 110 may determine a location of the user relative to the device 110 by remotely sensing (e.g., directly observing) the user using various techniques known to one of skill in the art, including sound localization (e.g., audio beamforming), audio processing (e.g., speech recognition), image processing (e.g., facial recognition, object recognition, and/or the like), sensor data (e.g., sensors configured to detect human presence, measure distance(s), and/or the like), and/or the like without departing from the disclosure. While in some examples the system 100 may track a location of the user using tracking data associated with a mobile device (e.g., smartphone and/or wearable device associated with the user), the tracking data is not an example of remotely sensing the user and is not considered observation data.

As shown in FIG. 1, the device 110 may receive (130) first input audio data corresponding to a user 5. For example, the device 110 may capture the first input audio data using a microphone and the first input audio data may include speech or sounds from the user 5 and/or speech and sounds from at least one other person. The device 110 may also receive (132) first input image data representing a portion of the user 5 and/or an environment of the device 110. For example, the device 110 may capture the first input image data using one or more cameras and the first input image data may include a representation of the user 5.

The device 110 may determine (134) position data and/or pose data of the device 110 relative to the user 5. For example, the position data may indicate a current position of the device 110 relative to the user 5, whereas the pose data may indicate a current position of one or more sensors (e.g., the camera(s)) relative to the device 110 and/or the user 5.

The position data may indicate the current position of the device 110 using multiple techniques known to one of skill in the art. In some examples, the position data may indicate a relative position of the device 110 with respect to the user 5. For example, the position data may indicate a direction of the user 5 relative to a fixed origin of the device 110 (e.g., front of the device 110) as well as a distance from the device 110 to the user 5. However, the disclosure is not limited thereto, and in other examples the position data may indicate a location of the device 110. For example, the position data may include coordinates of the device 110 within an environment (e.g., coordinates within an individual room, coordinates within a building, etc.), may include absolute coordinates (e.g., global positioning system (GPS) coordinates), and/or the like. Thus, the device 110 may generate position data identifying the position of the device 110 relative to the user 5, a location of the device 110 in the environment, an exact location of the device 110, and/or the like without departing from the disclosure.

In some examples, the pose data may indicate the current position of a sensor relative to a fixed origin or point of reference on the device 110, such as the wheels, chassis, a point on top of the device 110, and/or the like. For example, the pose data may indicate coordinates of the sensor relative to a fixed position on the device 110 (e.g., center point between the two front wheels) using a three dimensional coordinate system. In other examples, the pose data may indicate the current position of the sensor relative to the device 110 using other techniques known to one of skill in the art, such as a height of the sensor, a length of extension associated with the sensor, and/or the like. For example, the camera may extend from a first position (e.g., retracted) to a second position (e.g., extended) and the pose data may indicate an amount of extension ranging from the first position to the second position. Similarly, the camera may rotate from a first position (e.g., first azimuth, such as 90 degrees to the left) to a second position (e.g., second azimuth, such as 90 degrees to the right). In some examples, the camera may rotate in 360 degrees, and the pose data may indicate a current azimuth associated with the camera without departing from the disclosure. The current azimuth may be determined relative to the fixed position on the device 110 (e.g., center point between the two front wheels), as described above, although the disclosure is not limited thereto. Additionally or alternatively, the pose data may indicate the current position of the sensor relative to the user 5. For example, the pose data may indicate a current perspective of the user 5, a distance to the user 5, and/or the like without departing from the disclosure.

Using the position data and/or the pose data, the device 110 may perform (136) first preprocessing to generate second input audio data from the first input audio data. For example, the device 110 may perform normalization or other audio processing to modify a volume level of the second input audio data relative to the first input audio data. Additionally or alternatively, the device 110 may modify the first input audio data based on a location of the device 110, room characteristics associated with a room in which the device 110 is located (e.g., room characteristic data corresponding to acoustics associated with the location), and/or the like without departing from the disclosure.

In some examples, the device 110 may perform (138) second preprocessing to generate second input image data from the first input image data. For example, the device 110 may modify a perspective of the second input image data relative to the first input image data and/or perform other transformations. Thus, the device 110 may compensate for distortion, nonlinearities, and/or unique perspective that are associated with the first input image data to improve sentiment detection processing.

The device 110 may perform (140) multimodal sentiment detection to determine sentiment data associated with the user 5. For example, the device 110 may estimate a sentiment score and/or sentiment category (e.g., emotion) of the user 5 based on the second input audio data, the second input image data, and/or the like. In some examples, the device 110 and/or the system(s) 120 may perform speech processing on the second input audio data to generate text data or other lexical information and the device 110 may perform the multimodal sentiment detection using the text data, although the disclosure is not limited thereto.

The device 110 may determine sentiment data corresponding to the second input audio data and/or the second input image data. The sentiment data may include one or more sentiment scores indicating a sentiment category (e.g., emotion category). In some examples, the sentiment categories may include positive, neutral, and negative. The disclosure is not limited thereto, however, and in other examples the sentiment categories may include angry, sad, happy, surprised, and/or disgust without departing from the disclosure. Additionally or alternatively, the sentiment data may include one or more sentiment scores indicating an amount of negative, neutral, or positive sentiment corresponding to the second input audio data and/or the second input image data.

The overall system of the present disclosure may operate using various components as illustrated below. The various components may be located on same or different physical devices. Communication between various components may occur directly or across a network(s) 199.

As shown in FIG. 2, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120. In some embodiments, the device 110 may begin transmitting audio data 211 to system(s) 120 (or otherwise performing further processing on audio data) in response to an event occurring or an event being detected by the device 110.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 may perform speech processing to generate speech processing output data, which may be referred to as lexical data. In some examples, the lexical data may correspond to text data that includes text representing speech contained in the input audio data 211. However, the disclosure is not limited thereto and the lexical data may also correspond to token data that includes tokens that represent sounds, words, phrases, and/or the like corresponding to the speech. Thus, the lexical data may correspond to text data, token data, and/or other data known to one of skill in the art without departing from the disclosure. For ease of illustration, the disclosure may refer to the lexical data (e.g., speech processing output data) as text data, although the disclosure is not limited thereto.

To illustrate an example, the ASR component 250 may transcribe the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., lexical data, text data, etc.) and attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

The functionality described herein as a skill or skill component may be referred to using many different terms, such as an action, bot, app, application, speechlet or the like. A skill 290 may include hardware, software, firmware, or the like that may be dedicated to the particular skill 290 or shared among different skills 290. A skill 290 may be part of the system(s) 120 (as illustrated in FIG. 2) or may be located at whole (or in part) with one or more separate systems. Unless expressly stated otherwise, reference to a skill, skill device, or skill component may include a skill component operating within the system(s) 120 (for example as skill 290) and/or skill component operating within a system separate from the system(s) 120.

A skill 290 may be configured to perform one or more actions. A skill 290 may be enabled to execute specific functionality in order to provide data or produce some other output requested by a user. A particular skill component may be configured to execute more than one skill. For example, a weather skill may involve a weather skill component providing weather information to the system(s) 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, gaming skills, as well as custom skills that are not associated with any pre-configured type of skill.

In addition or alternatively to being implemented by the system(s) 120, a skill 290 may be implemented by a skill system(s) 225. Such may enable a skill system(s) 225 to execute specific functionality in order to provide data or perform some other action requested by a user.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110, the system(s) 120, and/or the skill system 225 may include profile storage 270 without departing from the disclosure. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like. The sentiment detection component 275 may be a separate component, as illustrated in FIG. 2, although the disclosure is not limited thereto and the sentiment detection component 275 may be included in other components without departing from the disclosure. The sentiment detection component 275 and other components are generally described as being operated by the device 110, as illustrated in FIG. 2. However, the system(s) 120 may also operate one or more of the components, including the sentiment detection component 275, without departing from the disclosure.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 6:
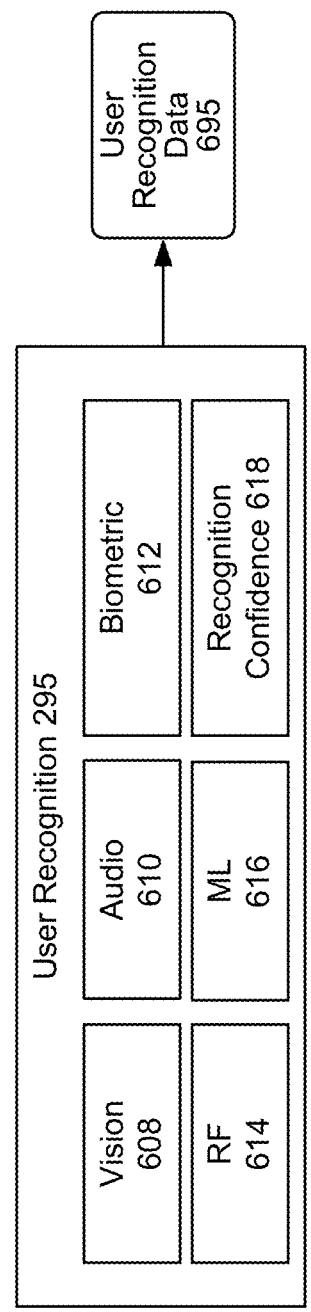
FIG. 6 is a schematic diagram of an illustrative architecture in which sensor data is combined to recognize one or more users according to embodiments of the present disclosure.

The device 110 may include a user recognition component 295 that recognizes one or more users using a variety of data, as described in greater detail below with regard to FIGS. 6-7. However, the disclosure is not limited thereto, and the system(s) 120 may include a user recognition component 295 instead of and/or in addition to the device 110 without departing from the disclosure.

While FIG. 2 illustrates the system(s) 120 including a speech processing component 240, the disclosure is not limited thereto and in some examples the device 110 may include a speech processing component 240 without departing from the disclosure. For example, the device 110 may perform basic speech processing locally, while the system(s) 120 may perform full speech processing remotely. However, the disclosure is not limited thereto and the device 110 may perform full speech processing locally without departing from the disclosure. As described above, the system(s) 120 may be located at a first location associated with the device 110 and/or a second location that is not associated with the device 110 without departing from the disclosure. For example, the system(s) 120 may be a home server or other device connected to the device 110 via a local area network (LAN) without departing from the disclosure. Thus, performing speech processing remotely refers to any speech processing that is not performed by the device 110, even if the speech processing is performed by a device/server in close proximity to the device 110.

Additionally or alternatively, one of skill in the art would understand that the speech processing component 240 may include a spoken language understanding (SLU) component, in addition to and/or instead of the ASR component 250 and/or the NLU component 260, without departing from the disclosure.

FIG. 3A illustrates a front view of the autonomously motile device 110 according to various embodiments of the present disclosure. The device 110 includes wheels 302 that are disposed on left and right sides of the device 110. The wheels 302 may be canted inwards toward an upper structure of the device 110. In other embodiments, however, the wheels 302 may be mounted vertically (e.g., not canted). A caster 304 (e.g., a smaller wheel) may disposed along a midline of the device 110. The front section of the device 110 may include a variety of external sensors. A first set of optical sensors 306, for example, may be disposed along the lower portion of the front of the device 110, and a second set of optical sensors 308 may be disposed along an upper portion of the front of the device 110. A microphone array 310 may be disposed on a top surface of the device 110; the microphone array 310 may, however, be disposed on any surface of the device 110.

One or more cameras 312 may be mounted to the front of the device 110; two cameras 312a/312b, for example, may be used to provide for stereo vision. The distance between the two cameras 312 may be, for example, 5-15 centimeters; in some embodiments, the distance is 10 centimeters. In some embodiments, the cameras 312 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

The cameras 312, which may be used for navigation, may be of different resolution from, or sensitive to different wavelengths than, other cameras used for other purposes, such as video communication. For example, the navigation cameras 312 may be sensitive to infrared light allowing the device 110 to operate in darkness or semi-darkness, while a camera 316 mounted above a display 314 may be sensitive to visible light and may be used to generate images suitable for viewing by a person. A navigation camera 312 may have a resolution of at least 300 kilopixels each, while the camera 316 mounted above the display 314 may have a resolution of at least 10 megapixels. In other implementations, navigation may utilize a single camera.

The cameras 312 may operate to provide stereo images of the environment, the user, or other objects. For example, an image from the camera 316 disposed above the display 314 may be accessed and used to generate stereo-image data corresponding to a face of a user. This stereo-image data may then be used for facial recognition, posture recognition, user identification, gesture recognition, gaze tracking, and other uses. In some implementations, a single camera 316 may be disposed above the display 314.

The display 314 may be mounted on a movable mount. The movable mount may allow the display to move along one or more degrees of freedom. For example, the display 314 may tilt, pan, change elevation, and/or rotate. In some embodiments, the display 314 may be approximately 20 centimeters as measured diagonally from one corner to another. An ultrasonic sensor 318 may be mounted on the front of the device 110 and may be used to provide sensor data that is indicative of objects in front of the device 110.

One or more loudspeakers 320 may be mounted on the device 110, and the loudspeakers 320 may have different audio properties. For example, low-range, mid-range, and/or high-range loudspeakers 320 may be mounted on the front of the device 110. The loudspeakers 320 may be used to provide audible output such as alerts, music, human speech such as during a communication session with another user, and so forth.

Other output devices 322, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 324, 326 may be disposed on the underside of the device 110. The floor optical-motion sensors 324, 326 may provide indication indicative of motion of the device 110 relative to the floor or other surface underneath the device 110. In some embodiments, the floor optical-motion sensors 324, 326 comprise a light source, such as light-emitting diode (LED) and/or an array of photodiodes. In some implementations, the floor optical-motion sensors 324, 326 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 324, 326 may provide other information, such as data indicative of a pattern present on the floor, composition of the floor, color of the floor, and so forth. For example, the floor optical-motion sensors 324, 326 may utilize an optoelectronic sensor that may detect different colors or shades of gray, and this data may be used to generate floor characterization data.

FIG. 3B illustrates a side view of the device 110 according to various embodiments of the present disclosure. In this side view, the left side of the device 110 is illustrated. An ultrasonic sensor 328 and an optical sensor 330 may be disposed on either side of the device 110.

The disposition of components of the device 110 may be arranged such that a center of gravity 332 is located between a wheel axle 334 of the front wheels 302 and the caster 304. Such placement of the center of gravity 332 may result in improved stability of the device 110 and may also facilitate lifting by a carrying handle.

In this illustration, the caster 304 is shown in a trailing configuration, in which the caster 304 is located behind or aft of the wheel axle 334 and the center of gravity 332. In another implementation (not shown) the caster 304 may be in front of the axle of the wheels 302. For example, the caster 304 may be a leading caster 304 positioned forward of the center of gravity 332.

The device 110 may encounter a variety of different floor surfaces and transitions between different floor surfaces during the course of its operation. A contoured underbody 336 may transition from a first height 338 at the front of the device 110 to a second height 340 that is proximate to the caster 304. This curvature may provide a ramp effect such that, if the device 110 encounters an obstacle that is below the first height 338, the contoured underbody 336 helps direct the device 110 over the obstacle without lifting the driving wheels 302 from the floor.

Figure 3C:
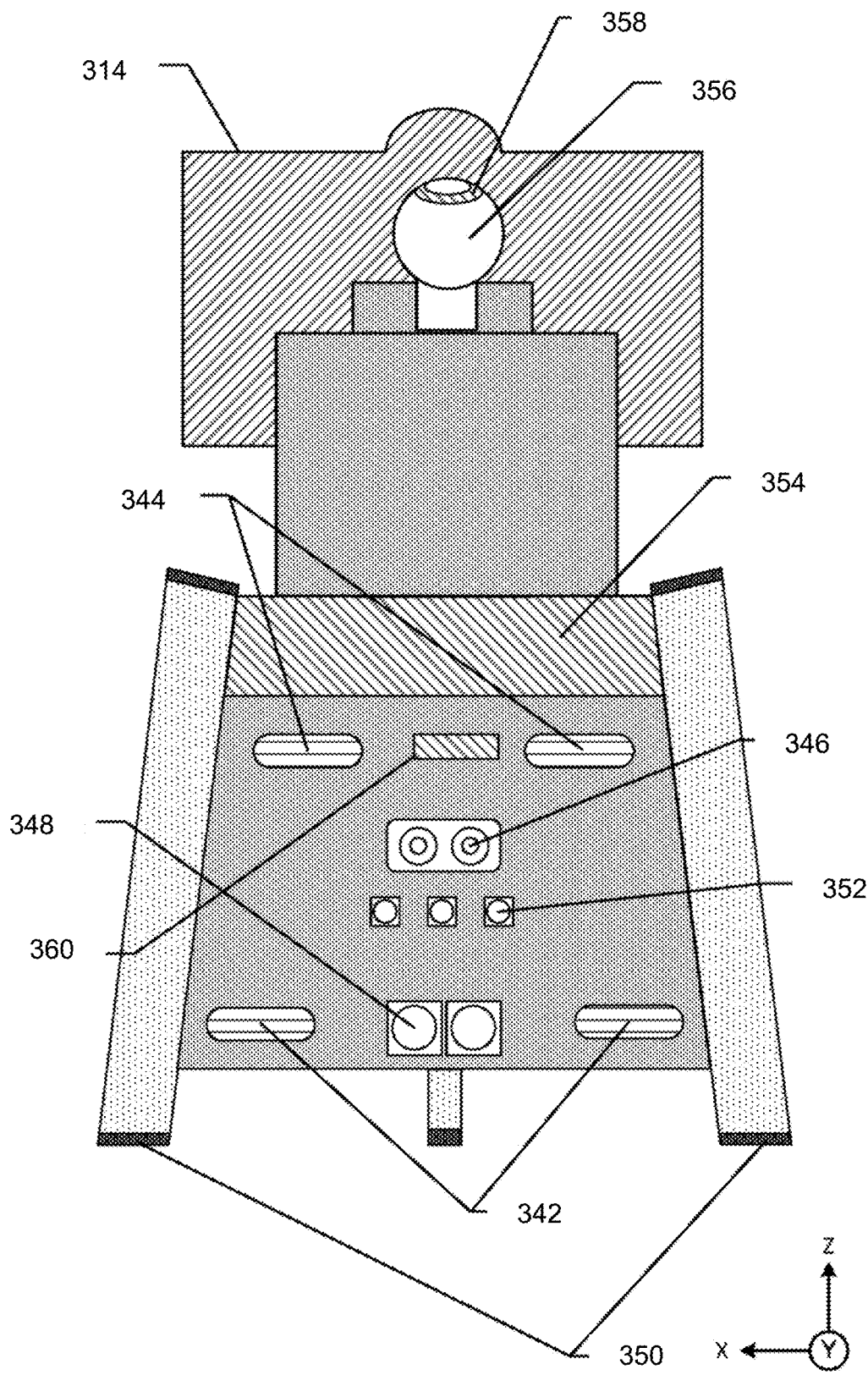

FIG. 3C illustrates a rear view of the device 110 according to various embodiments of the present disclosure. In this view, as with the front view, a first pair of optical sensors 342 may be located along the lower edge of the rear of the device 110, while a second pair of optical sensors 344 are located along an upper portion of the rear of the device 110. An ultrasonic sensor 346 may provide proximity detection for objects that are behind the device 110.

Charging contacts 348 may be provided on the rear of the device 110. The charging contacts 348 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 302 may include an electrically conductive portion 350 and provide an electrical conductive pathway between the device 110 and a charging source disposed on the floor. One or more data contacts 352 may be arranged along the back of the device 110. The data contacts 352 may be configured to establish contact with corresponding base data contacts within the docking station. The data contacts 352 may provide optical, electrical, or other connections suitable for the transfer of data.

Other output devices 360, such as one or more lights, may be disposed on an exterior of the back of the device 110. For example, a brake light may be arranged on the back surface of the device 110 to provide users an indication that the device 110 is slowing or stopping.

The device 110 may include a modular payload bay 354. In some embodiments, the modular payload bay 354 is located within the lower structure. The modular payload bay 354 may provide mechanical and/or electrical connectivity with the device 110. For example, the modular payload bay 354 may include one or more engagement features such as slots, cams, ridges, magnets, bolts, and so forth that are used to mechanically secure an accessory within the modular payload bay 354. In some embodiments, the modular payload bay 354 includes walls within which the accessory may sit. In other embodiments, the modular payload bay 354 may include other mechanical engagement features such as slots into which the accessory may be slid and engage. The device 110 may further include a mast 356, which may include a light 358.

Figure 3D:
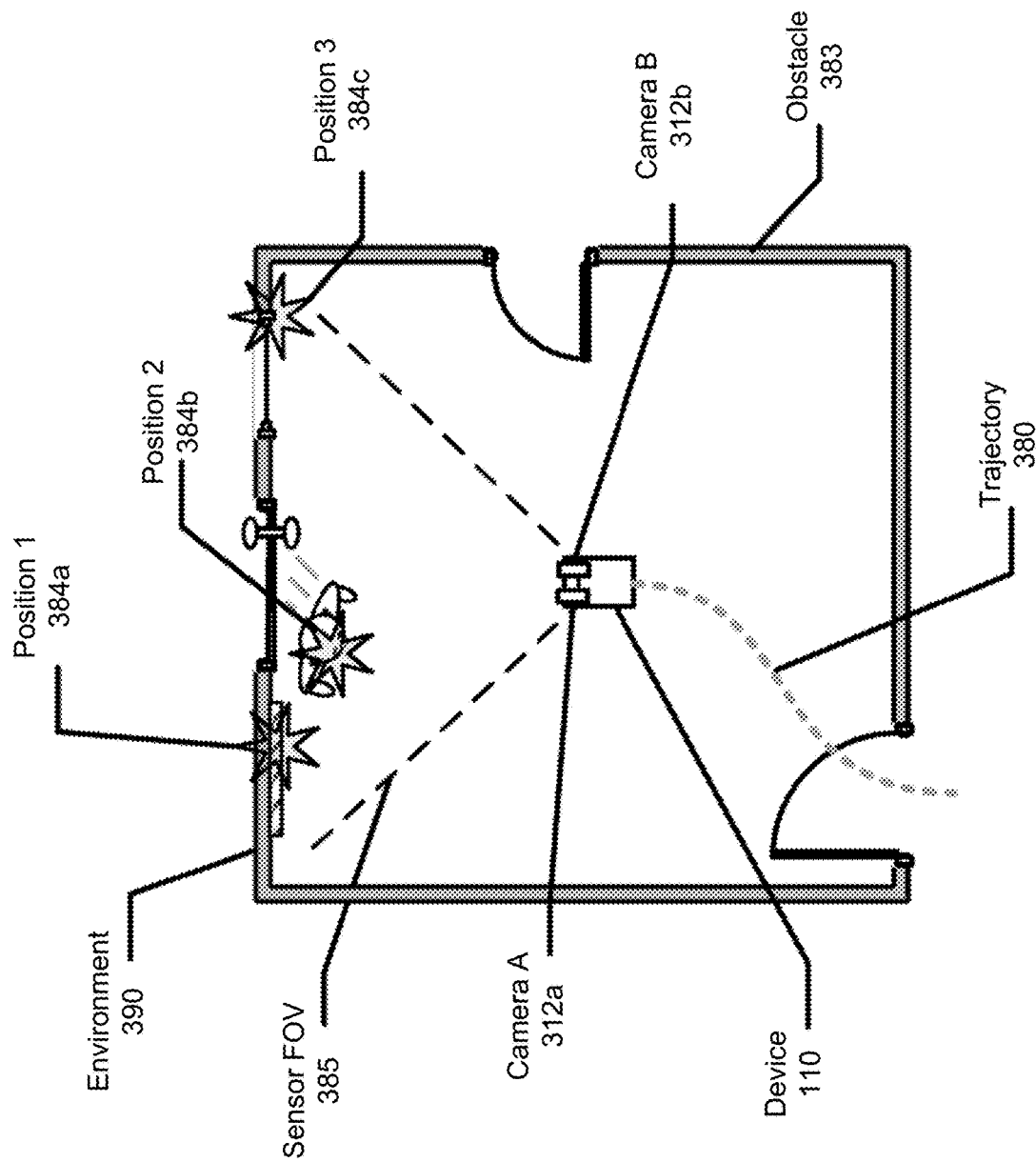
FIG. 3D illustrates a view of an autonomously motile device in an environment according to embodiments of the present disclosure.

FIG. 3D illustrates a view of a motile device in an environment according to embodiments of the present disclosure. As shown in FIG. 3D, the motile device 110 may move in the environment 390. The motion of the motile device 110 may be described as a trajectory 380, as shown in FIG. 3D. In some implementations, the trajectory 380 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the motile device 110 to move from one location in the environment 390 to another. For example, a motor may be used to drive a wheel attached to a chassis of the motile device 110, which causes the motile device 110 to move. The motile device 110 may turn, move forward, move backward, and so forth. In another example, actuators may move legs allowing the motile device 110 to walk.

The motile device 110 may include one or more sensors 114. For example, the sensors 114 may include a first camera 312a, a second camera 312b, an inertial measurement unit (IMU), microphones, time-of-flight (TOF) sensors, and so forth. The first camera 312a and the second camera 312b may be mounted to a common rigid structure that maintains a relative distance between the cameras 312a, 312b. An IMU may be attached to this common rigid structure, or one of the cameras affixed thereto. The first camera 312a and the second camera 312b may be arranged such that a sensor field-of-view 385 of the first camera 312a overlaps at least in part a sensor field-of-view of the second camera 312b.

The sensors 114 may generate sensor data (which may be stored in storage). The sensor data may include audio data acquired by one or more microphones and/or image data acquired by the first camera 312a and/or the second camera 312b. As illustrated in FIG. 3E, a pair of images 382 may comprise image data from the first camera 312a and the second camera 312b that are acquired at the same time. For example, a first pair of images 382a may be acquired at time t 1 and a second pair of images 382b may be acquired at time t 2. Some or all of the image data and/or audio data may be sent to the user device 110 for output thereon, although the disclosure is not limited thereto.

During operation the motile device 110 may determine input data. The input data may include or be based at least in part on sensor data from the sensors 114 onboard the motile device 110. In one implementation, a speech processing component (which may include speech-processing component(s) illustrated in FIG. 2) may process raw audio data obtained by a microphone on the motile device 110 and produce input data. For example, the user may say "Echo, come here" which may produce input data "come here". In another implementation, the input data may comprise information such as a command provided by another computing device, such as a smartphone or tablet computer.

A mapping component may determine a representation of the environment 390 that includes the obstacles 383 and their location in the environment 390. During operation the mapping component uses the sensor data from various sensors 114 to determine information such as where the motile device 110 is, how far the motile device 110 has moved, the presence of obstacles 383, where those obstacles 383 are, where a user is located (in conjunction with user recognition component 295), and so forth.

Figure 3F:
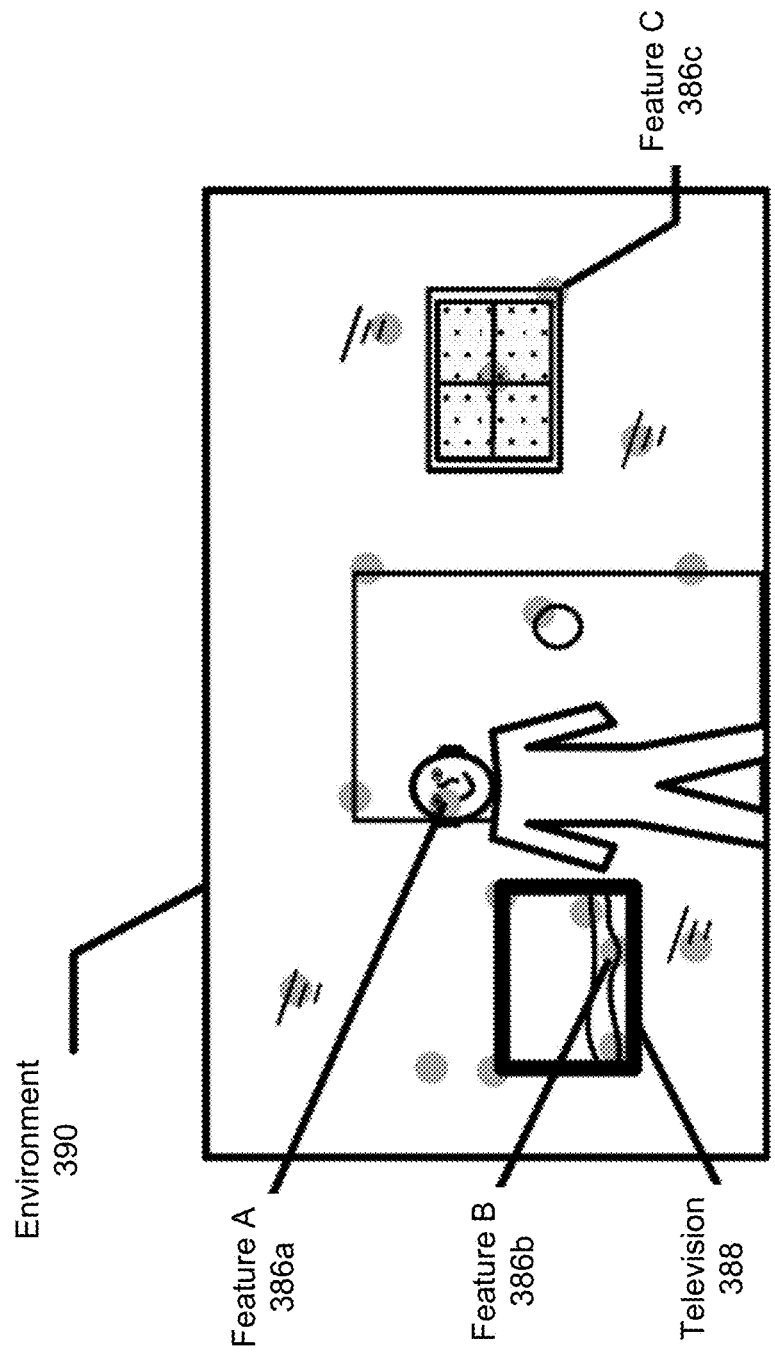

A feature module processes at least a portion of the image data to determine first feature data. The first feature data is indicative of one or more features 386 that are depicted in the image data. For example, as shown in FIG. 3F, the features 386 may be edges of doors, shadows on the wall, texture on the walls, portions of artwork in the environment 390, and so forth. The environment 390 may include display devices that are capable of changing the images they portray. For example, a television 388 may be presented in the environment 390. The picture presented by the television 388 may also have features 386.

Various techniques may be used to determine the presence of features 386 in image data. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 386 in the image data. A feature 386 that has been detected may have an associated descriptor that characterizes that feature 386. The descriptor may comprise a vector value in some implementations. For example, the descriptor may comprise data indicative of the feature with respect to 256 different dimensions.

The first feature data may comprise information such the descriptor for the feature 386, the images that the feature 386 was detected in, location in the image data of the feature 386, and so forth. For example, the first feature data may indicate that in a first image the feature 386 is centered at row 994, column 312 in the first image. These data and operations, along with those discussed below, may be used by the motile device 110, and/or other devices, to perform the operations described herein.

As humans express themselves using nonverbal communication (e.g., body language), it may be beneficial for the device 110 to analyze features associated with the user 5 and potentially interpret a posture (e.g., pose) of the user 5. To illustrate an example, the device 110 may distinguish between a relaxed posture (e.g., user 5 is standing in place, sitting on a couch, etc.) and an animated posture (e.g., user 5 is gesticulating or making other movements) and interpret input commands based on the current posture. For example, if the device 110 detects the animated posture, the device 110 may respond more quickly, switch from a first action to a second action (e.g., determine that the first action did not correspond to the desired command), and/or the like, although the disclosure is not limited thereto.

FIG. 4 illustrates examples of the autonomous motile device determining posture data according to embodiments of the present disclosure. In some examples, the device 110 may analyze a current posture of the user 5 to generate posture data indicating the current posture and may use this posture data as part of performing sentiment detection. As illustrated in FIG. 4, a first posture example 410 illustrates an example of the user 5 in a first posture or pose (e.g., standing upright), a second posture example 420 illustrates an example of the user 5 in a second posture (e.g., gesticulating or animated), and a third posture example 430 illustrates an example of the user 5 in a third posture (e.g., seated on a couch).

The device 110 may capture image data representing the user 5 and may process the image data to generate the posture data. For example, the device 110 may process the first posture example 410 to generate first posture data indicating that the user 5 is standing upright, may process the second posture example 420 to generate second posture data indicating that the user 5 is animated (e.g., gesturing, gesticulating, etc.), and may process the third posture example 430 to generate third posture data indicating that the user 5 is seated.

One of skill in the art may recognize that the posture of the user 5 may be related to a "pose" of the user 5, such that generating the posture data may correspond to performing pose recognition to distinguish between different poses of the user 5 and/or the like. However, to avoid confusion, as used herein the disclosure uses the term "posture" to refer to a pose and/or posture associated with the user 5 and uses the term "pose" to refer to a position of one or more sensors of the device 110. For example, the device 110 may generate posture data to indicate a posture of the user 5 as represented in the image data, while determining pose data to indicate a current position of one or more sensors 114 (e.g., camera(s)) relative to the device 110 and/or the user 5. Thus, the posture data indicates information about the user 5, whereas the pose data indicates information about the one or more sensors of the device 110 (e.g., height of a sensor, length of extension associated with a sensor, perspective of the user 5, distance to the user 5, etc.).

In some examples, the posture data may include a simple descriptor associated with the current posture, such as "standing," "animated," "sitting," etc. However, the disclosure is not limited thereto, and the device 110 may generate posture data including additional descriptors that provide additional details without departing from the disclosure. For example, the third posture data may indicate that the user 5 is holding a smartphone, whereas the second posture data may indicate that the user 5 is looking directly at the device 110, although the disclosure is not limited thereto. Thus, in addition to indicating the current posture (e.g., pose) of the user 5 (e.g., physical orientation of the user's body), the posture data may also indicate whether the user 5 is looking and/or interacting with something else (e.g., another user, the smartphone, etc.) or whether the user 5 is interacting with the device 110.

Figure 5:
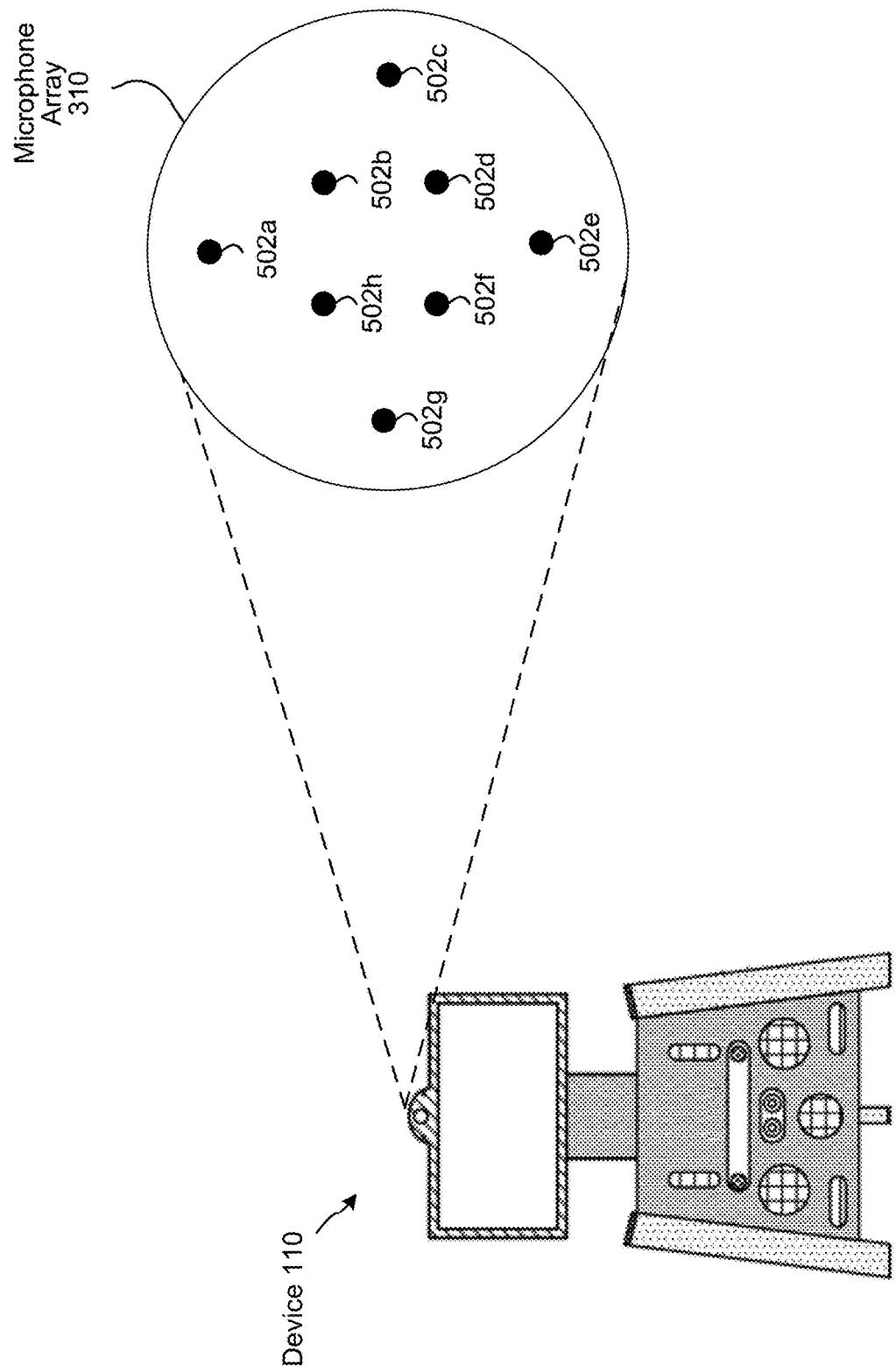
FIG. 5 illustrates a microphone array according to embodiments of the present disclosure.

FIG. 5 illustrates further details of the microphone array 310. In some embodiments, the microphone array 310 includes eight microphones 502*a*, 502*b*, 502*c*, 502*d*, 502*e*, 502*f*, 502*g*, and 502*h*, arranged in two concentric circles; the four microphones of one circle may be rotated 45 degrees with respect to the four microphones of the other circle. The present disclosure is not, however, limited to any particular number or arrangement of microphones.

The microphone array 310 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The device 110 and/or the system(s) 120 may include a user recognition component 295 that recognizes one or more users using a variety of data. As illustrated in FIG. 6, the user recognition component 295 may include one or more subcomponents including a vision component 608, an audio component 610, a biometric component 612, a radio frequency (RF) component 614, a machine learning (ML) component 616, and a recognition confidence component 618. In some instances, the user recognition component 295 may monitor data and determinations from one or more subcomponents to determine an identity of one or more users associated with data input to the device 110 and/or the system(s) 120. The user recognition component 295 may output user recognition data 695, which may include a user identifier associated with a user the user recognition component 295 believes originated data input to the device 110 and/or the system(s) 120. The user recognition data 695 may be used to inform processes performed by various components of the device 110 and/or the system(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may utilize determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a personal device (such as a phone) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the device 110 and/or the system(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of device 110 and/or the system(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the device 110 and/or the system(s) 120 for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the device 110 that captured the spoken user input).

Figure 7:
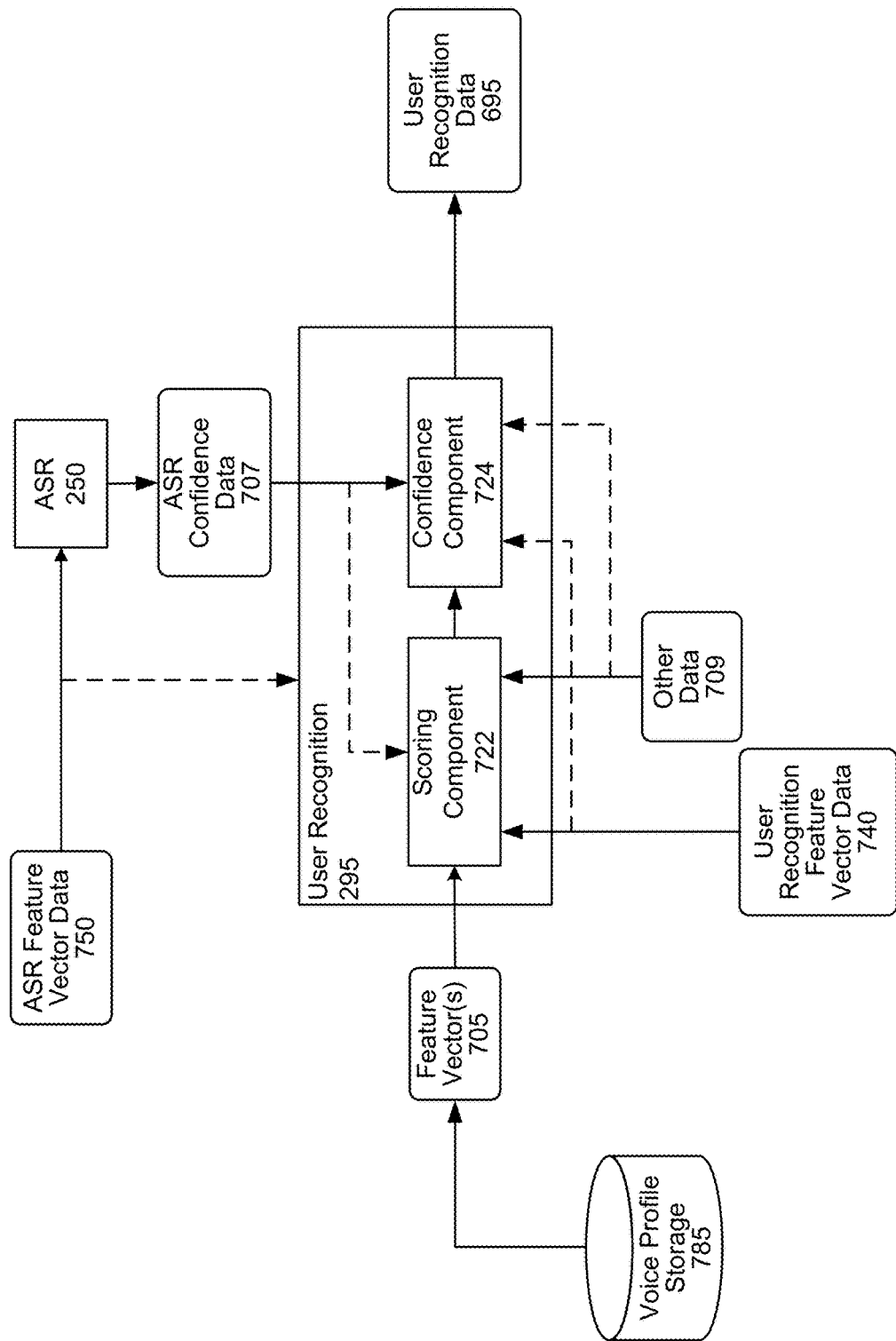
FIG. 7 is a system flow diagram illustrating user recognition according to embodiments of the present disclosure.

FIG. 7 illustrates user recognition processing as may be performed by the user recognition component 295. The ASR component 250 performs ASR processing on ASR feature vector data 750. ASR confidence data 707 may be passed to the user recognition component 295.

The user recognition component 295 performs user recognition using various data including the user recognition feature vector data 740, feature vectors 705 representing voice profiles of users of the system 100, the ASR confidence data 707, and other data 709. The user recognition component 295 may output the user recognition data 695, which reflects a certain confidence that the user input was spoken by one or more particular users. The user recognition data 695 may include one or more user identifiers (e.g., corresponding to one or more voice profiles). Each user identifier in the user recognition data 695 may be associated with a respective confidence value, representing a likelihood that the user input corresponds to the user identifier. A confidence value may be a numeric or binned value.

The feature vector(s) 705 input to the user recognition component 295 may correspond to one or more voice profiles. The user recognition component 295 may use the feature vector(s) 705 to compare against the user recognition feature vector 740, representing the present user input, to determine whether the user recognition feature vector 740 corresponds to one or more of the feature vectors 705 of the voice profiles. Each feature vector 705 may be the same size as the user recognition feature vector 740.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 740 produced from the audio data 211. The user recognition component 295 may send a signal to voice profile storage 785, with the signal requesting only audio data and/or feature vectors 705 (depending on whether audio data and/or corresponding feature vectors are stored) associated with the device identifier, the group profile identifier, and/or the user identifiers represented in the metadata. This limits the universe of possible feature vectors 705 the user recognition component 295 considers at runtime and thus decreases the amount of time to perform user recognition processing by decreasing the amount of feature vectors 705 needed to be processed. Alternatively, the user recognition component 295 may access all (or some other subset of) the audio data and/or feature vectors 705 available to the user recognition component 295. However, accessing all audio data and/or feature vectors 705 will likely increase the amount of time needed to perform user recognition processing based on the magnitude of audio data and/or feature vectors 705 to be processed.

If the user recognition component 295 receives audio data from the voice profile storage 785, the user recognition component 295 may generate one or more feature vectors 705 corresponding to the received audio data.

The user recognition component 295 may attempt to identify the user that spoke the speech represented in the audio data 211 by comparing the user recognition feature vector 740 to the feature vector(s) 705. The user recognition component 295 may include a scoring component 722 that determines respective scores indicating whether the user input (represented by the user recognition feature vector 740) was spoken by one or more particular users (represented by the feature vector(s) 705). The user recognition component 295 may also include a confidence component 724 that determines an overall accuracy of user recognition processing (such as those of the scoring component 722) and/or an individual confidence value with respect to each user potentially identified by the scoring component 722. The output from the scoring component 722 may include a different confidence value for each received feature vector 705. For example, the output may include a first confidence value for a first feature vector 705a (representing a first voice profile), a second confidence value for a second feature vector 705b (representing a second voice profile), etc. Although illustrated as two separate components, the scoring component 722 and the confidence component 724 may be combined into a single component or may be separated into more than two components.

The scoring component 722 and the confidence component 724 may implement one or more trained machine learning models (such as neural networks, classifiers, etc.) as known in the art. For example, the scoring component 722 may use probabilistic linear discriminant analysis (PLDA) techniques. PLDA scoring determines how likely it is that the user recognition feature vector 740 corresponds to a particular feature vector 705. The PLDA scoring may generate a confidence value for each feature vector 705 considered and may output a list of confidence values associated with respective user identifiers. The scoring component 722 may also use other techniques, such as GMMs, generative Bayesian models, or the like, to determine confidence values.

The confidence component 724 may input various data including information about the ASR confidence 707, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 724 may also consider the confidence values and associated identifiers output by the scoring component 722. For example, the confidence component 724 may determine that a lower ASR confidence 707, or poor audio quality, or other factors, may result in a lower confidence of the user recognition component 295. Whereas a higher ASR confidence 707, or better audio quality, or other factors, may result in a higher confidence of the user recognition component 295. Precise determination of the confidence may depend on configuration and training of the confidence component 724 and the model(s) implemented thereby. The confidence component 724 may operate using a number of different machine learning models/techniques such as GMM, neural networks, etc. For example, the confidence component 724 may be a classifier configured to map a score output by the scoring component 722 to a confidence value.

The user recognition component 295 may output user recognition data 695 specific to a one or more user identifiers. For example, the user recognition component 295 may output user recognition data 695 with respect to each received feature vector 705. The user recognition data 695 may include numeric confidence values (e.g., 0.0-1.0, 0-1000, or whatever scale the system is configured to operate). Thus, the user recognition data 695 may output an n-best list of potential users with numeric confidence values (e.g., user identifier 123—0.2, user identifier 234—0.8). Alternatively or in addition, the user recognition data 695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 695 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 724 may determine the overall confidence value.

The confidence component 724 may determine differences between individual confidence values when determining the user recognition data 695. For example, if a difference between a first confidence value and a second confidence value is large, and the first confidence value is above a threshold confidence value, then the user recognition component 295 is able to recognize a first user (associated with the feature vector 705 associated with the first confidence value) as the user that spoke the user input with a higher confidence than if the difference between the confidence values were smaller.

The user recognition component 295 may perform thresholding to avoid incorrect user recognition data 695 being output. For example, the user recognition component 295 may compare a confidence value output by the confidence component 724 to a threshold confidence value. If the confidence value does not satisfy (e.g., does not meet or exceed) the threshold confidence value, the user recognition component 295 may not output user recognition data 695, or may only include in that data 695 an indicator that a user that spoke the user input could not be recognized. Further, the user recognition component 295 may not output user recognition data 695 until enough user recognition feature vector data 740 is accumulated and processed to verify a user above a threshold confidence value. Thus, the user recognition component 295 may wait until a sufficient threshold quantity of audio data of the user input has been processed before outputting user recognition data 695. The quantity of received audio data may also be considered by the confidence component 724.

The user recognition component 295 may be defaulted to output binned (e.g., low, medium, high) user recognition confidence values. However, such may be problematic in certain situations. For example, if the user recognition component 295 computes a single binned confidence value for multiple feature vectors 705, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 709 to inform user recognition processing. A trained model(s) or other component of the user recognition component 295 may be trained to take other data 709 as an input feature when performing user recognition processing. Other data 709 may include a variety of data types depending on system configuration and may be made available from other sensors, devices, or storage. The other data 709 may include a time of day at which the audio data 211 was generated by the device 110 or received from the device 110, a day of a week in which the audio data audio data 211 was generated by the device 110 or received from the device 110, etc.

The other data 709 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 740 and one or more feature vectors 705 to perform more accurate user recognition processing. Additionally or alternatively, posture recognition can be performed by the user recognition component 295 and/or the output of posture recognition processing may be used by the user recognition component 295 without departing from the disclosure.

The other data 709 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 709 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 709 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 709 may include data representing activity of a particular user that may be useful in performing user recognition processing. For example, a user may have recently entered a code to disable a home security alarm. A device 110, represented in a group profile associated with the home, may have generated the audio data 211. The other data 709 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 709 and considered by the user recognition component 295.

Depending on system configuration, the other data 709 may be configured to be included in the user recognition feature vector data 740 so that all the data relating to the user input to be processed by the scoring component 722 may be included in a single feature vector. Alternatively, the other data 709 may be reflected in one or more different data structures to be processed by the scoring component 722.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
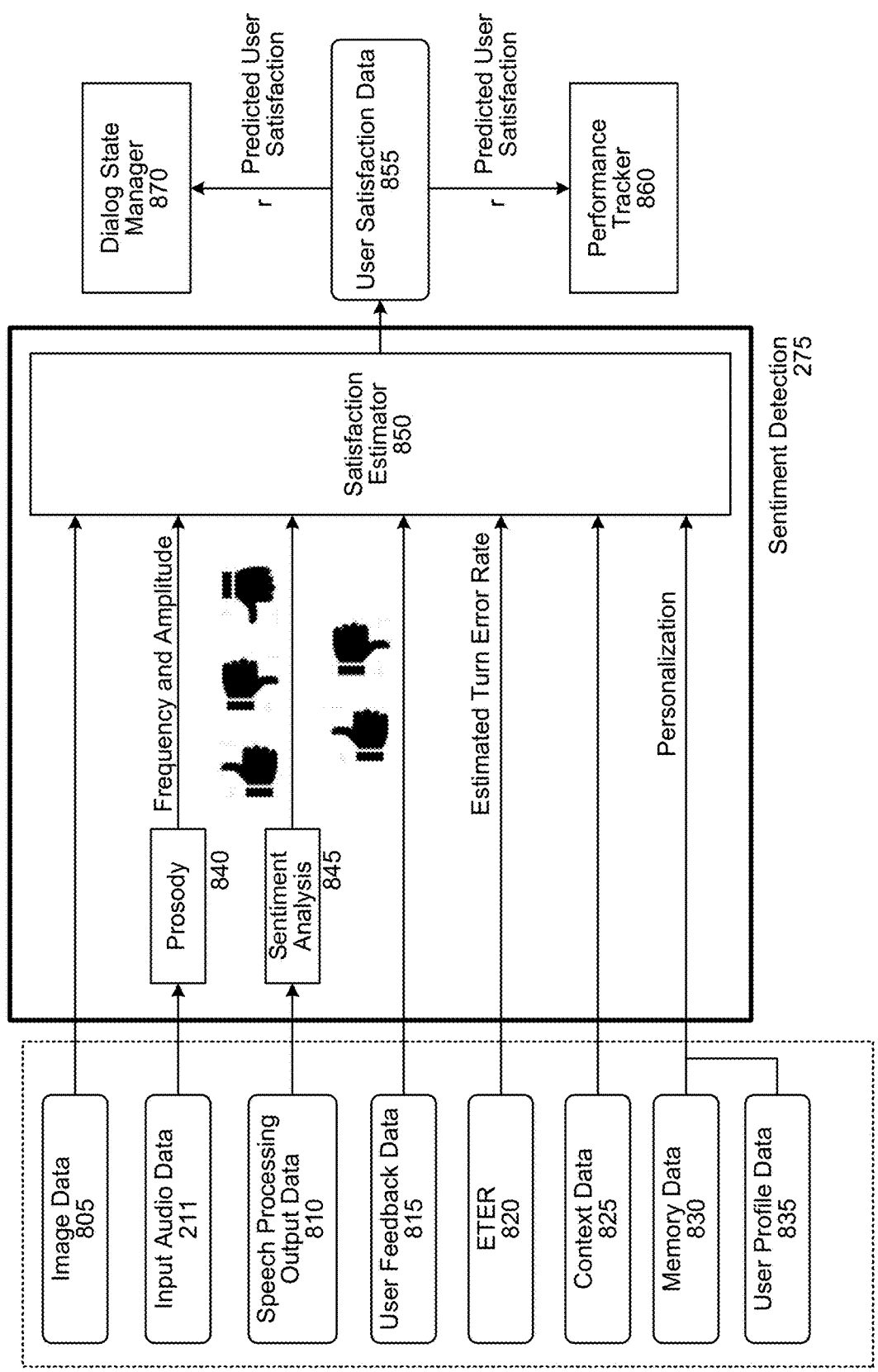
FIG. 8 illustrates examples of inputs to and outputs from a user satisfaction estimator according to embodiments of the present disclosure.

FIG. 8 illustrates examples of inputs to and outputs from a user satisfaction estimator according to embodiments of the present disclosure. As illustrated in FIG. 8, the sentiment detection component 275 may include a satisfaction estimator 850 configured to generate user satisfaction data 855. For example, the satisfaction estimator 850 may use a plurality of inputs to estimate a user satisfaction value, although the disclosure is not limited thereto.

In some examples, the satisfaction estimator 850 is configured to determine an emotive context of the user (e.g., user satisfaction), which may be represented as a scalar value between 1 and 5 that indicates whether the user is satisfied (e.g., "5") or unsatisfied (e.g., "1") at a particular point in time. However, the disclosure is not limited thereto and the user satisfaction data 855 may vary without departing from the disclosure. For example, the user satisfaction data 855 may indicate a scalar value within a different range of values (e.g., between "1" and "10," although the disclosure is not limited thereto) or may not correspond to a scalar value without departing from the disclosure. Additionally or alternatively, the user satisfaction data 855 may indicate a sentiment category corresponding to the user 5 without departing from the disclosure.

In some examples, the device 110 may generate the user satisfaction data 855 to determine a predicted user satisfaction associated with an action performed by the device 110. For example, each time the device 110 performs an action responsive to an utterance of the user 5, the device 110 may generate the user satisfaction data 855 to estimate the predicted user satisfaction immediately after the action is performed. Thus, the device 110 may track the predicted user satisfaction values and improve performance of the device 110. In addition, the device 110 may use the user satisfaction data 855 as an input to the sentiment detection model and may perform multimodal sentiment detection to determine sentiment data based in part on the user satisfaction data 855.

In other examples, however, the satisfaction estimator 850 may be included as part of the sentiment detection model without departing from the disclosure. For example, the sentiment detection model may process at least some of the plurality of inputs illustrated in FIG. 8 to generate user satisfaction data 855 that corresponds to the sentiment data described above. Thus, the user satisfaction estimator 850 may be a separate component from the sentiment detection model, in which case the user satisfaction data 855 is another input for the sentiment detection model, or the user satisfaction estimator 850 may be a simple illustration of a sentiment detection model, in which case the user satisfaction data 855 corresponds to the sentiment data itself. If the user satisfaction estimator 850 is included as part of the sentiment detection model, the sentiment detection model may perform multimodal sentiment detection using at least some of the plurality of inputs illustrated in FIG. 8 as well as additional inputs described in greater detail below.

As illustrated in FIG. 8, the satisfaction estimator 850 may receive a plurality of inputs, which may correspond to dialog state data received from a dialog state manager 870, although the disclosure is not limited thereto. For example, the plurality of inputs may include image data 805, input audio data 211, speech processing output data 810 (e.g., lexical data output by the ASR component 250, NLU data output by the NLU component 260, and/or the like), user feedback data 815, estimated turn error rate (ETER) 820, context data 825, memory data 830, and/or user profile data 835, although the disclosure is not limited thereto.

As described above, the speech processing output data 810 may include lexical data output by the ASR component 250, NLU data output by the NLU component 260, and/or the like. For example, the speech processing output data 810 may correspond to textual data representing the speech, N-best recognitions data, and/or the like without departing from the disclosure.

The context data may include information providing context for the device 110 and/or a user profile associated with the device 110. For example, the context data 825 may indicate a dialog context associated with a current utterance, a usage history of the device 110, a usage history of multiple devices associated with the user profile, mapping data corresponding to the environment around the device 110, and/or other data without departing from the disclosure.

To determine whether the user is pleased or displeased, the satisfaction estimator 850 may analyze multiple inputs for evidence of the user's emotional state. For example, the satisfaction estimator 850 may analyze the input audio data 211 to detect variations in the user's speech, such as a change in tone (e.g., the user angrily shouting), speech speed or speech frequency. Similarly, the satisfaction estimator 850 may analyze (e.g., perform content analysis) the output of the speech processing component 240 (e.g., text corresponding to the user's speech) to determine whether the user's speech is positive, negative or neutral.

In some examples, the device 110 may include a camera configured to capture image data 805 and the satisfaction estimator 850 may analyze the image data 805 using facial recognition or the like to identify facial expressions and determine if the facial expressions are positive, negative, or neutral, although the disclosure is not limited thereto. For example, the satisfaction estimator 850 may receive the image data 805 and may perform computer vision processing to determine information about a user satisfaction based on facial expressions or the like. In some examples, the satisfaction estimator 850 may identify common facial expressions and associate the facial expressions with a user satisfaction value, such as a smile corresponding to a high user satisfaction value and a frown corresponding to a low user satisfaction value. Additionally or alternatively, the satisfaction estimator 850 may analyze the image data 805 using posture recognition or the like to identify posture data indicating a current posture of the user and determine if the posture data is positive, negative, or neutral, although the disclosure is not limited thereto. However, the disclosure is not limited thereto and the satisfaction estimator 850 may perform any computer vision processing known to one of skill in the art without departing from the disclosure.

The sentiment detection component 275 may include three components that include machine learning models; a prosody component 840, a sentiment analysis component 845, and a satisfaction estimator 850. As illustrated in FIG. 8, the audio (e.g., input audio data 211) and the text (e.g., speech processing output data 810) are processed separately by the first two machine learning models (e.g., the prosody component 840 and the sentiment analysis component 845, respectively) and outputs are fed into the third machine learning model (e.g., the satisfaction estimator 850), along with the remaining inputs. While FIG. 8 illustrates the sentiment detection component 275 including all three machine learning models, the disclosure is not limited thereto and the sentiment detection component 275 may include only a single machine learning model without departing from the disclosure. For example, the sentiment detection component 275 may map the dialog state to the user satisfaction value without intermediate prediction.

As discussed above, the prosody component 840 may analyze the input audio data 211 to determine the frequency and the amplitude of the user's speech, which may indicate whether the user is satisfied or unsatisfied. As used herein, audio property data may represent at least one of the frequency or the amplitude of the user's speech and the audio property data may be associated with the input audio data 211.

The user feedback data 815 may correspond to explicit user feedback indicating whether the user is satisfied or unsatisfied, such as a verbal indication of positive or negative feedback. In some examples, the system(s) 120 may estimate if the ASR and/or NLU made a mistake, which is indicated by an estimated turn error rate (ETER) 820.

The prosody component 840 may be configured to identify changes in tone (e.g., happy, sad, etc.) and determine whether the changes in tone correspond to a user satisfaction. For example, the prosody component 840 may detect fluctuations in speech indicating that the user is annoyed or frustrated, which corresponds to a decreased user satisfaction.

Additionally or alternatively, the sentiment analysis component 845 may be configured to analyze the speech processing output data 810 and identify a sentiment (e.g., positive, neutral, negative) associated with the utterance. For example, if the user cancels an action or inputs the same command repeatedly, the sentiment analysis component 845 may determine that the user is unsatisfied and that the system(s) 120 are not performing the desired action. Similarly, if the utterance corresponds to a negative comment (e.g., "This machine is so dumb!"), the sentiment analysis component 845 may interpret the utterance as an indication that the user satisfaction is low.

The memory data 830 indicates stored preferences or annotations associated with the user 5, the device 110 and/or the system 100. For example, the user may indicate "Alexa, remember that I hate mushrooms," "Alexa, my passcode is 12345," "Alexa, I will not go to this restaurant anymore," or the like, and the system 100 may store this information to improve future processing. In some examples the memory data 830 may correspond to the personal graph data associated with a user profile for the user 5, although the disclosure is not limited thereto. As illustrated in FIG. 8, the memory data 830 may include user profile data 835 that is associated with the user profile.

In some examples, the satisfaction estimator 850 may generate user satisfaction data 855, which includes the user satisfaction value (e.g., value between 1 and 5) indicating a current estimate of the user satisfaction (e.g., predicted user satisfaction r). The user satisfaction data 855 may be sent to the dialog state manager 870 to update the dialog state data.

Additionally or alternatively, the user satisfaction data 855 may be sent to a performance tracker 860 that may track the user satisfaction values over a period of time. The performance tracker 860 may enable the system 100 to track the user's conversational experience and to estimate the user satisfaction given a current dialog state.

The sentiment detection component 275 (e.g., the prosody component 840, the sentiment analysis component 845, and/or the satisfaction estimator 850) and/or other components in the system 100 may implement one or more machine learning models. A ground truth may be established for purposes of training the one or more machine learning models. In machine learning, the term "ground truth" refers to the accuracy of a training set's classification for supervised learning techniques.

Various machine learning techniques may be used to train and operate the satisfaction estimator 850. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. The user response to content output by the system may be used to further train the machine learning model(s).

Figure 9:
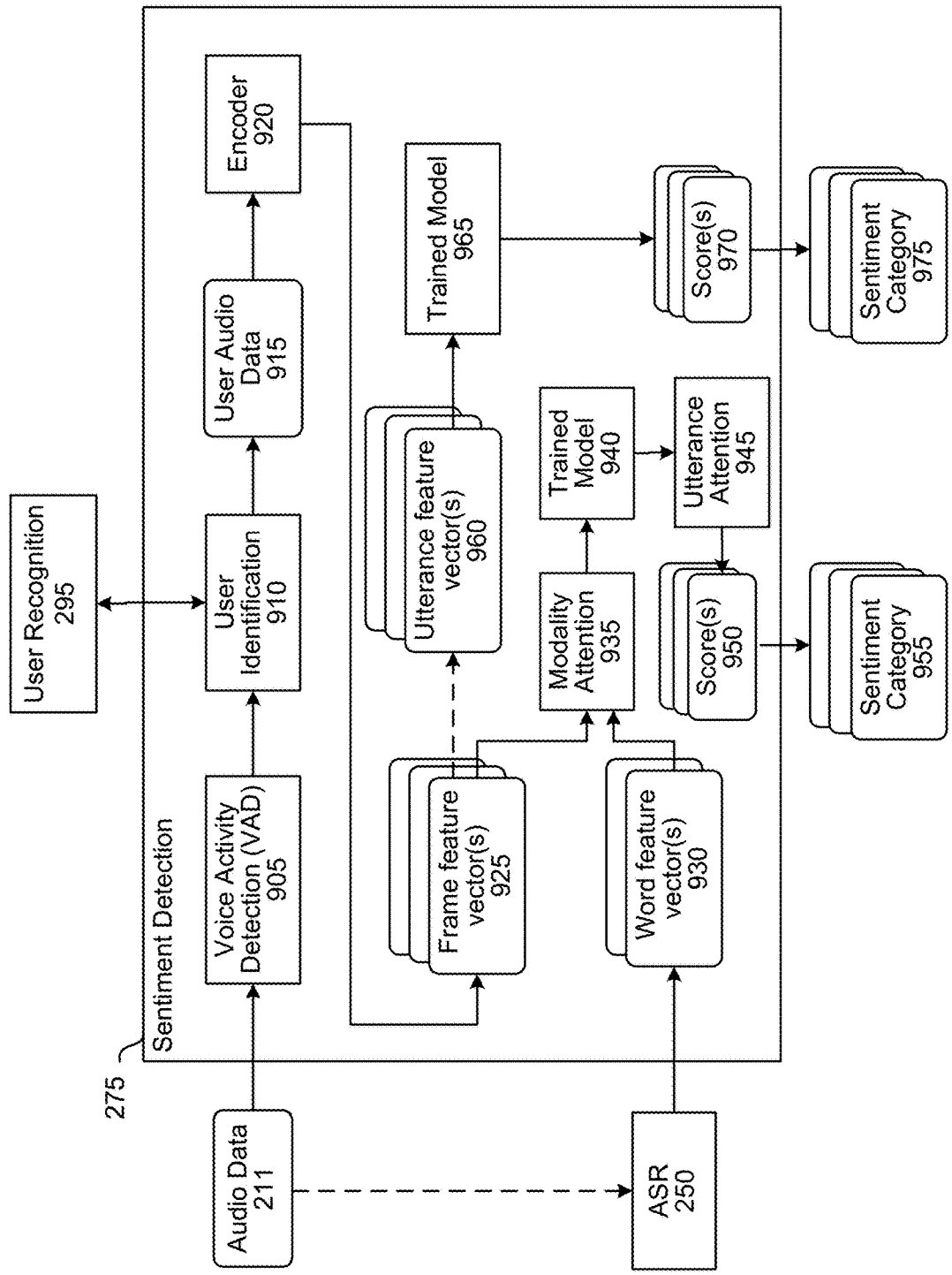
FIG. 9 is a conceptual diagram illustrating a sentiment detection component according to embodiments of the present disclosure.

FIG. 9 is a conceptual diagram illustrating sentiment detection component 275 according to embodiments of the present disclosure. The sentiment detection component 275 may include a voice activity detection (VAD) component 905, a user identification component 910, an encoder component 920, a modality attention layer 935, a trained model component 940, an utterance attention layer 945, and a trained model component 965. The audio data 211 captured by a device 110 may be inputted into the VAD component 905. While FIG. 9 illustrates the sentiment detection component 275 receiving the audio data 211, the disclosure is not limited thereto and in some examples the sentiment detection component 275 may receive image data without departing from the disclosure. Thus, the sentiment detection component 275 may perform sentiment detection using the image data, as described in greater detail above with regard to FIG. 8 and below with regard to FIGS. 16-17.

The VAD component 905 may determine if the audio data 211 includes speech spoken by a human or voice activity by a human, and may determine a portion of the audio data 211 that includes speech or voice activity. The VAD component 905 may send the portion of the audio data 211 including speech or voice activity to the user identification component 910. The VAD component 905 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 905 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 910 may communicate with the user recognition component 295 to determine user audio data 915 that corresponds to a particular user profile. The user recognition component 295 may recognize one or more users as described in connection with FIGS. 6 and 7. The user audio data 915 may be a portion of the audio data 211 that includes speech or one or more utterances from a particular user associated with the user profile. In other words, audio data representing a particular user's speech may be isolated and stored as the user audio data 915 for further analysis. In an example embodiment, the user may be associated with or using the device 110, and may have provided permission to the system 100 to record and analyze his or her voice/conversations to determine a sentiment category corresponding to the conversation.

The user audio data 915 may be input into the encoder component 920 to determine frame feature vector(s) 925. The encoder component 920 may be a bidirectional LSTM. The frame feature vector(s) 925 may represent audio frame level features extracted from the user audio data 915. One frame feature vector 925 may represent audio frame level features for an audio frame of 20 ms of the user audio data 915. The frame feature vector(s) 925 may be derived by spectral analysis of the user audio data 915. The sentiment detection component 275 may determine the portions of user audio data 915 that correspond to individual words and may extract acoustic features from the respective portions of audio using the encoder component 920.

In some embodiments, the frame feature vector(s) 925 may be used to determine utterance feature vector(s) 960 representing utterance-level features of one or more utterances represented in the user audio data 915. The utterance feature vector(s) 960 may be determined by performing statistics calculations, delta calculation and other processing on the frame feature vector(s) 915 for the audio frames corresponding to an utterance of interest. As such, the utterance feature vector(s) 960 may be a feature matrix whose dimensions are based on the number of audio frames corresponding to the utterance of interest and the dimension of the corresponding frame feature vector 915. The utterance feature vector(s) 960 may be a high-level function or other mathematical functions representing the utterance-level features.

The ASR component 250, as described above, may generate an ASR output including text data representative of one or more utterances represented in the audio data 211. In some examples, the system sends audio data 211 to the ASR component 250 for processing. In other examples, the system sends user audio data 915 to the ASR component 250 for processing. The ASR output may be represented as word feature vector(s) 930, where each word feature vector 930 may correspond to a word in the text data determined by the ASR component 250 and may represent lexical information of the utterance. The word feature vector 930 may be a word embedding.

In an example embodiment, the sentiment detection component 275 determines that the user audio data 915 includes an entire utterance. That is, the sentiment detection component 275 may determine that a beginpoint of the user audio data 915 corresponds to a beginpoint of an utterance, and an endpoint of the user audio data 915 corresponds to an endpoint of the utterance. In this case, the frame feature vector(s) 925 and the word feature vector(s) 930 may represent all the words in one utterance.

The sentiment detection component 275 may align a frame feature vector 925 with a corresponding word feature vector 930 such that the pair represents acoustic information and lexical information, respectively, for an individual word in the utterance represented in user audio data 915. The frame feature vectors 925 and the word feature vectors 930 may be processed by the trained model 940 simultaneously.

The trained model 940 may process the frame feature vector(s) 925 and corresponding word feature vector(s) 930 using a machine learning model. In some embodiments, the sentiment detection component 275 includes a modality attention component 935 configured to determine how much acoustic information versus how much lexical information from the respective feature vectors 925/930 should be used by the trained model 940. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 935 may assign a weight or percentage to the data represented by the acoustic feature vectors and the data represented by the lexical feature vectors to indicate the importance of each to the trained model 940.

The trained model 940 may be a neural network, for example a bi-directional LSTM. The output of the trained model 940 may be fed into an utterance attention component 945. The utterance attention component 945 may employ a neural network, for example a recurrent neural network, although the disclosure is not limited thereto. The utterance attention component 945 may be configured to emphasize relevant portions of an input utterance. The utterance attention component 945 may be configured to take in output data from the trained model 940 and produce an output for every time step (e.g., a 10 ms audio frame). The utterance attention component 945 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 945 is configured to realize that the first word corresponds to an anger sentiment and that that should affect the processing of the other words in the utterance to ultimately determine a sentiment category corresponding to the utterance.

The utterance attention component 945 may output score(s) 950 indicating a sentiment category 955 for the user audio data 915. The sentiment detection component 275 may predict from multiple sentiment categories, including but not limited to, happiness, sadness, anger and neutral. In an example embodiment, the sentiment category 955 may be determined after score(s) 950 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 975 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 9, the trained model component 965 may process the utterance feature vector(s) 960 using a fully-connected neural network trained using techniques known to one of skill in the art. The trained model component 965 may output score(s) 970 indicating a sentiment category 975 for the user audio data 915.

The sentiment detection component 275 may predict one of three sentiment categories 955/975. In some examples, the sentiment categories 955/975 may be positive, neutral, and negative. However, the disclosure is not limited thereto, and in other examples the sentiment categories 955/975 may be angry, neutral (e.g., neutral/sad), and happy without departing from the disclosure. Additionally or alternatively, the sentiment detection component 275 may predict any number of sentiment categories 955/975 without departing from the disclosure. For example, the sentiment detection component 275 may predict one of four sentiment categories 955/975, such as angry, sad, neutral, and happy, although the disclosure is not limited thereto.

The machine learning model for the trained model component 940/965 may take many forms, including a neural network. The trained model component 940/965 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 10:
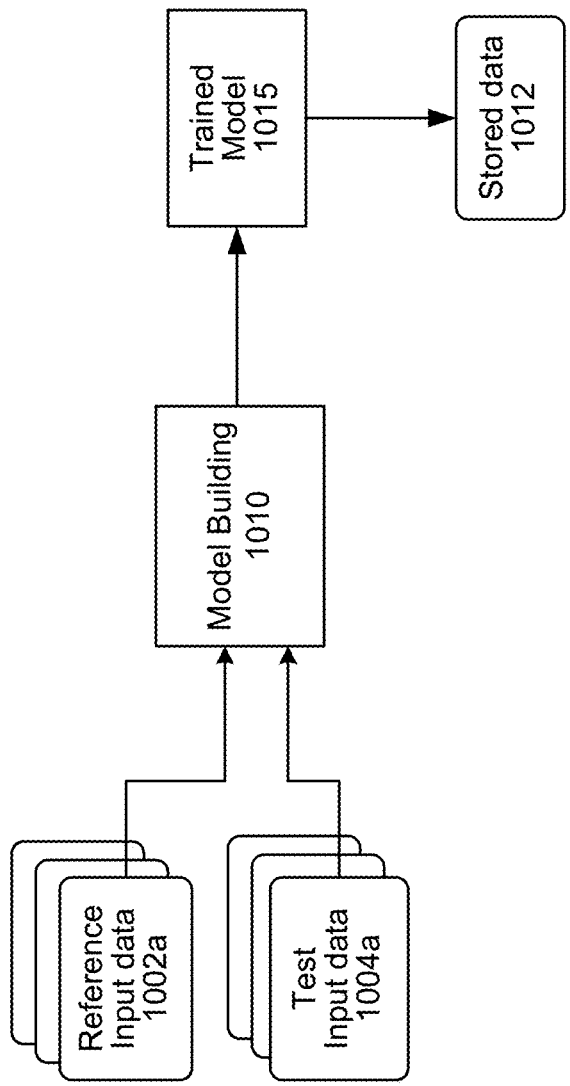
FIG. 10 is a conceptual diagram of building the trained model using training data according to embodiments of the present disclosure.

FIG. 10 conceptually illustrates components for training a machine learning (ML) model for sentiment detection using a baseline. The sentiment detection component 275 may include a model building component 1010. The model building component 1010 may be a separate component included in the system 100.

The model building component 1010 may train one or more machine learning models to determine a sentiment corresponding to a user input based on the user's neutral emotional state represented by a baseline/reference input data. The model building component 1010 may train the one or more machine learning models during offline operations. The model building component 1010 may train the one or more machine learning models using a training dataset.

The training dataset may include a pair of input data, one representing a neutral emotional state of a speaker and the other representing a non-neutral emotional state of the speaker. For example, the reference input data 1002a may represent a first speaker's neutral emotional state, and the test input data 1004a may represent the first speaker's non-neutral (e.g., angry) emotional state. The reference input data 1002b may represent a second speaker's neutral emotional state and the test input data 1004b may represent the second speaker's non-neutral (e.g., happy) emotional state. The pair of input data 1002 and 1004 may make up the training dataset used by the model building component 1010 to train a ML model to detect sentiment using a baseline. The test input data 1004 may be annotated or labeled with the sentiment category corresponding by the test input data.

In some examples, the input data 1002/1004 may correspond to audio data, image data, and/or text data, although the disclosure is not limited thereto. For example, the training dataset may include any combination of audio data, image data, and/or text data to assist the model building component 1010 in training the ML model to perform sentiment detection.

As part of the training process, the model building component 1010 may determine weights and parameters associated with various layers of the trained model 1015. The weights and parameters corresponding to the final state of the trained model 1015 may be stored as stored data 1012.

Figure 11:
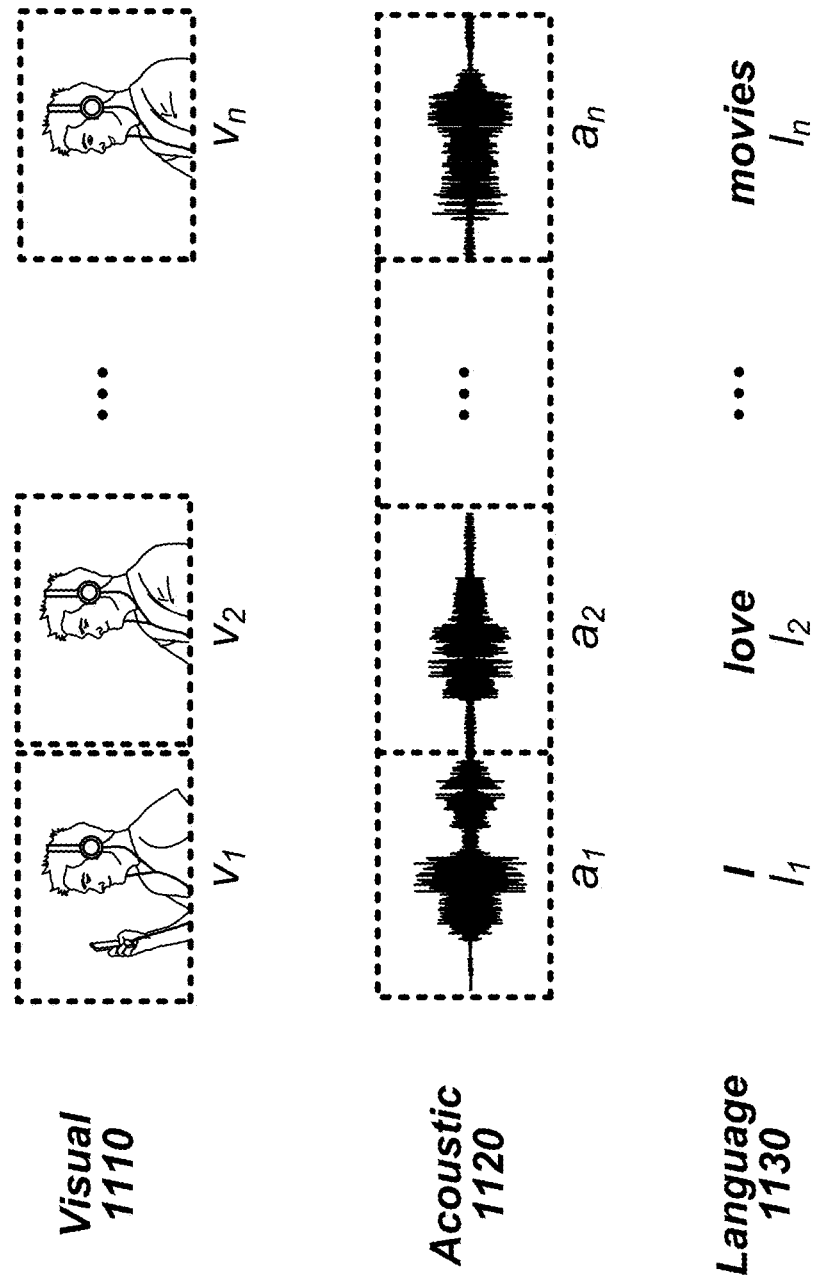
FIG. 11 illustrates an example of multimodal inputs according to embodiments of the present disclosure.

FIG. 11 illustrates an example of multimodal inputs according to embodiments of the present disclosure. As illustrated in FIG. 11, the device 110 may receive input data that corresponds to multimodal inputs, such as visual data 1110, acoustic data 1120, and/or language data 1130. The device 110 may divide the input data into a sequence of inputs, such as video frames, audio frames, and/or words, and may process the sequence of inputs to perform sentiment detection processing. As illustrated in FIG. 11, the visual data 1110 may be divided into a series of video frames (e.g., $v_1, v_2, \ldots, v_n$), the acoustic data 1120 may be divided into a series of audio frames (e.g., $a_1, a_2, \ldots, a_n$), and the language data 1130 (e.g., text data corresponding to the acoustic data 1120) may be divided into a series of words (e.g., $w_1, w_2, \ldots, w_n$).

In some examples, the device 110 may perform preprocessing to the visual data 1110 (e.g., image data) and/or the acoustic data 1120 (e.g., audio data) prior to performing sentiment detection processing. For example, as the device 110 may be a motile device, a position of the user 5 relative to camera(s) of the device 110, a distance between the device 110 and the user 5, and/or the like may vary without departing from the disclosure. These variations in relative position between the user 5 and the camera(s) and/or the device 110 may change a perspective of the user 5 represented in the image data, affect a loudness of speech represented in the audio data, increase or decrease ambient noise or other environmental noise interfering with the speech, and/or the like. Thus, the device 110 may be configured to perform preprocessing to normalize the audio data and/or the image data prior to performing sentiment detection processing.

Figure 12:
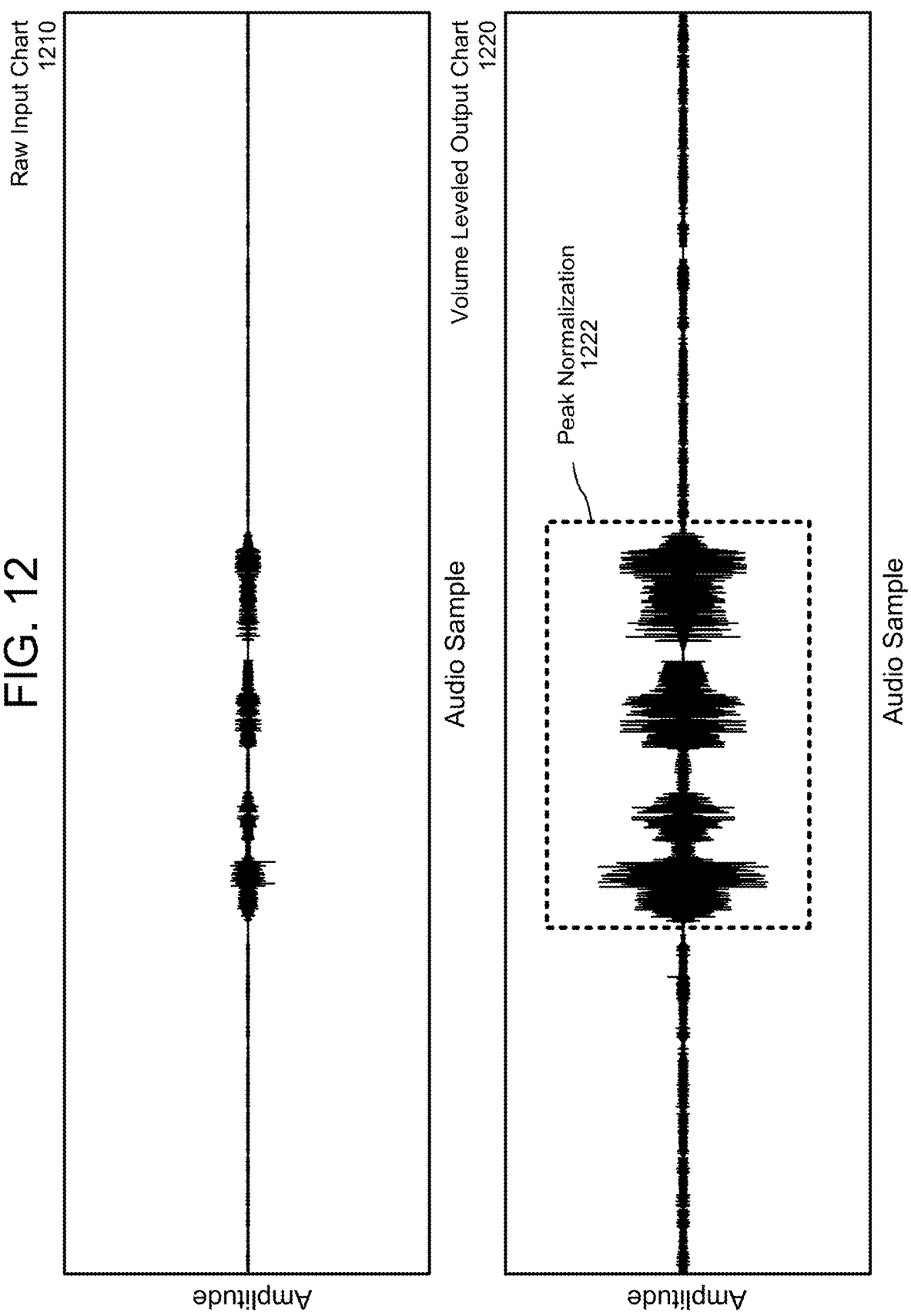
FIG. 12 illustrates an example of performing volume leveling or other audio processing according to embodiments of the present disclosure.

FIG. 12 illustrates an example of performing volume leveling or other audio processing according to embodiments of the present disclosure. As illustrated in FIG. 12, first input audio data captured by the device 110 may be represented as raw input chart 1210, which includes a lot of silence and an overall low volume level even where the first input audio data represents an input utterance. To improve this audio data, the device 110 may perform preprocessing to generate second input audio data, represented by volume leveled output chart 1220. For example, the device 110 may perform normalization to increase a volume level of the second input audio data relative to the first input audio data (e.g., increase from a first volume level of the first input audio data to a second volume level of the second input audio data).

As illustrated in FIG. 12, peak normalization 1222 is applied to increase a volume level corresponding to an input utterance from the first volume level to the second volume level. To perform this peak normalization 1220, the device 110 may optionally perform voice activity detection (VAD) processing to detect that speech is represented in the first input audio data. This avoids applying a large gain to non-speech activity, such as silence, environmental noise, and/or the like.

While FIG. 12 only illustrates a single example of performing peak normalization 1222, the device 110 may apply any technique known to one of skill in the art to perform preprocessing on input audio data without departing from the disclosure. For example, the device 110 may generate first input audio data having different volume levels and then apply preprocessing to perform volume leveling and/or audio normalization such that speech is represented consistently near the second volume level. Thus, the device 110 may apply a large gain value to quieter speech (e.g., speech generated far from the device 110), and may apply a small gain value to louder speech (e.g., speech generated near the device 110), although the disclosure is not limited thereto.

While not illustrated in FIG. 12, the device 110 may perform similar preprocessing to first input image data to generate second input image data without departing from the disclosure. For example, the first input image data may include a first representation of the user 5 having a first perspective, which may include distortion. To improve sentiment detection processing, the device 110 may perform preprocessing to the first input image data to generate second input image data that includes a second representation of the user 5 that is different than the first representation. For example, the second representation of the user 5 may account for the distortion and/or other perspective errors associated with the camera(s) and/or a position of the user 5 relative to the camera(s). In some examples, the device 110 may capture the first input image data from a low vantage point (e.g., camera(s) is at a first height that is lower than a second height of the user's face) and the device 110 may generate the second input image data taking into account the low vantage point (e.g., correcting for this distortion to generate a frontal representation of the user's face), although the disclosure is not limited thereto.

In some examples, the device 110 may detect that distortion is present in the image data and may reposition the camera(s) and/or the device 110 to generate image data from a different perspective. To illustrate an example, the device 110 may reposition the camera(s) relative to the device 110 and/or the user 5 to change a perspective of the user represented in image data generated by the camera(s). Additionally or alternatively, the device 110 may reposition the device 110 relative to the user 5 to change the perspective of the user 5 represented in the image data without departing from the disclosure.

In some examples, the device 110 may perform preprocessing based on position data of the device 110 and/or the pose data associated with the sensor(s) of the device 110. For example, the device 110 may perform first preprocessing based on a first location (e.g., indicated by the position data) and may perform second preprocessing based on a second location. For example, the device 110 may perform preprocessing based on acoustics or room characteristics associated with a room in which the device 110 is located (e.g., room characteristic data associated with the location). In some examples, the device 110 may determine Room Impulse Response (RIR) data associated with the location and preprocess the audio data using the RIR data, although the disclosure is not limited thereto. Additionally or alternatively, the device 110 may perform first preprocessing based on a first position of the device 110 relative to the user 5 (e.g., indicated by the position data) and may perform second preprocessing based on a second position of the device 110 relative to the user 5. Similarly, the device 110 may perform first preprocessing based on a first position of a sensor (e.g., indicated by the pose data) and may perform second preprocessing based on a second position of the sensor without departing from the disclosure.

Similarly, in some examples the device 110 may perform preprocessing based on posture data associated with the user 5. For example, the device 110 may perform first preprocessing when the user 5 is associated with first posture data (e.g., standing up) and may perform second preprocessing when the user 5 is associated with second posture data (e.g., sitting down). The type and amount of preprocessing may be determined based on the position data, the pose data, and/or the posture data without departing from the disclosure. For example, the device 110 may determine the amount of preprocessing based on a combination of the pose data (e.g., camera is retracted close to the device 110 or extended out from the device 110) and the posture data (e.g., user 5 is sitting down or standing up) without departing from the disclosure. Additionally or alternatively, in some examples the device 110 may reposition the camera(s) and/or the device 110 based on a combination of the pose data and the posture data. For example, the device 110 may generate posture data indicating that the user 5 is sitting down and may reposition the camera(s) relative to the device 110 based on the posture data (e.g., retract the camera towards the device 110). Alternatively, the device 110 may generate posture data indicating that the user 5 is standing up and may reposition the camera(s) relative to the device 110 based on the posture data (e.g., extend the camera away from the device 110).

Figure 13:
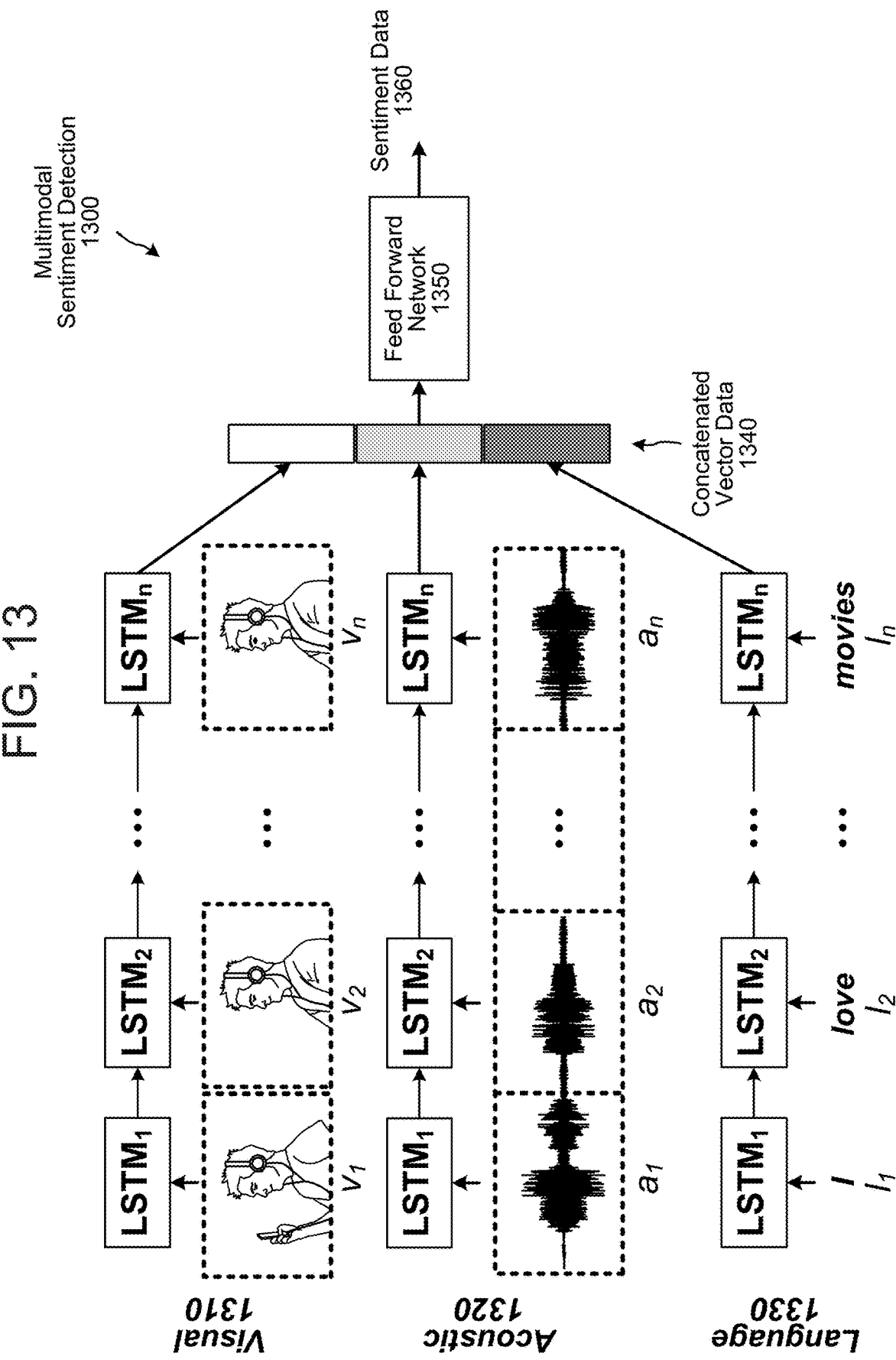
FIG. 13 illustrates an example of performing multimodal sentiment detection according to embodiments of the present disclosure.

FIG. 13 illustrates an example of performing multimodal sentiment detection according to embodiments of the present disclosure. As illustrated in FIG. 13, the device 110 may perform multimodal sentiment detection 1300 by separately processing visual data 1310, acoustic data 1320, and language data 1330 to generate concatenated vector data 1340, and then processing the concatenated vector data 1340 using a feed forward network 1350 to generate sentiment data 1360. Thus, the device 110 may determine high level features for the visual data 1310, the acoustic data 1320, and the language data 1330 and may input these high level features to the feed forward network 1350 for further processing. The feed forward network 1350 may correspond to a deep neural network (DNN) and/or other model that is configured to process the high level features while also training to improve future results.

In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. Any particular encoder may be configured to output vectors of the same size, thus ensuring a continuity of output encoded vector size from any particular encoder (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence.

In addition, an attention model can be used, which is another RNN or DNN that learns to "attract" attention to certain parts of the input. The attention model can be used in combination with the above methods of consuming the input.

As illustrated in FIG. 13, the device 110 may process the visual data 1310 using a first series of long short-term memory (LSTM) components that processes a first sequence of feature data values $v_1, \ldots v_2, \ldots v_n$ to generate first vector data. Similarly, the device 110 may process the acoustic data 1320 using a second series of LSTM components that processes a second sequence of feature sequence of feature data values $a_1, \ldots a_2, \ldots a_n$ to generate second vector data. Finally, the device 110 may process the language data 1330 using a third series of LSTM components that processes a third sequence of feature sequence of feature data values $w_1, \ldots w_2, \ldots w_n$ to generate third vector data.

The device 110 concatenates the first vector data, the second vector data, and the third vector data to generate the concatenated vector data 1340, which is then input to the feed forward network 1350 to generate the sentiment data 1360. For example, the feed forward network 1350 may classify the input data into one or more sentiment categories. Thus, the sentiment data 1360 may correspond to a first number of sentiment categories (e.g., angry, happy, sad, neutral, etc.), although the disclosure is not limited thereto. Additionally or alternatively, the sentiment data 1360 may correspond to a sentiment score within a first range (e.g., −3 to +3, although the disclosure is not limited thereto). For example, negative values may indicate an amount of negative sentiment, a zero value may indicate a neutral sentiment, and positive values may indicate an amount of positive sentiment (e.g., strong negative, weak negative, neutral, weak positive, strong positive), although the disclosure is not limited thereto. In some examples, the sentiment data 1360 may indicate one or more sentiment categories and may include a sentiment score associated with each utterance, although the disclosure is not limited thereto.

While FIG. 13 illustrates an example of the device 110 performing multimodal sentiment detection using language data 1330, the disclosure is not limited thereto and in some examples the device 110 may perform multimodal sentiment detection without the language data 1330 without departing from the disclosure.

Figure 14:
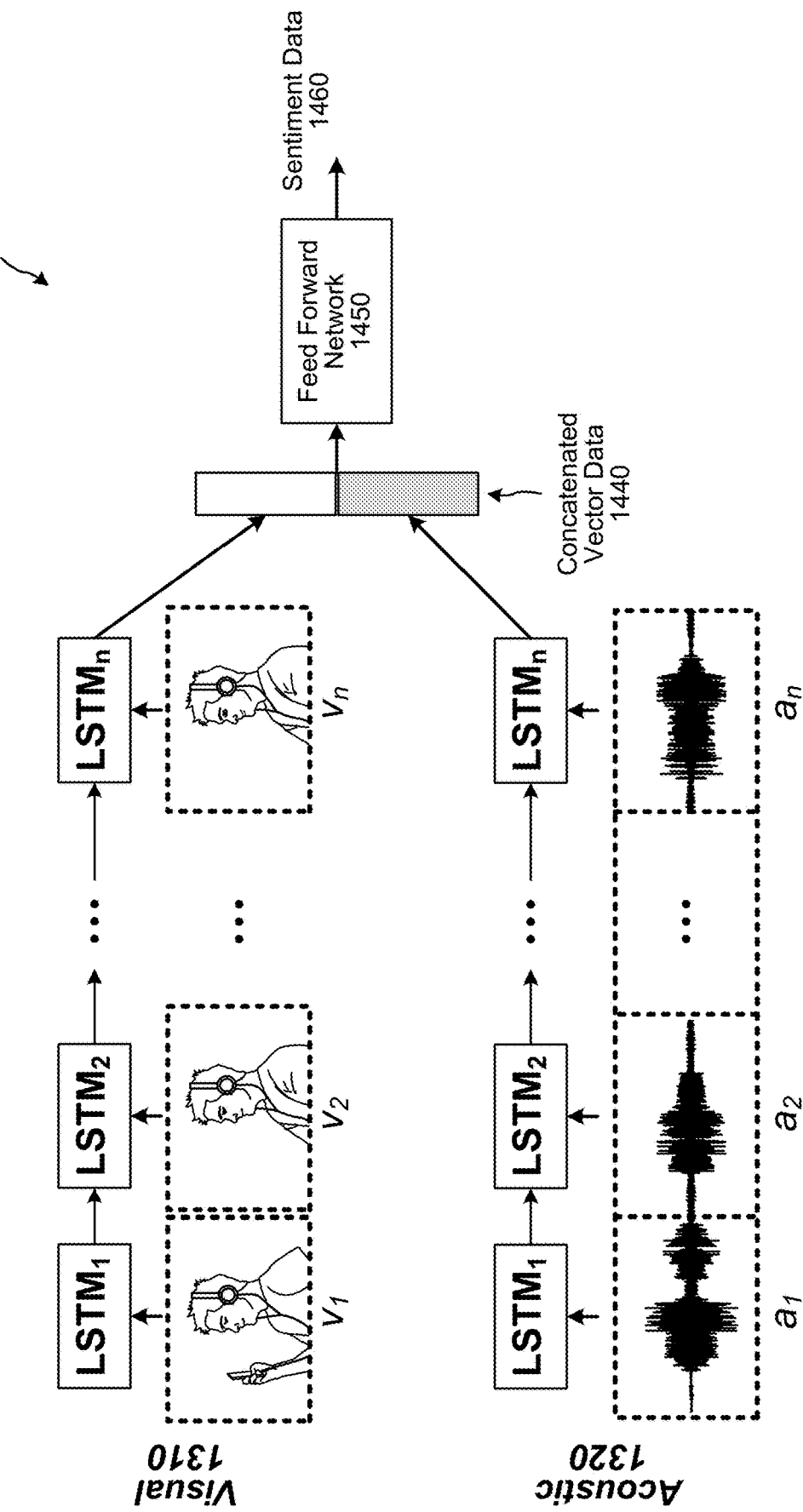
FIG. 14 illustrates an example of performing acoustic-visual sentiment detection according to embodiments of the present disclosure.

FIG. 14 illustrates an example of performing acoustic-visual sentiment detection according to embodiments of the present disclosure. As illustrated in FIG. 14, the device 110 may perform acoustic-visual sentiment detection 1400 by separately processing visual data 1410 and acoustic data 1420 to generate concatenated vector data 1440, and then processing the concatenated vector data 1440 using a feed forward network 1450 to generate sentiment data 1460. Thus, the device 110 may determine high level features for the visual data 1410 and the acoustic data 1420 and may input these high level features to the feed forward network 13D0 for further processing. The feed forward network 1450 may correspond to a deep neural network (DNN) and/or other model that is configured to process the high level features while also training to improve future results.

As illustrated in FIG. 14, the device 110 may process the visual data 1410 using a first series of long short-term memory (LSTM) components that processes a first sequence of feature data values $v_1, \ldots v_2, \ldots v_n$ to generate first vector data. Similarly, the device 110 may process the acoustic data 1420 using a second series of LSTM components that processes a second sequence of feature sequence of feature data values $a_1, \ldots a_2, \ldots a_n$ to generate second vector data.

The device 110 concatenates the first vector data and the second vector data to generate the concatenated vector data 1440, which is then input to the feed forward network 1450 to generate the sentiment data 1460. For example, the feed forward network 1450 may classify the input data into one or more sentiment categories. Thus, the sentiment data 1460 may correspond to a first number of sentiment categories (e.g., angry, happy, sad, neutral, etc.), although the disclosure is not limited thereto. Additionally or alternatively, the sentiment data 1460 may correspond to a sentiment score within a first range (e.g., −3 to +3, although the disclosure is not limited thereto). For example, negative values may indicate an amount of negative sentiment, a zero value may indicate a neutral sentiment, and positive values may indicate an amount of positive sentiment (e.g., strong negative, weak negative, neutral, weak positive, strong positive), although the disclosure is not limited thereto. In some examples, the sentiment data 1460 may indicate one or more sentiment categories and may include a sentiment score associated with each utterance, although the disclosure is not limited thereto.

Figure 15:
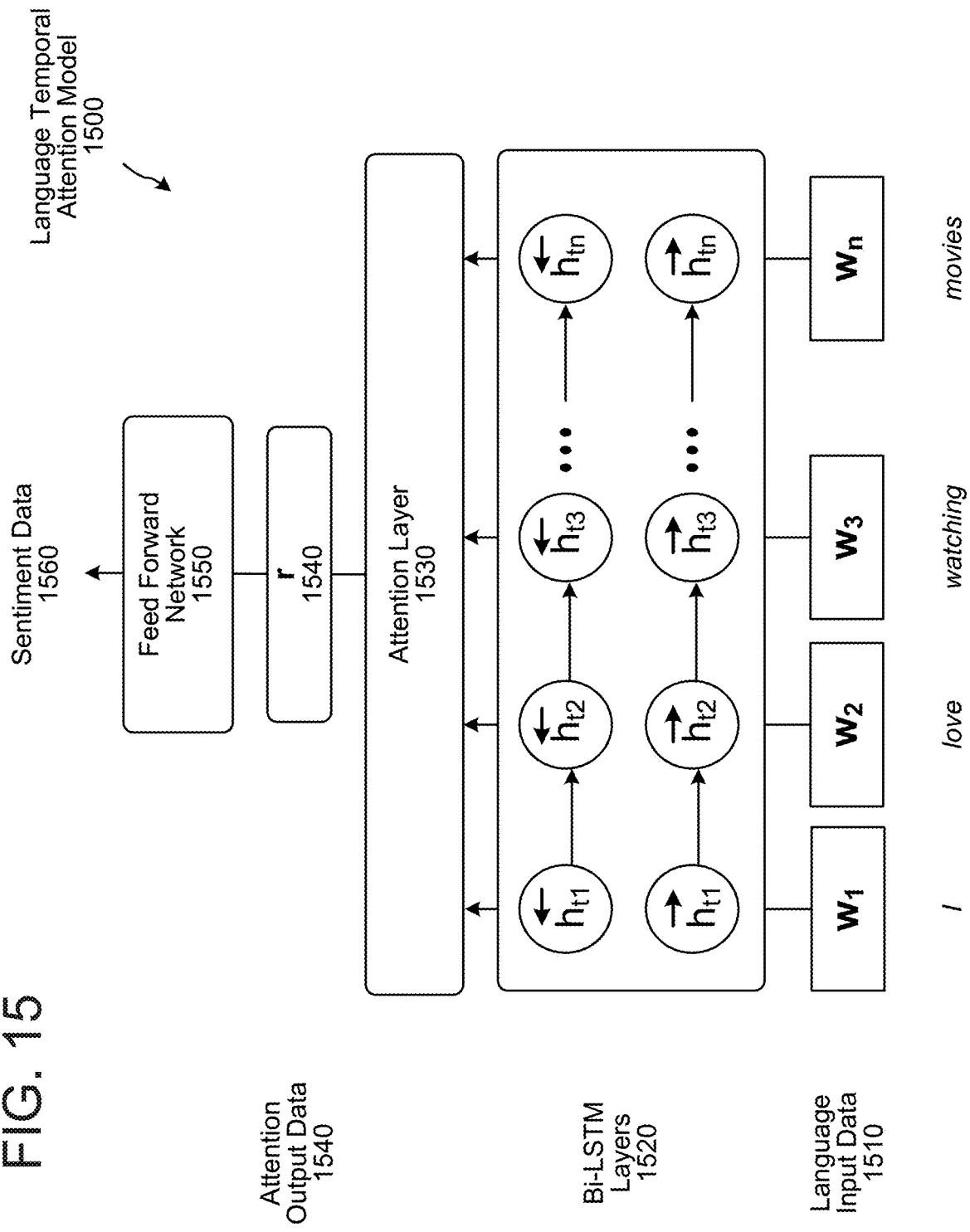
FIG. 15 illustrates an example of performing sentiment detection using a language temporal attention model according to embodiments of the present disclosure.

FIG. 15 illustrates an example of performing sentiment detection using a language temporal attention model according to embodiments of the present disclosure. As illustrated in FIG. 15, a language temporal attention model 1500 may process language input data 1510 (e.g., "I love watching movies") as a sequence of feature data values $w_1, \ldots w_2, \ldots w_n$. For example, FIG. 15 illustrates an example of processing the language input data 1510 using bi-directional long short-term memory (Bi-LSTM) layers 1520 (e.g., essentially the concatenation of a forward and a backward embedding).

The output of the Bi-LSTM layers 1520 may be fed into an attention layer 1530, which may be referred to as an attention model. The attention layer 1530 may be another RNN or DNN that learns to "attract" attention to certain parts of the input. Thus, the attention layer 1530 may emphasize certain portions of the language input data 1510 using attention vectors (e.g., attention weight values) as known to one of skill in the art.

The attention layer 1530 may be a neural network, for example a recurrent neural network, although the disclosure is not limited thereto. The attention layer 1530 may be configured to emphasize relevant portions of an input utterance. The attention layer 1530 may be configured to take in output data from the Bi-LSTM layers 1520 and produce an output for every time step (e.g., a 10 ms audio frame). The attention layer 1530 may be configured to aggregate information from different time intervals/audio frames of the input audio data to determine how certain parts of the utterance affects determining of the sentiment. For example, an acoustic representation of a first word in the utterance may indicate a high arousal implying anger, in which case the attention layer 1530 is configured to realize that the first word corresponds to an anger sentiment and that that should affect the processing of the other words in the utterance to ultimately determine a sentiment category corresponding to the utterance.

In some examples, the functionality described here of the Bi-LSTM layers 1520 and the attention layer 1530 may be performed by a trained model. That is, the Bi-LSTM layers 1520 and the attention layer 1530 may be part of the trained model without departing from the disclosure.

The output of the attention layer 1530 is represented in FIG. 15 as attention output data r 1540, which is input to a feed forward network 1550. The feed forward network 1550 may process the attention output data 1540 to generate sentiment data 1560, as described in greater detail above. For example, the feed forward network 1550 may classify the language input data 1510 into one or more sentiment categories. Thus, the sentiment data 1560 may correspond to a first number of sentiment categories (e.g., angry, happy, sad, neutral, etc.), although the disclosure is not limited thereto. Additionally or alternatively, the sentiment data 1560 may correspond to a sentiment score within a first range (e.g., −3 to +3, although the disclosure is not limited thereto). For example, negative values may indicate an amount of negative sentiment, a zero value may indicate a neutral sentiment, and positive values may indicate an amount of positive sentiment (e.g., strong negative, weak negative, neutral, weak positive, strong positive), although the disclosure is not limited thereto. In some examples, the sentiment data 1560 may indicate one or more sentiment categories and may include a sentiment score associated with each utterance, although the disclosure is not limited thereto.

In some examples, the attention output data r 1540 may correspond to a sentiment score calculated using the following equations:

$$r = \sum_i \alpha_i h_i \qquad [1]$$

$$\alpha_i = \frac{\exp(\text{score}(h_i))}{\sum_{i'} \exp(\text{score}(h_{i'}))} \qquad [2]$$

$$\text{score}(h_i) = v^T \tanh(W_a h_i + b_a) \qquad [3]$$

Thus, in some examples the attention layer 1530 may output a score indicating a likelihood of the utterance corresponding to a sentiment category. The attention layer 1530 may output model output data including an indicator of a sentiment or a N-best list of scores and corresponding sentiment category. The sentiment detection component 275 may predict from multiple sentiment categories, including but not limited to, happiness, sadness, anger and neutral. In some examples, the sentiment category may be determined after score(s) have been determined for a particular period of time of input audio data. In an example embodiment, the sentiment categories may be broad such as positive, neutral, and negative or may be more precise such as angry, happy, distressed, surprised, disgust, or the like.

Figure 16:
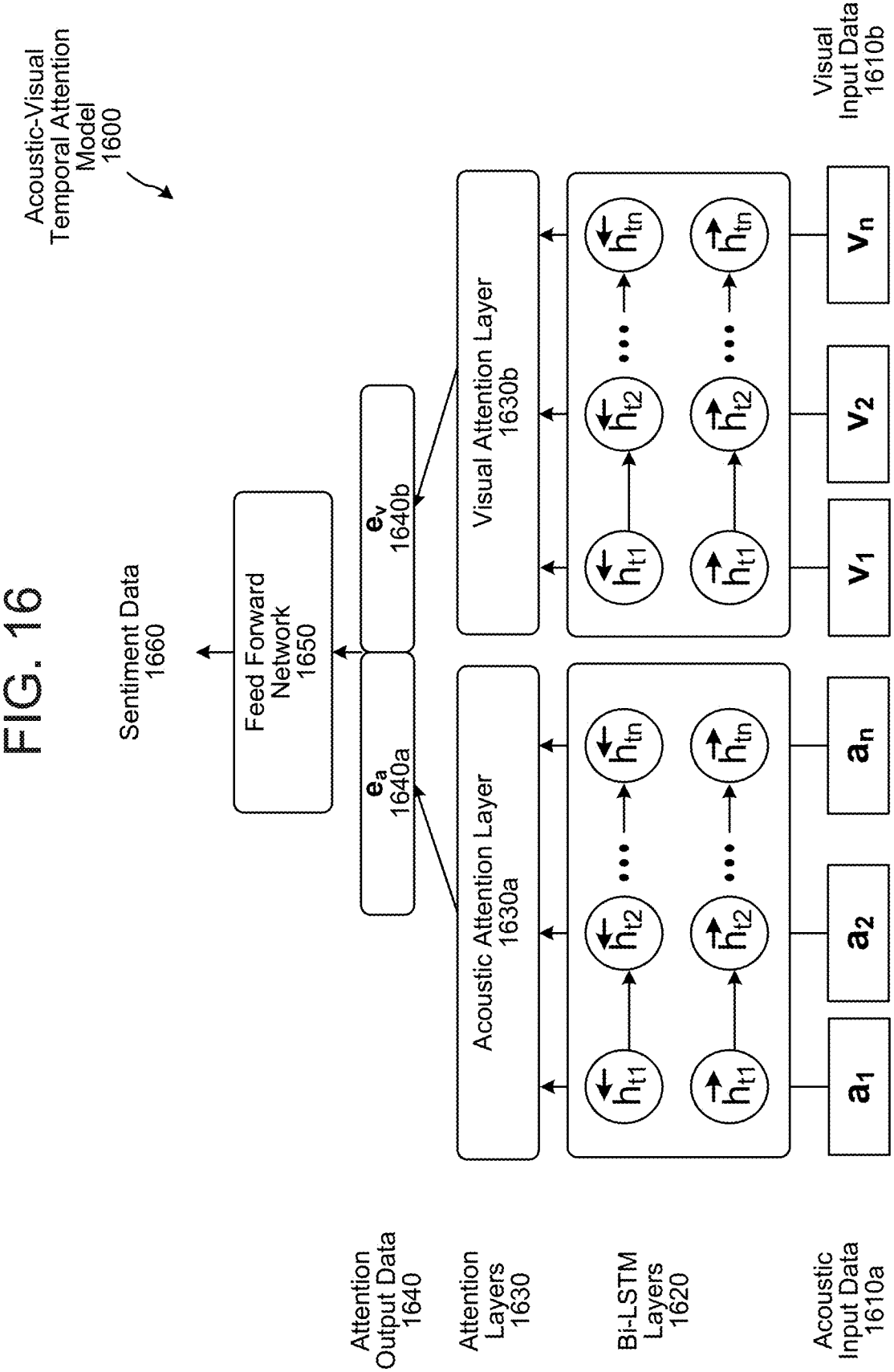
FIG. 16 illustrates an example of performing sentiment detection using an acoustic-visual temporal attention model according to embodiments of the present disclosure.

FIG. 16 illustrates an example of performing sentiment detection using an acoustic-visual temporal attention model according to embodiments of the present disclosure. As illustrated in FIG. 16, an acoustic-visual temporal attention model 1600 may perform multimodal sentiment detection using a combination of audio data (e.g., acoustic input) and image data (e.g., visual input). For example, first attention output data 1640a corresponding to the audio data and second attention output data 1640b corresponding to the image data may be input to a feed forward network 1650 and the feed forward network 1650 may perform sentiment detection using both the acoustic input and the visual input to generate sentiment data 1660. Thus, the feed forward network 1650 may perform cross-modal sentiment detection using multiple modalities.

The individual components illustrated in FIG. 16 may be similar to the components described above with regard to the language temporal attention model 1500 illustrated in FIG. 15. For example, the acoustic-visual temporal attention model 1600 may include Bi-LSTM layers 1620 that process input data 1610, attention layers 1630 that generate attention output data 1640, and a feed forward network 1650 that generates sentiment data 1660. However, the acoustic-visual temporal attention model 1600 may process acoustic input data 1610a and visual input data 1610b differently than the language input data 1510 described above.

As illustrated in FIG. 16, the acoustic-visual temporal attention model 1600 may include separate Bi-LSTM layers 1620 and attention layers 1630 for each type of input. For example, acoustic input data 1610a may be input to first Bi-LSTM layers 1620a and an acoustic attention layer 1630a to generate acoustic attention output data 1640a. Similarly, visual input data 1610b may be input to second Bi-LSTM layers 1620b and a visual attention layer 1630b to generate visual attention output data 1640b.

The acoustic-visual temporal attention model 1600 may process the acoustic input data 1610a (e.g., audio data) as a sequence of feature data values $(a_1, a_2, \ldots, a_n)$. For example, FIG. 16 illustrates a$_n$ example of processing the acoustic input data 1610a using the first bi-directional long short-term memory (Bi-LSTM) layers 1620a (e.g., essentially the concatenation of a forward and a backward embedding), although the disclosure is not limited thereto. The output of the first Bi-LSTM layers 1620a may be fed into the acoustic attention layer 1630a, which may be referred to as a first attention model. The acoustic attention layer 1630a may be another RNN or DNN that learns to "attract" attention to certain parts of the input. Thus, the acoustic attention layer 1630a may emphasize certain portions of the acoustic input data 1610a using attention vectors (e.g., attention weight values) as known to one of skill in the art. The acoustic attention layer 1630a may generate the acoustic attention output data 1640a, which is input to the feed forward network 1650.

The acoustic-visual temporal attention model 1600 may process the visual input data 1610b (e.g., image data) as a sequence of feature data values $(v_1, v_2, \ldots v_n)$. For example, FIG. 16 illustrates an example of processing the visual input data 1610b using the second Bi-LSTM layers 1620b (e.g., essentially the concatenation of a forward and a backward embedding), although the disclosure is not limited thereto. The output of the second Bi-LSTM layers 1620b may be fed into the visual attention layer 1630b, which may be referred to as a second attention model. The visual attention layer 1630b may be another RNN or DNN that learns to "attract" attention to certain parts of the input. Thus, the visual attention layer 1630b may emphasize certain portions of the visual input data 1610b using attention vectors (e.g., attention weight values) as known to one of skill in the art. The visual attention layer 1630b may generate the visual attention output data 1640b, which is input to the feed forward network 1650.

The feed forward network 1650 processes the acoustic attention output data 1640a and the visual attention output data 1640b to generate the sentiment data 1660, as described in greater detail above. For example, the feed forward network 1650 may classify the input data 1610 into one or more sentiment categories. Thus, the sentiment data 1660 may correspond to a first number of sentiment categories (e.g., angry, happy, sad, neutral, etc.), although the disclosure is not limited thereto. Additionally or alternatively, the sentiment data 1660 may correspond to a sentiment score within a first range (e.g., −3 to +3, although the disclosure is not limited thereto). For example, negative values may indicate an amount of negative sentiment, a zero value may indicate a neutral sentiment, and positive values may indicate an amount of positive sentiment (e.g., strong negative, weak negative, neutral, weak positive, strong positive), although the disclosure is not limited thereto. In some examples, the sentiment data 1660 may indicate one or more sentiment categories and may include a sentiment score associated with each utterance, although the disclosure is not limited thereto.

While not illustrated in FIG. 16, the feed forward network 1650 may receive additional input data and may use the additional input data to generate the sentiment data 1660. For example, the user recognition component 295 may generate user recognition data 695 and may input the user recognition data 695 to the feed forward network 1650. Thus, the feed forward network 1650 may generate the sentiment data 1660 in part based on the user indicated by the user recognition data 695. However, the disclosure is not limited thereto, and in other examples the feed forward network 1650 may use the user recognition data 695 to select a model associated with the individual user. For example, the feed forward network 1650 may include multiple models, with an individual model corresponding to an individual user, and may use the user recognition data 695 to select between the multiple models without departing from the disclosure.

Additionally or alternatively, the feed forward network 1650 may receive additional input data such as the user satisfaction data 855 output by the satisfaction estimator 850 without departing from the disclosure. Thus, the satisfaction estimator 850 may process a plurality of input data, as described in greater detail above with regard to FIG. 8, and generate the user satisfaction data 855 (e.g., estimate of overall user satisfaction), which may be input to the feed forward network 1650 and used to generate the sentiment data 1660 (e.g., indication of the user's current sentiment). However, the disclosure is not limited thereto and in other examples the feed forward network 1650 may correspond to the satisfaction estimator 850 and the user satisfaction data 855 may correspond to the sentiment data 1660 without departing from the disclosure. For example, the feed forward network 1650 may process at least a portion of the plurality of input data illustrated in FIG. 8 along with the attention output data 1640 illustrated in FIG. 16 without departing from the disclosure.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 17:
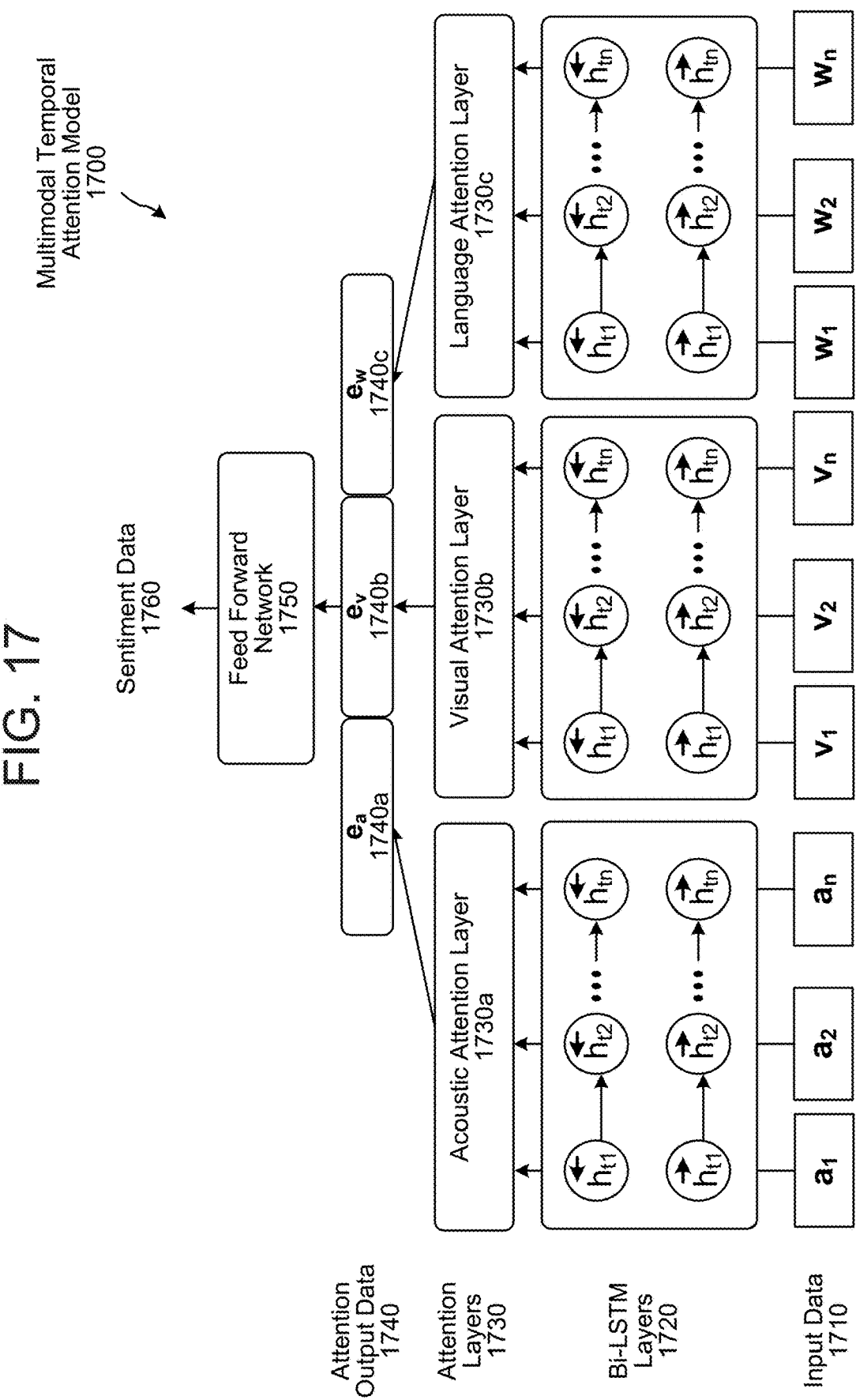
FIG. 17 illustrates an example of performing sentiment detection using a multimodal temporal attention model according to embodiments of the present disclosure.

FIG. 17 illustrates an example of performing sentiment detection using a multimodal temporal attention model according to embodiments of the present disclosure. As illustrated in FIG. 17, a multimodal temporal attention model 1700 may extend the acoustic-visual temporal attention model 1600 to also process language input. Thus, the multimodal temporal attention model 1700 may perform multimodal sentiment detection using a combination of the audio data (e.g., acoustic input) and the image data (e.g., visual input) described above, along with language data (e.g., lexical input). For example, first attention output data 1740a corresponding to the audio data, second attention output data 1740b corresponding to the image data, and third attention output data 1740c corresponding to the language data may be input to a feed forward network 1750 and the feed forward network 1750 may perform sentiment detection to generate sentiment data 1760. Thus, the feed forward network 1750 may perform cross-modal sentiment detection using multiple modalities.

The individual components illustrated in FIG. 17 may be similar to the components described above with regard to the language temporal attention model 1500 illustrated in FIG. 15 and/or the acoustic-visual temporal attention model 1600 illustrated in FIG. 16. For example, the multimodal temporal attention model 1700 may include Bi-LSTM layers 1720 that process input data 1710, attention layers 1730 that generate attention output data 1740, and a feed forward network 1750 that generates sentiment data 1760. However, the multimodal temporal attention model 1700 may process acoustic input data 1710a, visual input data 1710b, and language input data 1710c.

As illustrated in FIG. 17, the multimodal temporal attention model 1700 may include separate Bi-LSTM layers 1720 and attention layers 1730 for each type of input. For example, acoustic input data 1710a (e.g., $a_1, a_2, \ldots, a_n$) may be input to first Bi-LSTM layers 1720a and an acoustic attention layer 1730a to generate acoustic attention output data 1740a. Similarly, visual input data 1710b (e.g., $v_1, v_2, \ldots, v_n$) may be input to second Bi-LSTM layers 1720b and a visual attention layer 1730b to generate visual attention output data 1740b. Finally, language input data 1710c (e.g., $w_1, w_2, \ldots, w_n$) may be input to third Bi-LSTM layers 1720c and a language attention layer 1730c to generate language attention output data 1740c.

The multimodal temporal attention model 1700 may process the acoustic input data 1710a (e.g., audio data) as a sequence of feature data values ($a_1, a_2, \ldots, a_n$). For example, FIG. 17 illustrates an example of processing the acoustic input data 1710a using the first bi-directional long short-term memory (Bi-LSTM) layers 1720a (e.g., essentially the concatenation of a forward and a backward embedding), although the disclosure is not limited thereto. The output of the first Bi-LSTM layers 1720a may be fed into the acoustic attention layer 1730a, which may be referred to as a first attention model. The acoustic attention layer 1730a may be another RNN or DNN that learns to "attract" attention to certain parts of the input. Thus, the acoustic attention layer 1730a may emphasize certain portions of the acoustic input data 1710a using attention vectors (e.g., attention weight values) as known to one of skill in the art. The acoustic attention layer 1730a may generate the acoustic attention output data 1740a, which is input to the feed forward network 1750.

The multimodal temporal attention model 1700 may process the visual input data 1710b (e.g., image data) as a sequence of feature data values ($v_1, v_2, \ldots, v_n$). For example, FIG. 17 illustrates an example of processing the visual input data 1710b using the second Bi-LSTM layers 1720b (e.g., essentially the concatenation of a forward and a backward embedding), although the disclosure is not limited thereto. The output of the second Bi-LSTM layers 1720b may be fed into the visual attention layer 1730b, which may be referred to as a second attention model. The visual attention layer 1730b may be another RNN or DNN that learns to "attract" attention to certain parts of the input. Thus, the visual attention layer 1730b may emphasize certain portions of the visual input data 1710b using attention vectors (e.g., attention weight values) as known to one of skill in the art. The visual attention layer 1730b may generate the visual attention output data 1740b, which is input to the feed forward network 1750.

The multimodal temporal attention model 1700 may process the language input data 1710c (e.g., lexical data) as a sequence of feature data values ($w_1, w_2, \ldots, w_n$). For example, FIG. 17 illustrates an example of processing the language input data 1710c using the third Bi-LSTM layers 1720c (e.g., essentially the concatenation of a forward and a backward embedding), although the disclosure is not limited thereto. The output of the third Bi-LSTM layers 1720c may be fed into the language attention layer 1730c, which may be referred to as a third attention model. The language attention layer 1730c may be another RNN or DNN that learns to "attract" attention to certain parts of the input. Thus, the language attention layer 1730c may emphasize certain portions of the language input data 1710c using attention vectors (e.g., attention weight values) as known to one of skill in the art. The language attention layer 1730c may generate the language attention output data 1740c, which is input to the feed forward network 1750.

In some examples, the device 110 may generate the language input data 1710c by performing speech processing on the acoustic input data 1710a (e.g., input audio data) using a speech processing component (e.g., speech processing component 240). However, the disclosure is not limited thereto, and in other examples the system(s) 120 may generate the language input data 1710c by performing speech processing on the acoustic input data 1710a and the device 110 may receive the language input data 1710c from the system(s) 120 without departing from the disclosure. As described above, the language input data 1710c may correspond to text data that includes text representing speech contained in the acoustic input data 1710a. However, the disclosure is not limited thereto and the language input data 1710c may also correspond to token data that includes tokens that represent sounds, words, phrases, and/or the like corresponding to the speech. Thus, the language input data 1710c may correspond to text data, token data, and/or other data known to one of skill in the art without departing from the disclosure.

The feed forward network 1750 processes the acoustic attention output data 1740a, the visual attention output data 1740b, and the language attention output data 1740c to generate the sentiment data 1760, as described in greater detail above. For example, the feed forward network 1750 may classify the input data 1710 into one or more sentiment categories. Thus, the sentiment data 1760 may correspond to a first number of sentiment categories (e.g., angry, happy, sad, neutral, etc.), although the disclosure is not limited thereto. Additionally or alternatively, the sentiment data 1760 may correspond to a sentiment score within a first range (e.g., −3 to +3, although the disclosure is not limited thereto). For example, negative values may indicate an amount of negative sentiment, a zero value may indicate a neutral sentiment, and positive values may indicate an amount of positive sentiment (e.g., strong negative, weak negative, neutral, weak positive, strong positive), although the disclosure is not limited thereto. In some examples, the sentiment data 1760 may indicate one or more sentiment categories and may include a sentiment score associated with each utterance, although the disclosure is not limited thereto.

While not illustrated in FIG. 17, the feed forward network 1750 may receive additional input data and may use the additional input data to generate the sentiment data 1760. For example, the user recognition component 295 may generate user recognition data 695 and may input the user recognition data 695 to the feed forward network 1750. Thus, the feed forward network 1750 may generate the sentiment data 1760 in part based on the user indicated by the user recognition data 695. However, the disclosure is not limited thereto, and in other examples the feed forward network 1750 may use the user recognition data 695 to select a model associated with the individual user. For example, the feed forward network 1750 may include multiple models, with an individual model corresponding to an individual user, and may use the user recognition data 695 to select between the multiple models without departing from the disclosure.

Additionally or alternatively, the feed forward network 1750 may receive additional input data such as the user satisfaction data 855 output by the satisfaction estimator 850 without departing from the disclosure. Thus, the satisfaction estimator 850 may process a plurality of input data, as described in greater detail above with regard to FIG. 8, and generate the user satisfaction data 855 (e.g., estimate of overall user satisfaction), which may be input to the feed forward network 1750 and used to generate the sentiment data 1760 (e.g., indication of the user's current sentiment). However, the disclosure is not limited thereto and in other examples the feed forward network 1750 may correspond to the satisfaction estimator 850 and the user satisfaction data 855 may correspond to the sentiment data 1760 without departing from the disclosure. For example, the feed forward network 1750 may process at least a portion of the plurality of input data illustrated in FIG. 8 along with the attention output data 1740 illustrated in FIG. 17 without departing from the disclosure.

Figure 18:
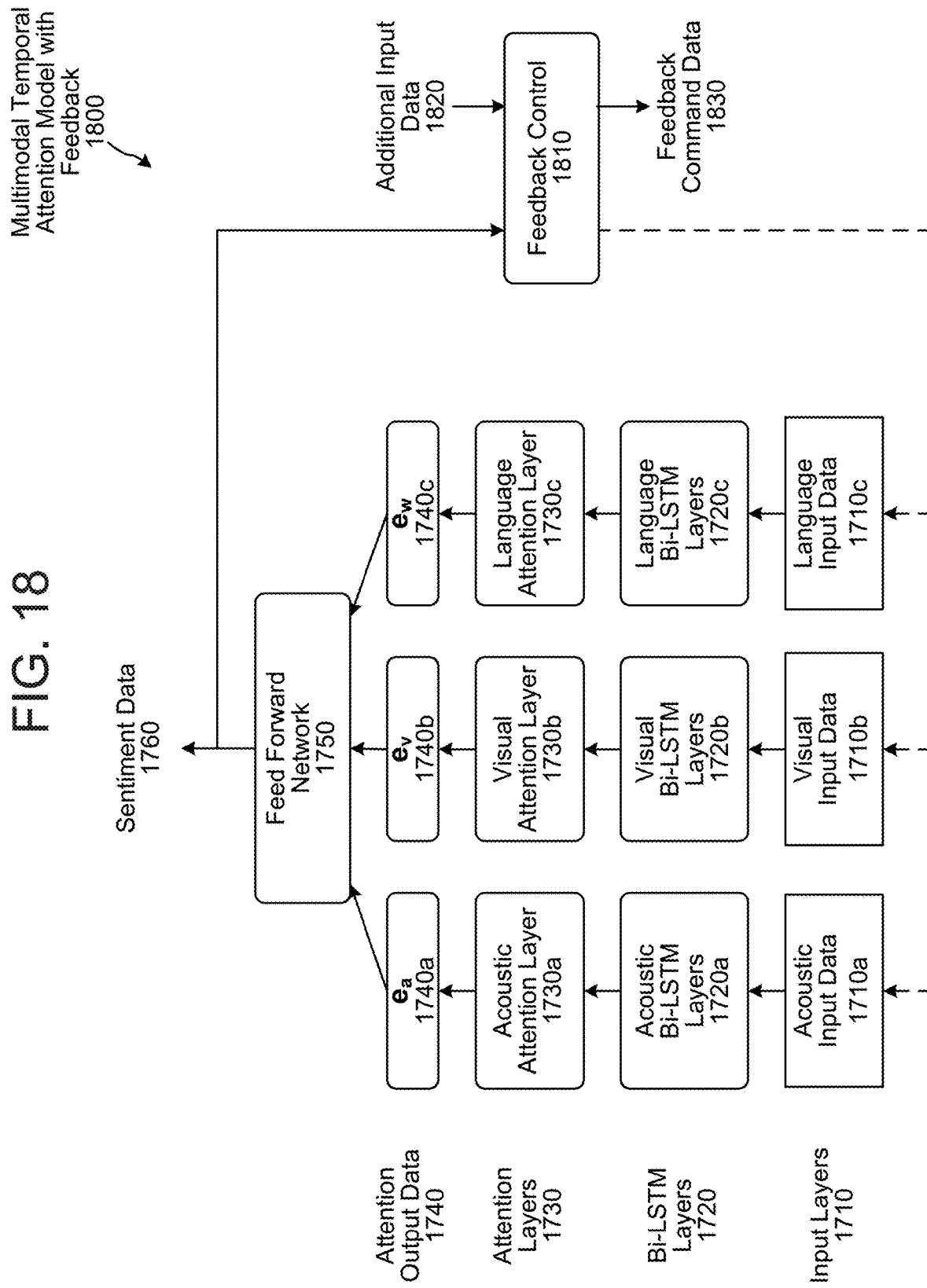
FIG. 18 illustrates an example of performing sentiment detection using a multimodal temporal attention model with feedback control according to embodiments of the present disclosure.

FIG. 18 illustrates an example of performing sentiment detection using a multimodal temporal attention model with feedback control according to embodiments of the present disclosure. As illustrated in FIG. 18, a multimodal temporal attention model with feedback 1800 includes all of the components illustrated in FIG. 17 as well as feedback control component 1810. As the components illustrated in FIG. 17 are described in detail above, a redundant description is omitted.

While FIG. 18 illustrates the multimodal temporal attention model with feedback 1800 including acoustic input data 1710a, visual input data 1710b, and language input data 1710c, the disclosure is not limited thereto and the multimodal temporal attention model with feedback 1800 may omit the language input data 1710c without departing from the disclosure. For example, the multimodal temporal attention model with feedback 1800 may add the feedback control component 1810 to the acoustic-visual temporal attention model 1600 described above with regard to FIG. 17 without departing from the disclosure.

The feedback control component 1810 may be configured to analyze the sentiment data 1760 and/or additional input data 1820 and generate feedback command data 1830 controlling the device 110 and/or sensor(s) of the device 110. For example, the feedback control component 1810 may generate feedback command data 1830 instructing the device 110 to move to a different location and/or to reposition the sensor(s) to improve sentiment detection. After moving/repositioning, the device 110 may generate updated input data 1710 and determine updated sentiment data 1760 based on the updated input data 1710.

While the feedback control component 1810 generates feedback command data 1830 corresponding to commands sent to one or more components of the device 110 to reposition the device 110 (e.g., control movement of the device 110) and/or to reposition sensor(s) of the device 110 (e.g., control movement of one or more sensor(s), such as extending or retracting the mast 356 associated with the camera 316), FIG. 18 illustrates a feedback loop using dashed lines extending from the feedback control component 1810 to the input layers 1710. For example, the feedback command data 1830 causes the device 110 to reposition itself and/or sensor(s) of the device 110 and generate updated input data 1710, such that the updated input data 1710 is different than the previous input data 1710 generated prior to the feedback command data 1830.

The additional input data 1820 may correspond to audio data (e.g., acoustic input data 1710a), image data (e.g., visual input data 1710b), lexical data (e.g., language input data 1710c), position data (e.g., location of the device 110, position of the device 110 relative to the user 5, etc.), pose data (e.g., current position of one or more sensors), quality data (e.g., quality score(s) associated with the input data 1710), confidence data (e.g., confidence score(s) associated with the input data 1710 and/or the sentiment data 1760), computer vision data (e.g., output generated by performing computer vision processing and/or the like), other information, and/or a combination thereof without departing from the disclosure.

In some examples, the feedback control component 1810 may process the input data 1710 to generate at least a portion of the quality data, confidence data, computer vision data, other information, and/or the like. However, the disclosure is not limited thereto, and in other examples separate component(s) (not illustrated) may process the input data 1710 to generate at least a portion of the quality data, confidence data, computer vision data, other information, and/or the like, such that the feedback control component 1810 receives this information as part of the additional input data 1820.

The device 110 may determine the quality data based on the acoustic input data 1710a, the visual input data 1710b, and/or the language input data 1710c. For example, the device 110 may determine an audio quality score (e.g., signal to noise ratio (SNR), signal to interference plus noise ratio (SINK), etc.) associated with the acoustic input data 1710a. Similarly, the device 110 may determine an image quality score (e.g., mean square error (MSE), peak signal to noise ratio (PSNR), structural similarity (SSIM), etc.) associated with the visual input data 1710b. Finally, the device 110 may determine a language interpretation quality (e.g., ASR confidence value(s), NLU confidence value(s), etc.) associated with the language input data 1710c.

The device 110 may determine the confidence data based on the acoustic input data 1710a, the visual input data 1710b, the language input data 1710c, and/or the sentiment data 1760. For example, the device 110 may process the acoustic input data 1710a to generate the ASR confidence value(s) and/or the NLU confidence value(s). Similarly, the device 110 may process the visual input data 1710b to generate a confidence value associated with facial recognition and/or the like. In some examples, the device 110 may determine an emotion confidence score associated with the acoustic attention output data 1740*a*, the visual attention output data 1740*b*, and/or the language attention output data 1740*c*. Additionally or alternatively, the device 110 may determine a confidence score associated with the sentiment data 1760 without departing from the disclosure.

The device 110 may determine the computer vision data by performing computer vision processing on the visual input data 1710*b*. For example, the device 110 may perform facial recognition, posture recognition, and/or the like, although the disclosure is not limited thereto.

The device 110 may determine position data indicating a location of the device 110 (e.g., coordinates associated with an exact location of the device 110), a position of the device 110 relative to the environment (e.g., relative coordinates) and/or the user 5 (e.g., direction and distance), and/or the like. The device 110 may determine the position data using sensor data (e.g., location data or movement data generated by sensor(s) of the device 110), the acoustic input data 1710*a*, the visual input data 1710*b*, the computer vision data, audio signal processing (e.g., beamforming), and/or other techniques known to one of skill in the art.

The device 110 may determine the pose data (e.g., current position of one or more sensors) based on controls associated with the sensor(s) and/or by processing the acoustic input data 1710*a* and/or the visual input data 1710*b*. In some examples, the pose data may indicate the current position of a sensor relative to the device 110, such as coordinates of the sensor relative to a fixed position on the device 110 using a three dimensional coordinate system. In other examples, the pose data may indicate the current position of the sensor relative to the device 110 using other techniques known to one of skill in the art, such as a height of the sensor, a length of extension associated with the sensor, and/or the like. Additionally or alternatively, the pose data may indicate the current position of the sensor relative to the user 5. For example, the pose data may indicate a current perspective of the user 5, a distance to the user 5, and/or the like without departing from the disclosure.

Figure 19A:
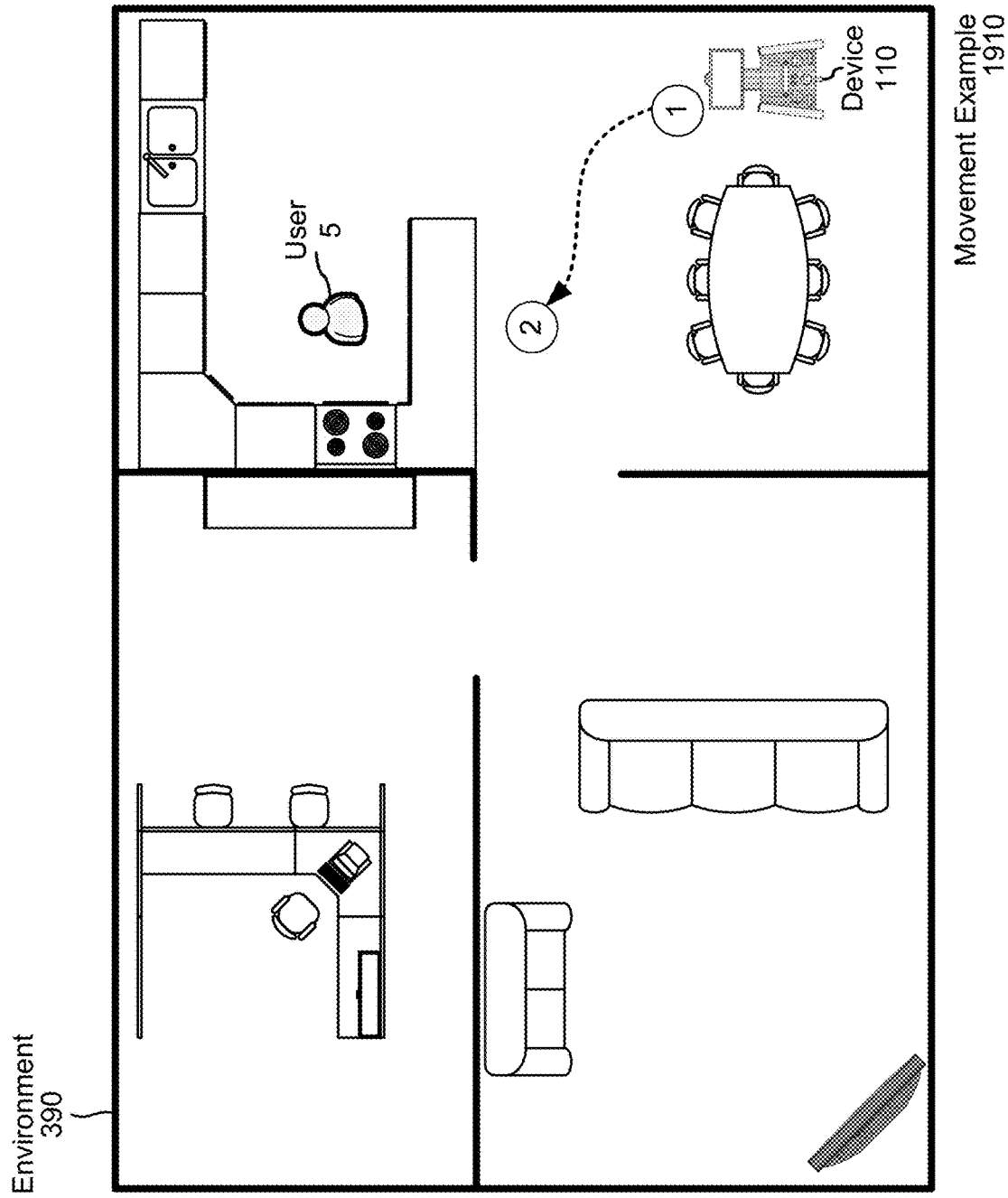
FIGS. 19A-19C illustrate examples of repositioning the device based on feedback control according to embodiments of the present disclosure.
Figure 19B:
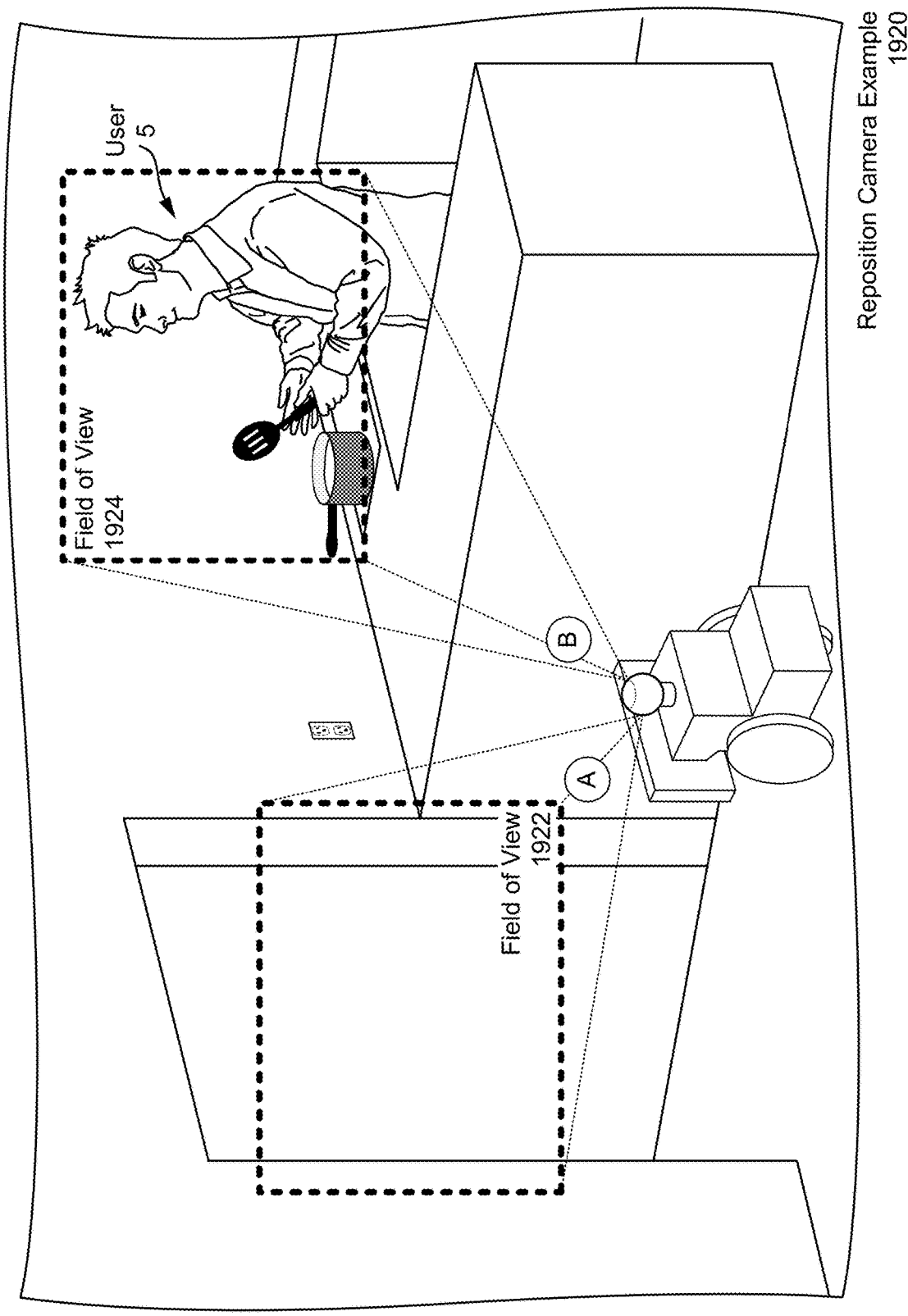
Figure 19C:
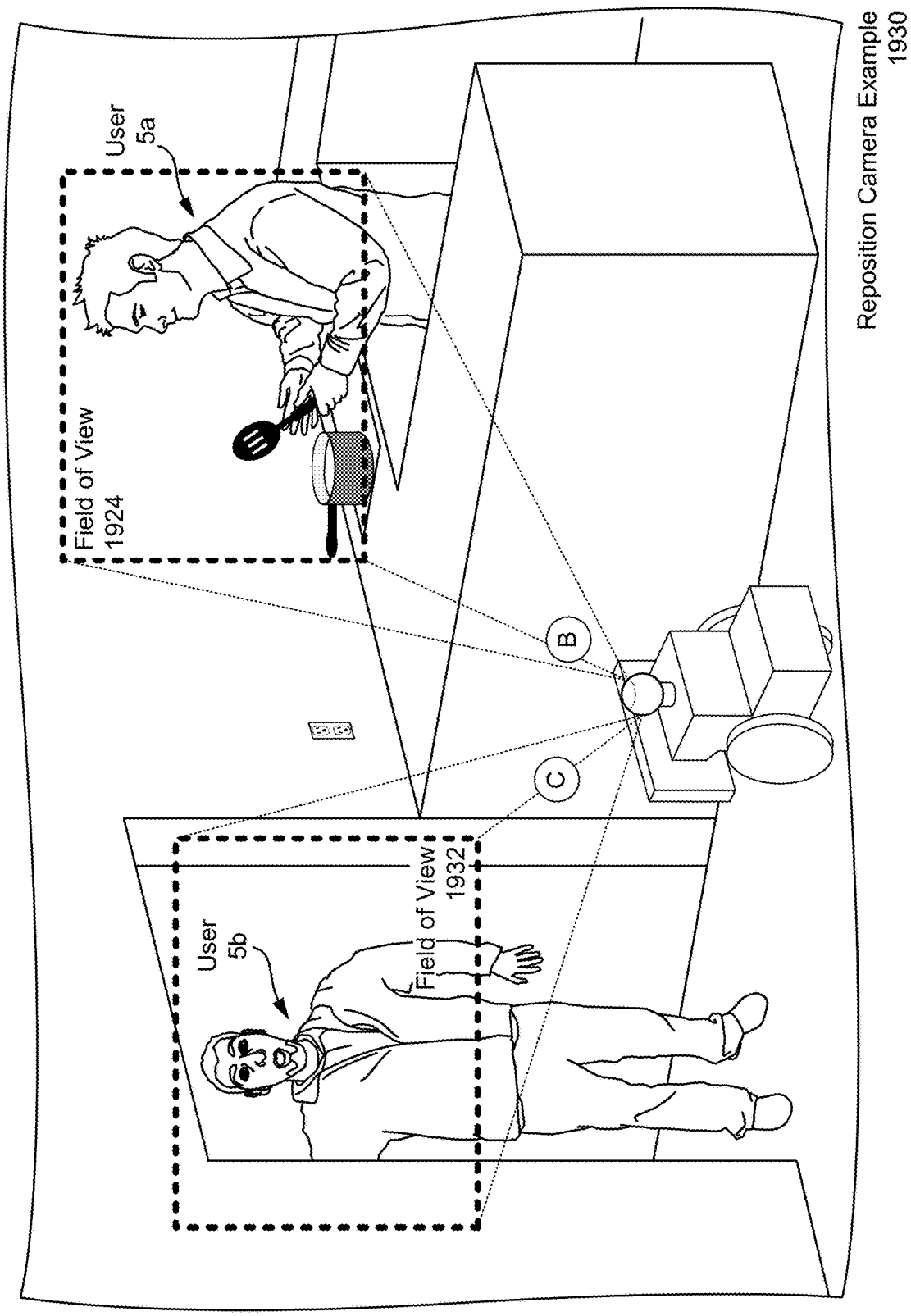

FIGS. 19A-19C illustrate examples of repositioning the device based on feedback control according to embodiments of the present disclosure. In some examples, the feedback command data 1830 may cause the device 110 to reposition itself from a first location to a second location. FIG. 19A illustrates a movement example 1910 in which the device 110 moves from a first location ("1") to a second location ("2") that is closer to the user 5. As described in greater detail below with regard to FIG. 22, the device 110 may determine to move to the second location based on a distance to the user 5 (e.g., distance exceeds a threshold), the user 5 not being represented in the visual input data 1710*b* (e.g., user 5 outside a field of view of the device 110), an audio quality (e.g., presence of audio interference or noise, low quality associated with user speech, etc.), an image quality (e.g., poor lighting, visual obstacles, etc.), and/or the like.

In some examples, the feedback command data 1830 may cause the device 110 to reposition a sensor of the device 110. FIG. 19B illustrates a reposition camera example 1920 in which the device 110 moves the camera 316 from a first position ("A") associated with a first field of view 1922 to a second position ("B") that is associated with a second field of view 1924. As illustrated in FIG. 19B, the user 5 is represented in the second field of view 1924. As described in greater detail below with regard to FIG. 22, the device 110 may determine to reposition the camera 316 because a portion of the user 5 is not represented in the visual input data 1710*b*, because the user's face is not represented in the visual input data 1710*b*, and/or the like.

FIG. 19C illustrates a reposition camera example 1930 in which the device 110 moves the camera 316 from the second position ("B") associated with the second field of view 1924 to a third position ("C") that is associated with a third field of view 1932. As illustrated in FIG. 19C, a first user 5*a* is represented in the second field of view 1924 while a second user 5*b* is represented in the third field of view 1932. In some examples, the device 110 may reposition the camera 316 to the third position ("C") after detecting speech associated with the second user 5*b*, although the disclosure is not limited thereto.

Figure 20:
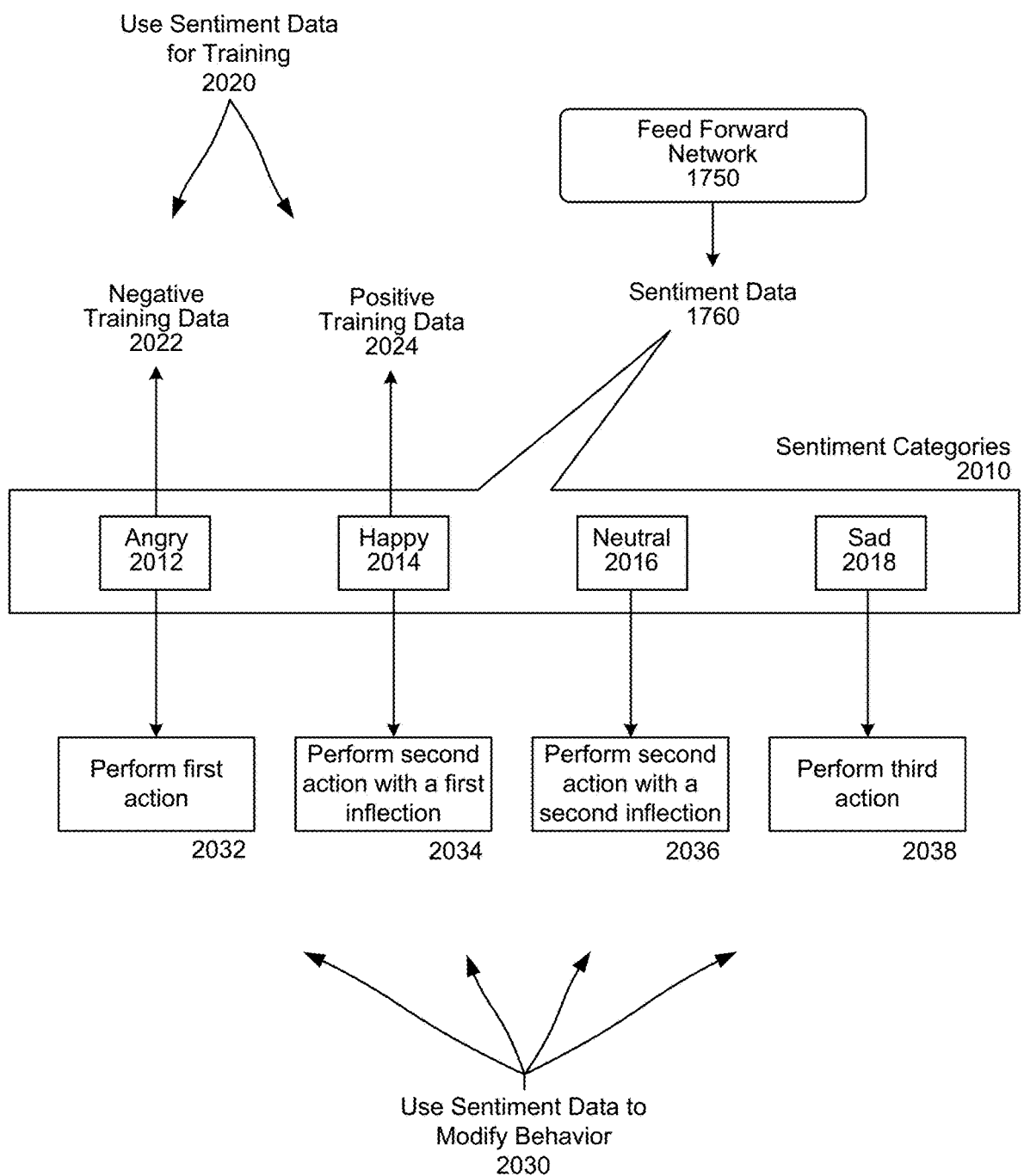
FIG. 20 illustrates examples of processing sentiment data to improve a behavior of the device according to embodiments of the present disclosure.

FIG. 20 illustrates examples of processing sentiment data to improve a behavior of the device according to embodiments of the present disclosure. As illustrated in FIG. 20, the device 110 may use the sentiment data 1760 to improve a behavior of the device 110. For example, the device 110 may use the sentiment data for training 2020 and/or may use the sentiment data to modify behavior 2030 without departing from the disclosure.

As described above, in some examples the sentiment data 1760 may correspond to two or more sentiment categories 2010. FIG. 20 illustrates an example in which the sentiment categories 2010 include a first category (e.g., angry) 2012, a second category (e.g., happy) 2014, a third category (e.g., neutral) 2016, and a fourth category (e.g., sad) 2018. However the disclosure is not limited thereto and the sentiment categories 2010 may include additional categories and/or omit some of the categories without departing from the disclosure.

The device 110 may use the sentiment data for training 2020 by generating negative training data 2022 and positive training data 2024. In the example illustrated in FIG. 20, the device 110 associates the first category (e.g., angry) 2012 with negative training data 2022, such that the device 110 may train a machine learning model to avoid conditions associated with the first category (e.g., user appears to be upset). Similarly, the device 110 associates the second category (e.g., happy) 2014 with positive training data 2024, such that the device 110 may train the machine learning model to seek conditions associated with the second category (e.g., user appears to be happy).

While not illustrated in FIG. 20, in some examples the device 110 may distinguish universal sentiment (e.g., user's emotional state in general) with device-directed sentiment (e.g., user's emotional state directed at the device 110). For example, the device 110 may determine that the user 5 appears to be upset (e.g., first category 2012), but it is not directed at the device 110. Similarly, the device 110 may determine that the user 5 appears to be happy (e.g., second category 2014), but it is not directed at the device 110. Additionally or alternatively, the device 110 may determine that the user 5 appears to be upset (e.g., first category 2012) and this anger is directed at the device 110. Similarly, the device 110 may determine that the user 5 appears to be happy (e.g., second category 2014) and this happiness is directed at the device 110. In some examples, the device 110 may only generate negative training data 2022 and/or positive training data 2024 based on the device-directed sentiment (e.g., when the user's happiness/anger is directed specifically to the device 110).

In some examples, the device 110 may use the sentiment data to modify behavior 2030 of the device 110. For example, the device 110 may perform different actions and/or perform the same action slightly differently based on the sentiment categories 2010. As illustrated in FIG. 20, the device 110 may perform a first action 2032 in response to detecting the first category (e.g., angry) 2012, may perform a second action with a first inflection 2034 in response to detecting the second category (e.g., happy) 2014, may perform the second action with a second inflection 2036 in response to detecting the third category (e.g., neutral) 2016, and may perform a third action 2038 in response to detecting the fourth category (e.g., sad) 2018.

To illustrate a first example, the device 110 may detect the first category (e.g., angry) 2012 and perform a first action, such as ending audio output, stopping movement, generating output audio, and/or the like. Thus, the device 110 may interpret the first category 2012 as an indication that the device 110 is not interpreting a voice command correctly, that the user 5 wants the device 110 to stop performing a current action, and/or the like. In some examples, the device 110 may detect the first category and perform the first action without regard to receiving a voice command, although the disclosure is not limited thereto.

To illustrate a second example, the device 10 may receive a voice command and may respond to the voice command differently based on the sentiment category 2010. For example, the device 110 may detect the second category (e.g., happy) 2014 and may perform a second action with a first inflection 2034, such as generating output audio at a first volume level or corresponding to a first notification having a first number of words (e.g., lengthier notification). In contrast, the device 110 may detect the third category (e.g., neutral) 2016 and may perform the second action with a second inflection 2036, such as generating output audio at a second volume level or corresponding to a second notification having a second number of words (e.g., shorter notification). As used herein, an inflection may indicate that the device 110 is performing the same overall action (e.g., generating output audio, moving to a new location, etc.), but is modifying parameters associated with the action (e.g., volume level and/or length of the output audio, speed at which the device 110 moves to the new location, etc.).

While FIG. 20 illustrates a single example of modifying behavior using the sentiment data, this is intended to conceptually illustrate an example and the disclosure is not limited thereto. Instead, in some examples the device 110 may perform the same action in response to each of the sentiment categories 2010 (e.g., perform the first action regardless of the sentiment category 2010), may perform the same action with different inflections in response to each of the sentiment categories 2010 (e.g., perform the first action with a first inflection, perform the first action with a second inflection, etc.), may perform different actions in response to each of the sentiment categories 2010 (e.g., performing the first action, performing the second action, etc.), and/or the like without departing from the disclosure.

Figure 21A:
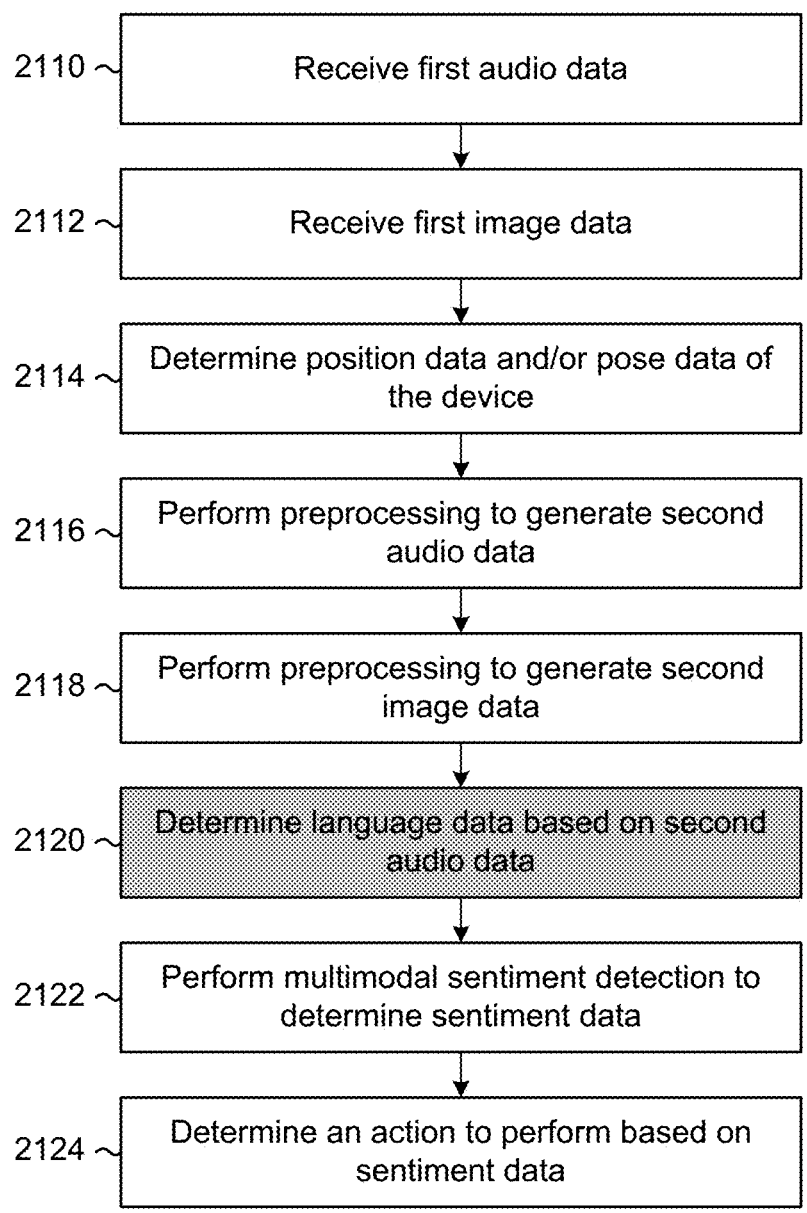
FIGS. 21A-21B are flowcharts conceptually illustrating example methods for performing multimodal sentiment detection according to embodiments of the present disclosure.
Figure 21B:
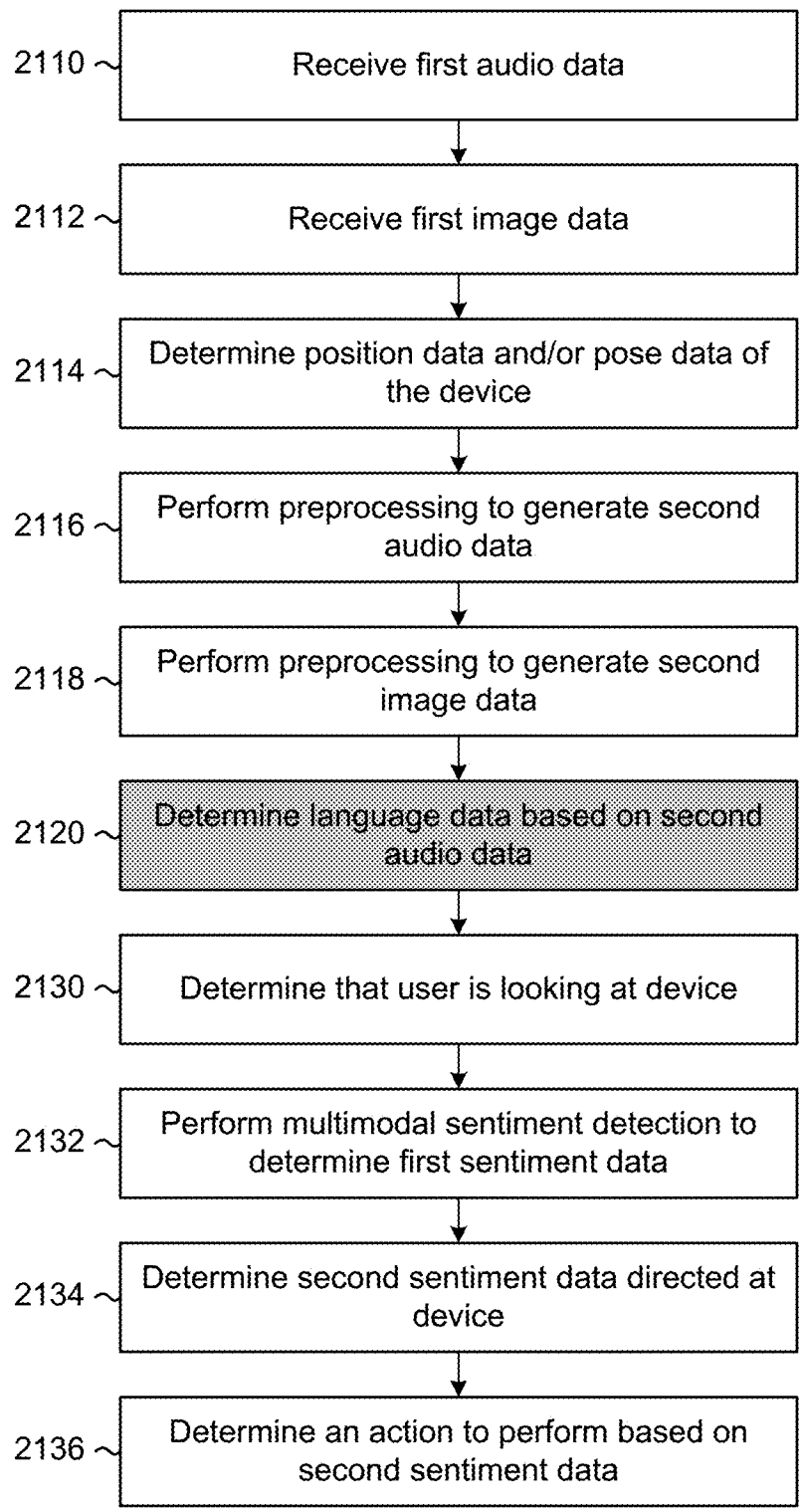

FIGS. 21A-21B are flowcharts conceptually illustrating example methods for performing multimodal sentiment detection according to embodiments of the present disclosure. As illustrated in FIG. 21A, the device 110 may receive (2110) first audio data, may receive (2112) first image data, may determine (2114) position data and/or pose data of the device (e.g., relative to the user and/or an environment), may perform (2116) preprocessing on the first audio data to generate second audio data, and may perform (2118) preprocessing on the first image data to generate second image data. As described above, the position data may indicate a location of the device 110 and/or a position of the device 110 relative to the user 5, whereas the pose data may indicate current position(s) of sensor(s) associated with the device 110, relative to the device 110 and/or the user 5. Thus, the device 110 may use the position data and/or the pose data when generating the second audio data and/or the second image data in steps 2116-2118.

In some examples, the device 110 may optionally determine (2120) language data based on the second audio data. For example, the device 110 may perform speech processing to the second audio data to generate the language data. Additionally or alternatively, the device 110 may send the second audio data to the system(s) 120 and may receive the language data from the system(s) 120 without departing from the disclosure.

Using the second audio data, the second image data, and/or the language data, the device 110 may perform (2122) multimodal sentiment detection to determine sentiment data. As described in greater detail above, the sentiment data may correspond to a sentiment category and/or sentiment value(s), and may represent a universal sentiment (e.g., user's emotional state in general) and/or a device-directed sentiment (e.g., user's emotional state directed to the device 110) without departing from the disclosure.

The device 110 may determine (2124) an action to perform based on the sentiment data. As described in greater detail above with regard to FIG. 20, the action may correspond to using the sentiment data for training (e.g., generating negative training data 2022 and/or positive training data 2024), to modify behavior (e.g., perform an action to interact with the user 5, in response to a voice command, and/or the like), and/or the like. In this example, modifying the behavior of the device 110 corresponds to modifying a current action being performed by the device 110 (e.g., stop performing a first action, start performing a second action, etc.) and/or selecting from potential actions based on the sentiment category (e.g., performing the second action with a first inflection, performing the second action with a second inflection, etc.).

As illustrated in FIG. 21B, in some examples the device 110 may determine that the sentiment data is directed to the device 110. For example, the device 110 may perform steps 2110-2120 described above and then may determine (2130) that the user is looking at the device 110 and perform (2132) multimodal sentiment detection to determine first sentiment data. In some examples, the device 110 may generate interaction data indicating whether the user 5 is interacting with the device 110 (e.g., looking at the device 110, speaking to the device 110, etc.). Based on whether the user is looking at the device, the interaction data, and/or other information not illustrated in FIG. 21B, the device 110 may then determine (2134) second sentiment data directed at the device 110 (e.g., device-directed sentiment data) and determine (2136) an action to perform based on the second sentiment data. For example, the device 110 may determine that the user 5 is looking at the device 110 and select a first action to perform, or the device 110 may determine that the user 5 is not looking at the device 110 and select a second action to perform, although the disclosure is not limited thereto.

Figure 22:
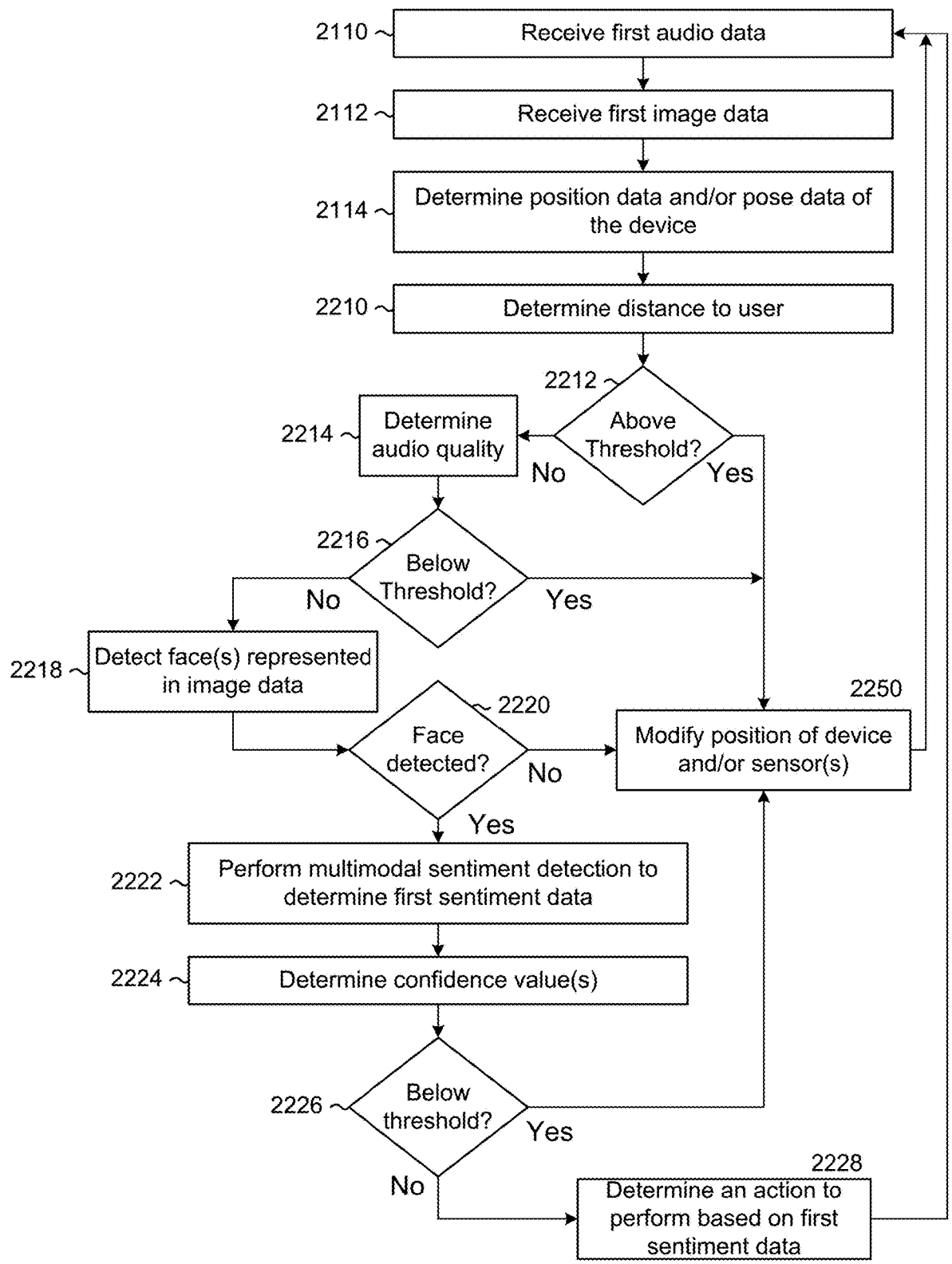
FIG. 22 is a flowchart conceptually illustrating an example method for modifying a position of sensors and/or a device according to embodiments of the present disclosure.

FIG. 22 is a flowchart conceptually illustrating an example method for modifying a position of sensors and/or a device according to embodiments of the present disclosure. As illustrated in FIG. 22, the device 110 may receive (2110) first audio data, receive (2112) first image data, and determine (2114) position data and/or pose data of the device 110. For example, the device 110 may determine position data of the device 110 relative to the environment and/or a user 5, and may determine pose data relative to the device 110 and/or the user 5.

The device 110 may determine (2210) a distance to a user 5 and may determine (2212) whether the distance is above a first threshold (e.g., satisfies a first condition). If not, the device 110 may determine (2214) an audio quality associated with the first audio data and may determine (2216) whether the audio quality is below a second threshold (e.g., satisfies a second condition).

If the audio quality is not below the second threshold, the device 110 may detect (2218) face(s) represented in the image data and may determine (2220) whether a face is detected and/or partially detected (e.g., face detection satisfies a third condition). If a face is detected, the device 110 may perform (2222) multimodal sentiment detection to determine first sentiment data, as described above.

The device 110 may then determine (2224) confidence value(s) associated with the first sentiment data and may determine (2226) whether the confidence value(s) are below a third threshold (e.g., satisfy a fourth condition). If the confidence value(s) are not below the third threshold, the device 110 may determine (2228) an action to perform based on the first sentiment data and may loop to step 2110 and repeat the steps described above. In some examples, the device 110 may determine a single confidence value associated with the first sentiment data (e.g., sentiment category) without departing from the disclosure. However, the disclosure is not limited thereto, and in other examples the device 110 may determine multiple confidence values associated with the first sentiment data, such as a first confidence value corresponding to the acoustic attention output data, a second confidence value corresponding to the visual attention output data, a third confidence value corresponding to the language attention output data, and/or a fourth confidence value corresponding to the sentiment category itself.

If any of the conditions are not satisfied, the device 110 may modify a position of the device 110 and/or sensor(s) of the device 110 to improve sentiment detection and generate updated sentiment data. For example, if the device 110 determines that the distance to the user is above the first threshold in step 2212, that the audio quality is below the second threshold in step 2216, that a face is not detected or only partially detected in step 2220, and/or one or more of the confidence value(s) are below the third threshold, the device 110 may modify (2250) a position of the device 110 and/or sensor(s) of the device 110 and loop to step 2110. In some examples, the device 110 may move closer to the user 5, may move to a particular location (e.g., to avoid noise or other interference present in the first audio data, to avoid visual interference represented in the first image data, to improve a field of view of the first image data, etc.), may move the sensor(s) of the device (e.g., extend or retract the mast associated with a camera, etc.), and/or the like.

Figure 23A:
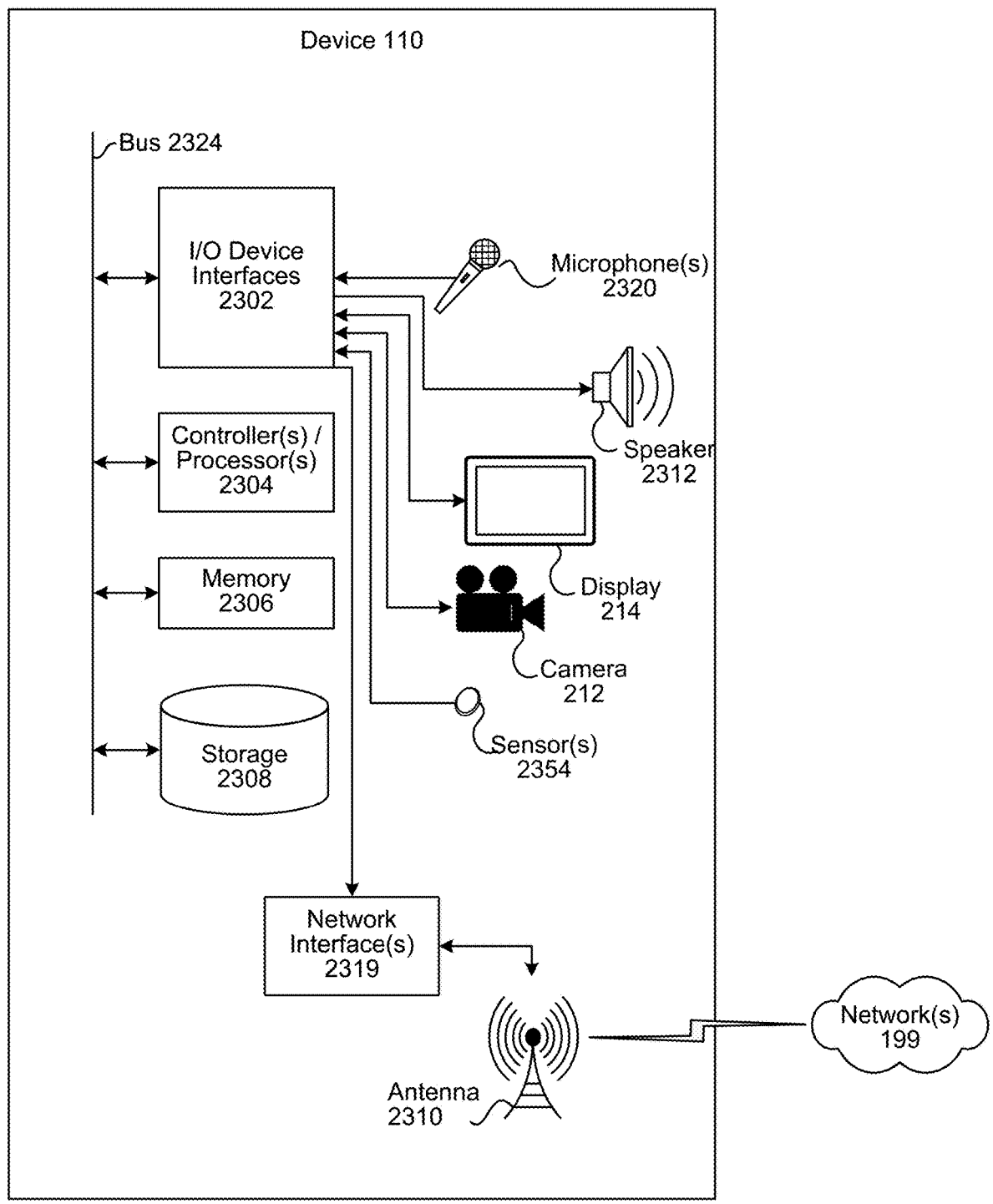
FIG. 23A is a block diagram conceptually illustrating example components of an autonomously motile device according to embodiments of the present disclosure.
Figure 24:
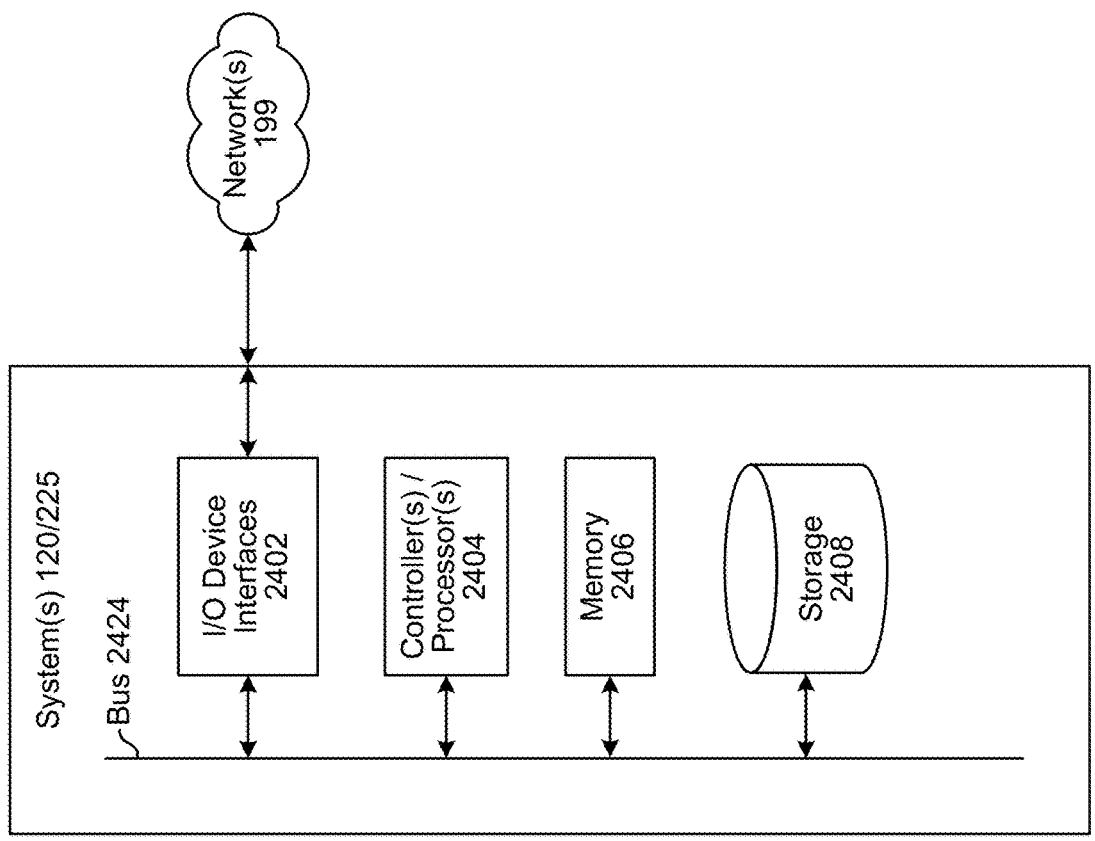
FIG. 24 is a block diagram conceptually illustrating example components of a server according to embodiments of the present disclosure.

FIG. 23A is a block diagram conceptually illustrating a device 110 that may be used with the system. FIG. 24 is a block diagram conceptually illustrating example components of a remote device, such as the system(s) 120, which may assist with creating a map of an environment 390, ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (2304/2404), which may each include a central processing unit (CPU) for processing data and computer-readable instructions, and a memory (2306/2406) for storing data and instructions of the respective device. The memories (2306/2406) may individually include volatile random access memory (RAM), non-volatile read only memory (ROM), non-volatile magnetoresistive memory (MRAM), and/or other types of memory. Each device (110/120/225) may also include a data storage component (2308/2408) for storing data and controller/processor-executable instructions. Each data storage component (2308/2408) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (2302/2402).

Computer instructions for operating each device (110/120/225) and its various components may be executed by the respective device's controller(s)/processor(s) (2304/2404), using the memory (2306/2406) as temporary "working" storage at runtime. A device's computer instructions may be stored in a non-transitory manner in non-volatile memory (2306/2406), storage (2308/2408), or an external device(s). Alternatively, some or all of the executable instructions may be embedded in hardware or firmware on the respective device in addition to or instead of software.

Each device (110/120/225) includes input/output device interfaces (2302/2402). A variety of components may be connected through the input/output device interfaces (2302/2402), as will be discussed further below. Additionally, each device (110/120/225) may include an address/data bus (2324/2424) for conveying data among components of the respective device. Each component within a device (110/120/225) may also be directly connected to other components in addition to (or instead of) being connected to other components across the bus (2324/2424).

FIG. 23A is a block diagram of some components of the autonomously motile device 110 such as network interfaces 2319, sensors 2354, and output devices, according to some implementations. The components illustrated here are provided by way of illustration and not necessarily as a limitation. For example, the autonomously motile device 110 may utilize a subset of the particular network interfaces 2319, output devices, or sensors 2354 depicted here, or may utilize components not pictured. One or more of the sensors 2354, output devices, or a combination thereof may be included on a moveable component that may be panned, tilted, rotated, or any combination thereof with respect to a chassis of the autonomously motile device 110.

The autonomously motile device 110 may include input/output device interfaces 2302 that connect to a variety of components such as an audio output component such as a speaker 2312, a wired headset or a wireless headset (not illustrated), or other component capable of outputting audio. The autonomously motile device 110 may also include an audio capture component. The audio capture component may be, for example, a microphone 2320 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 314 for displaying content. The autonomously motile device 110 may further include a camera 312, light, button, actuator, and/or sensor 2354.

The network interfaces 2319 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 390 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (2302/2402) may also include and/or communicate with communication components (such as network interface(s) 2319) that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (2302/2402), processor(s) (2304/2404), memory (2306/2406), and/or storage (2308/2408) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 23B:
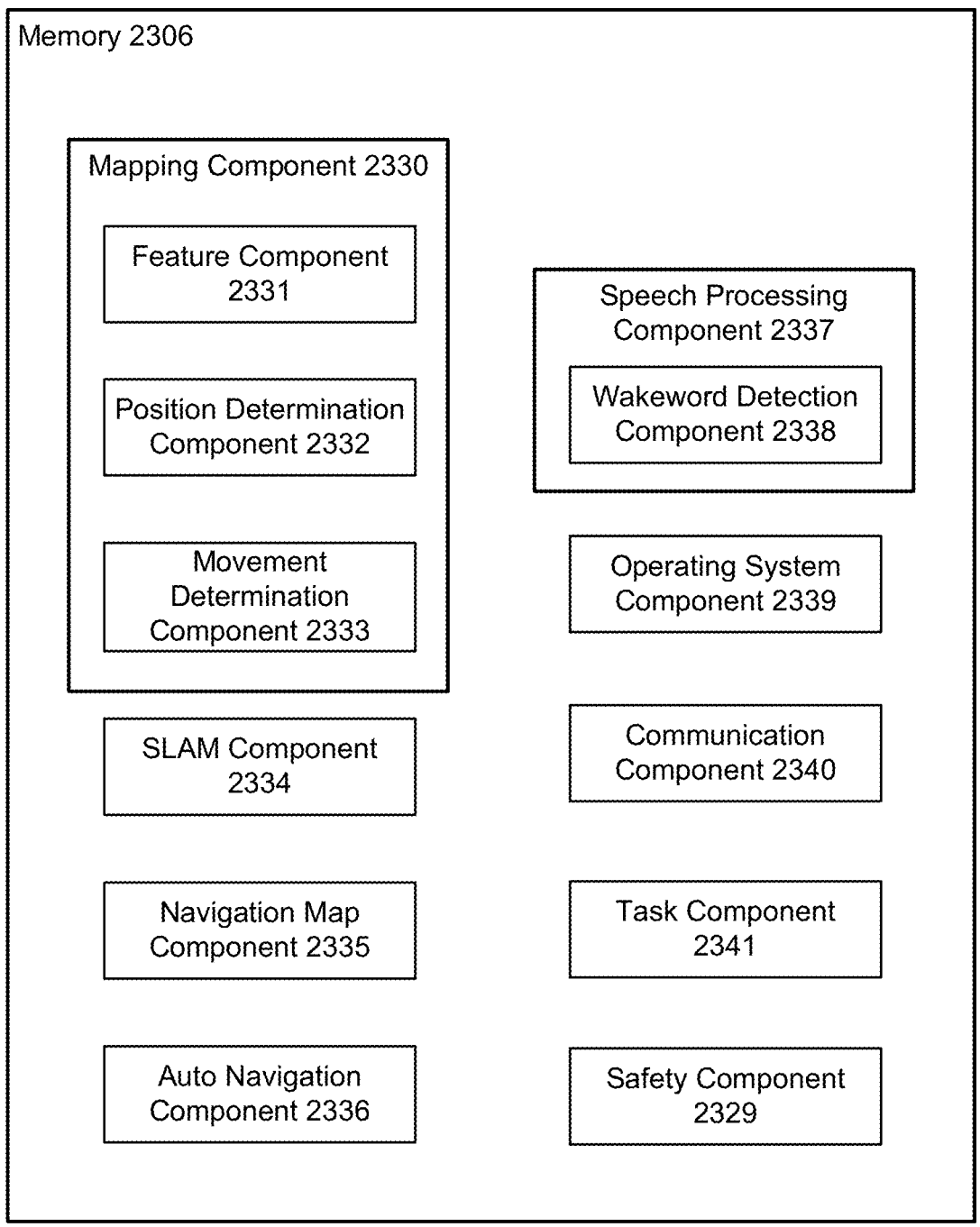
FIG. 23B illustrates components that may be stored in a memory of an autonomously motile device according to embodiments of the present disclosure.
Figure 23C:
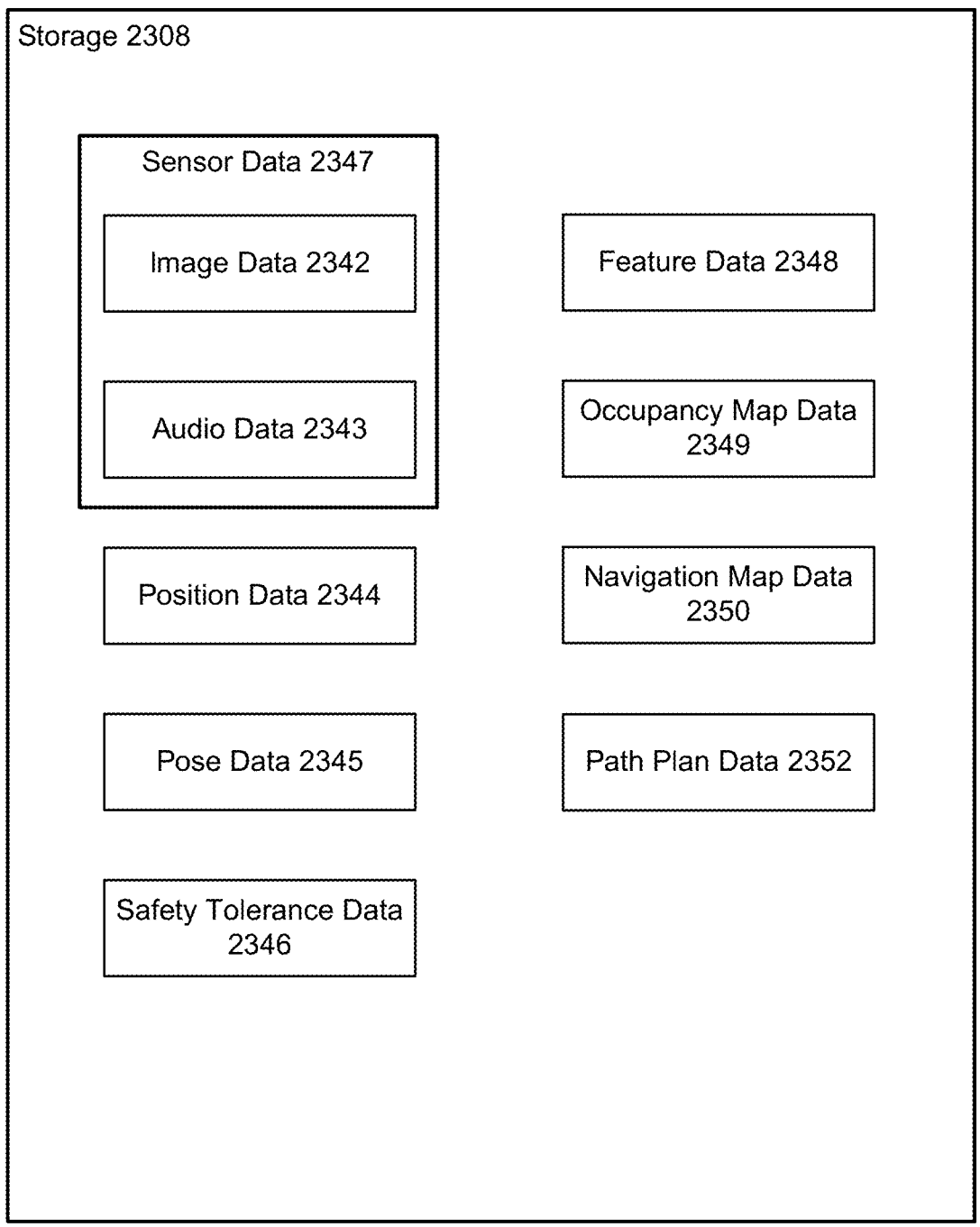
FIG. 23C illustrates data that may be stored in a storage of an autonomously motile device according to embodiments of the present disclosure.
Figure 23D:
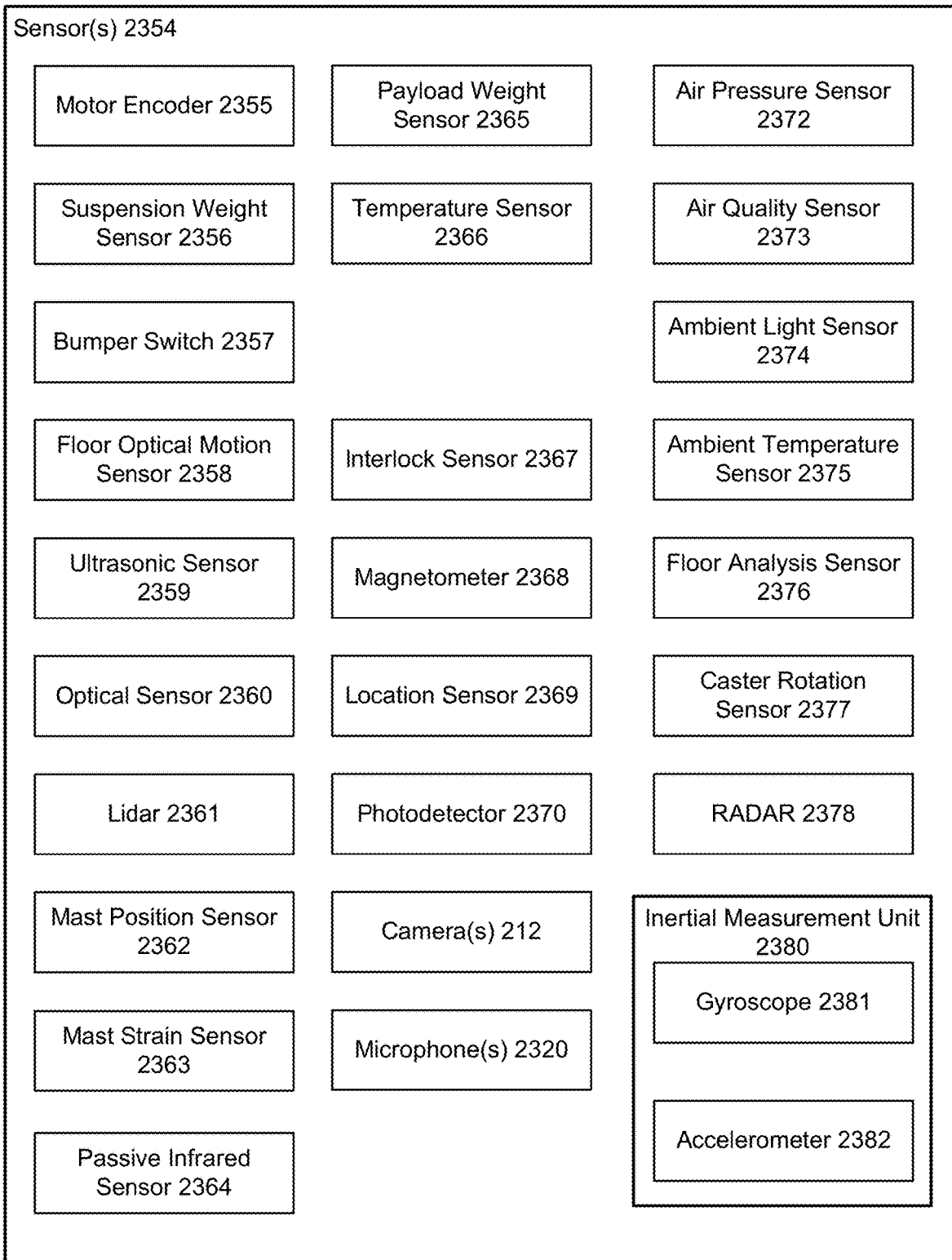
FIG. 23D illustrates sensors that may be included as part of an autonomously motile device according to embodiments of the present disclosure.

FIG. 23B illustrates components that may be stored in a memory of an autonomously motile device according to embodiments of the present disclosure. Although illustrated as included in memory 2306, the components (or portions thereof) may also be included in hardware and/or firmware. FIG. 23C illustrates data that may be stored in a storage of an autonomously motile device according to embodiments of the present disclosure. Although illustrated as stored in storage 2308, the data may be stored in memory 2306 or in another component. FIG. 23D illustrates sensors that may be included as part of an autonomously motile device according to embodiments of the present disclosure.

A position determination component 2332 determines position data 2344 indicative of a position 384 of the feature 386 in the environment 390. In one implementation the position 384 may be expressed as a set of coordinates with respect to the first camera 312*a*. The position determination component 2332 may use a direct linear transformation triangulation process to determine the position 384 of a feature 386 in the environment 390 based on the difference in apparent location of that feature 386 in two images acquired by two cameras 312 separated by a known distance.

A movement determination module 2333 determines if the feature 386 is stationary or non-stationary. First position data 2344*a* indicative of a first position 384*a* of a feature 386 depicted in the first pair of images 382*a* acquired at time t 1 is determined by the position determination component 2332. Second position data 2344*b* of the same feature 386 indicative of a second position 384*b* of the same feature 386 as depicted in the second pair of images 382*b* acquired at time t 2 is determined as well. Similar determinations made for data relative to first position 384*a* and second position 384*b* may also be made for third position 384*c*, and so forth.

The movement determination module 2333 may use inertial data from the IMU 2380 or other sensors that provides information about how the autonomously motile device 110 moved between time t 1 and time t 2. The inertial data and the first position data 2344*a* is used to provide a predicted position of the feature 386 at the second time. The predicted position is compared to the second position data 2344*b* to determine if the feature is stationary or non-stationary. If the predicted position is less than a threshold value from the second position 384*b* in the second position data 2344*b*, then the feature 386 is deemed to be stationary.

Features 386 that have been deemed to be stationary may be included in the second feature data. The second feature data may thus exclude non-stationary features 386 and comprise a subset of the first feature data 2348 which comprises stationary features 386.

The second feature data may be used by a simultaneous localization and mapping (SLAM) component 2334. The SLAM component 2334 may use second feature data to determine pose data 2345 that is indicative of a location of the autonomously motile device 110 at a given time based on the appearance of features 386 in pairs of images 382. The SLAM component 2334 may also provide trajectory data indicative of the trajectory 380 that is based on a time series of pose data 2345 from the SLAM component 2334.

Other information, such as depth data from a depth sensor, the position data 2344 associated with the features 386 in the second feature data, and so forth, may be used to determine the presence of obstacles 383 in the environment 390 as represented by an occupancy map as represented by occupancy map data 2349.

The occupancy map data 2349 may comprise data that indicates the location of one or more obstacles 383, such as a table, wall, stairwell, and so forth. In some implementations, the occupancy map data 2349 may comprise a plurality of cells with each cell of the plurality of cells representing a particular area in the environment 390. Data, such as occupancy values, may be stored that indicates whether an area of the environment 390 associated with the cell is unobserved, occupied by an obstacle 383, or is unoccupied. An obstacle 383 may comprise an object or feature that prevents or impairs traversal by the autonomously motile device 110. For example, an obstacle 383 may comprise a wall, stairwell, and so forth.

The occupancy map data 2349 may be manually or automatically determined. For example, during a learning phase the user may take the autonomously motile device 110 on a tour of the environment 390, allowing the mapping component 2330 of the autonomously motile device 110 to determine the occupancy map data 2349. The user may provide input data such as tags designating a particular obstacle type, such as "furniture" or "fragile". In another example, during subsequent operation, the autonomously motile device 110 may generate the occupancy map data 2349 that is indicative of locations and types of obstacles such as chairs, doors, stairwells, and so forth as it moves unattended through the environment 390.

Modules described herein, such as the mapping component 2330, may provide various processing functions such as de-noising, filtering, and so forth. Processing of sensor data 2347, such as image data from a camera 312, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 2347. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 2347 or other data. For example, the ANN may be trained using a supervised learning algorithm such that object identifiers are associated with images of particular objects within training images provided to the ANN. Once trained, the ANN may be provided with the sensor data 2347 and produce output indicative of the object identifier.

A navigation map component 2335 uses the occupancy map data 2349 as input to generate a navigation map as represented by navigation map data 2350. For example, the navigation map component 2335 may produce the navigation map data 2350 by inflating or enlarging the apparent size of obstacles 383 as indicated by the occupancy map data 2349.

An autonomous navigation component 2336 provides the autonomously motile device 110 with the ability to navigate within the environment 390 without real-time human interaction. The autonomous navigation component 2336 may implement, or operate in conjunction with, the mapping component 2330 to determine one or more of the occupancy map data 2349, the navigation map data 2350, or other representations of the environment 390.

The autonomously motile device 110 autonomous navigation component 2336 may generate path plan data 2352 that is indicative of a path through the environment 390 from the current location to a destination location. The autonomously motile device 110 may then begin moving along the path.

While moving along the path, the autonomously motile device 110 may assess the environment 390 and update or change the path as appropriate. For example, if an obstacle 383 appears in the path, the mapping component 2330 may determine the presence of the obstacle 383 as represented in the occupancy map data 2349 and navigation map data 2350. The now updated navigation map data 2350 may then be used to plan an alternative path to the destination location.

The autonomously motile device 110 may utilize one or more task components 2341. The task component 2341 comprises instructions that, when executed, provide one or more functions. The task components 2341 may perform functions such as finding a user, following a user, present output on output devices of the autonomously motile device 110, perform sentry tasks by moving the autonomously motile device 110 through the environment 390 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 2319 to connect to network(s) 199. For example, the network(s) 199 may comprise a wireless local area network, that in turn is connected to a wide area network such as the Internet.

The autonomously motile device 110 may be configured to dock or connect to a docking station. The docking station may also be connected to the network(s) 199. For example, the docking station may be configured to connect to the network(s) 199 (e.g., wireless local area network) such that the docking station and the autonomously motile device 110 may communicate. The docking station may provide external power which the autonomously motile device 110 may use to charge a battery of the autonomously motile device 110.

The autonomously motile device 110 may access one or more servers of the system(s) 120 via the network(s) 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers for further processing. The servers may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomously motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 2304 may use data from the clock to associate a particular time with an action, sensor data 2347, and so forth.

The autonomously motile device 110 may include one or more hardware processors 2304 (processors) configured to execute one or more stored instructions. The processors 2304 may comprise one or more cores. The processors 2304 may include microcontrollers, systems on a chip, field programmable gate arrays, digital signal processors, graphic processing units, general processing units, and so forth.

The autonomously motile device 110 may include one or more communication component 2340 such as input/output (I/O) interfaces 2302, network interfaces 2319, and so forth. The communication component 2340 enable the autonomously motile device 110, or components thereof, to communicate with other devices or components. The communication component 2340 may include one or more I/O interfaces 2302. The I/O interfaces 2302 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 2302 may couple to one or more I/O devices. The I/O devices may include input devices such as one or more of a sensor 2354, keyboard, mouse, scanner, and so forth. The I/O devices may also include output devices such as one or more of a motor, light, speaker 2312, display 314, projector, printer, and so forth. In some embodiments, the I/O devices may be physically incorporated with the autonomously motile device 110 or may be externally placed.

The I/O interface(s) 2302 may be configured to provide communications between the autonomously motile device 110 and other devices such as other devices 110, docking stations, routers, access points, and so forth, for example through antenna 2310 and/or other component. The I/O interface(s) 2302 may include devices configured to couple to personal area networks (PANs), local area networks (LANs), wireless local area networks (WLANS), wide area networks (WANs), and so forth. For example, the network interfaces 2319 may include devices compatible with Ethernet, Wi-Fi, Bluetooth, Bluetooth Low Energy, ZigBee, and so forth. The autonomously motile device 110 may also include one or more busses 2324 or other internal communications hardware or software that allow for the transfer of data between the various modules and components of the autonomously motile device 110.

As shown in FIG. 23A, the autonomously motile device 110 includes one or more memories 2306. The memory 2306 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 2306 provides storage of computer-readable instructions, data structures, program modules, and other data for the operation of the autonomously motile device 110. A few example functional modules are shown stored in the memory 2306, although the same functionality may alternatively be implemented in hardware, firmware, or as a system on a chip (SoC).

The memory 2306 may include at least one operating system (OS) component 2339. The OS component 2339 is configured to manage hardware resource devices such as the I/O interfaces 2302, the I/O devices, the communication component 2340, and provide various services to applications or modules executing on the processors 2304. The OS component 2339 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Wash.

Also stored in the memory 2306, or elsewhere may be a data store 2308 and one or more of the following modules. These modules may be executed as foreground applications, background tasks, daemons, and so forth. The data store 2308 may use a flat file, database, linked list, tree, executable code, script, or other data structure to store information. In some implementations, the data store 2308 or a portion of the data store 2308 may be distributed across one or more other devices including other devices 110, system(s) 120, network attached storage devices, and so forth.

A communication component 2340 may be configured to establish communication with other devices, such as other devices 110, an external server of the system(s) 120, a docking station, and so forth. The communications may be authenticated, encrypted, and so forth.

Other modules within the memory 2306 may include a safety component 2329, the mapping component 2330, the navigation map component 2335, the autonomous navigation component 2336, the one or more components 2341, a speech processing component 2337, or other components.

The components may access data stored within the data store 2308, including safety tolerance data 2346, sensor data 2347, inflation parameters, other data, and so forth.

The safety component 2329 may access the safety tolerance data 2346 to determine within what tolerances the autonomously motile device 110 may operate safely within the environment 390. For example, the safety component 2329 may be configured to stop the autonomously motile device 110 from moving when an extensible mast of the autonomously motile device 110 is extended. In another example, the safety tolerance data 2346 may specify a minimum sound threshold which, when exceeded, stops all movement of the autonomously motile device 110. Continuing this example, detection of sound such as a human yell would stop the autonomously motile device 110. In another example, the safety component 2329 may access safety tolerance data 2346 that specifies a minimum distance from an object that the autonomously motile device 110 is to maintain. Continuing this example, when a sensor 2354 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 2329 may be implemented as hardware, software, or a combination thereof.

The safety component 2329 may control other factors, such as a maximum speed of the autonomously motile device 110 based on information obtained by the sensors 2354, precision and accuracy of the sensor data 2347, and so forth. For example, detection of an object by an optical sensor may include some error, such as when the distance to an object comprises a weighted average between an object and a background. As a result, the maximum speed permitted by the safety component 2329 may be based on one or more factors such as the weight of the autonomously motile device 110, nature of the floor, distance to the object, and so forth. In the event that the maximum permissible speed differs from the maximum speed permitted by the safety component 2329, the lesser speed may be utilized.

The navigation map component 2335 uses the occupancy map data 2349 as input to generate the navigation map data 2350. The navigation map component 2335 may produce the navigation map data 2350 to inflate or enlarge the obstacles 383 indicated by the occupancy map data 2349. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the autonomously motile device 110, and so forth.

The speech processing component 2337 may be used to process utterances of the user. Microphones may acquire audio in the presence of the autonomously motile device 110 and may send raw audio data 2343 to an acoustic front end (AFE). The AFE may transform the raw audio data 2343 (for example, a single-channel, 16-bit audio stream sampled at 16 kHz), captured by the microphone, into audio feature vectors that may ultimately be used for processing by various components, such as a wakeword detection module 2338, speech recognition engine, or other components. The AFE may reduce noise in the raw audio data 2343. The AFE may also perform acoustic echo cancellation (AEC) or other operations to account for output audio data that may be sent to a speaker of the autonomously motile device 110 for output. For example, the autonomously motile device 110 may be playing music or other audio that is being received from network(s) 199 in the form of output audio data. To prevent the output audio interfering with the device's ability to detect and process input audio, the AFE or other component may perform echo cancellation to remove the output audio data from the input raw audio data 2343, or other operations.

The AFE may divide the raw audio data 2343 into frames representing time intervals for which the AFE determines a number of values (i.e., features) representing qualities of the raw audio data 2343, along with a set of those values (i.e., a feature vector or audio feature vector) representing features/qualities of the raw audio data 2343 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 2343, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 2343) may be input into a wakeword detection module 2338 that is configured to detect keywords spoken in the audio. The wakeword detection module 2338 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 2338 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 2338 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 2343 or the audio feature vectors) to one or more server(s) of the system(s) 120 for speech processing. The audio data corresponding to audio obtained by the microphone may be processed locally on one or more of the processors 2304, sent to a server for routing to a recipient device or may be sent to the system(s) 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 2335, prior to sending to the server and/or the system(s) 120, and so forth.

The speech processing component 2337 may include or access an automated speech recognition (ASR) module. The ASR module may accept as input raw audio data 2343, audio feature vectors, or other sensor data 2347 and so forth and may produce as output the input data comprising a text string or other data representation. The input data comprising the text string or other data representation may be processed by the navigation map component 2335 to determine the command to be executed. For example, the utterance of the command "robot, come here" may result in input data comprising the text string "come here". The wakeword "robot" may be omitted from the input data.

The autonomous navigation component 2336 provides the autonomously motile device 110 with the ability to navigate within the environment 390 without real-time human interaction. The autonomous navigation component 2336 may implement, or operate in conjunction with, the mapping component 2330 to determine the occupancy map data 2349, the navigation map data 2350, or other representation of the environment 390. In one implementation, the mapping component 2330 may use one or more simultaneous localization and mapping ("SLAM") techniques. The SLAM algorithms may utilize one or more of maps, algorithms, beacons, or other techniques to navigate. The autonomous navigation component 2336 may use the navigation map data 2350 to determine a set of possible paths along which the autonomously motile device 110 may move. One of these may be selected and used to determine path plan data 2352 indicative of a path. For example, a possible path that is the shortest or has the fewest turns may be selected and used to determine the path. The path is then subsequently used to determine a set of commands that drive the motors connected to the wheels. For example, the autonomous navigation component 2336 may determine the current location within the environment 390 and determine path plan data 2352 that describes the path to a destination location such as the docking station.

The autonomous navigation component 2336 may utilize various techniques during processing of sensor data 2347. For example, image data 2342 obtained from cameras 312 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 2304, in response to a command received from one or more network interfaces 2319, as determined from the sensor data 2347, and so forth. For example, the system(s) 120 may send a command that is received using the network interface 2319. This command may direct the autonomously motile device 110 to proceed to find a particular user, follow a particular user, and so forth. The autonomously motile device 110 may then process this command and use the autonomous navigation component 2336 to determine the directions and distances associated with carrying out the command. For example, the command to "come here" may result in a task component 2341 sending a command to the autonomous navigation component 2336 to move the autonomously motile device 230 to a particular location near the user and orient the autonomously motile device 110 in a particular direction.

The autonomously motile device 110 may connect to the network(s) 199 using one or more of the network interfaces 2319. In some implementations, one or more of the modules or other functions described here may execute on the processors 2304 of the autonomously motile device 110, on the system(s) 120, or a combination thereof. For example, the system(s) 120 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 2308 may store the other data as well. For example, localization settings may indicate local preferences such as language, user identifier data may be stored that allows for identification of a particular user, and so forth.

As shown in FIG. 23D, the autonomously motile device 110 may include one or more of the following sensors 2354. The sensors 2354 depicted here are provided by way of illustration and not necessarily as a limitation. It is understood that other sensors 2354 may be included or utilized by the autonomously motile device 110, while some sensors 2354 may be omitted in some configurations.

A motor encoder 2355 provides information indicative of the rotation or linear extension of a motor. The motor may comprise a rotary motor, or a linear actuator. In some implementations, the motor encoder 2355 may comprise a separate assembly such as a photodiode and encoder wheel that is affixed to the motor. In other implementations, the motor encoder 2355 may comprise circuitry configured to drive the motor. For example, the autonomous navigation component 2336 may utilize the data from the motor encoder 2355 to estimate a distance traveled.

A suspension weight sensor 2356 provides information indicative of the weight of the autonomously motile device 110 on the suspension system for one or more of the wheels or the caster. For example, the suspension weight sensor 2356 may comprise a switch, strain gauge, load cell, photodetector, or other sensing element that is used to determine whether weight is applied to a particular wheel, or whether weight has been removed from the wheel. In some implementations, the suspension weight sensor 2356 may provide binary data such as a "1" value indicating that there is a weight applied to the wheel, while a "0" value indicates that there is no weight applied to the wheel. In other implementations, the suspension weight sensor 2356 may provide an indication such as so many kilograms of force or newtons of force. The suspension weight sensor 2356 may be affixed to one or more of the wheels or the caster. In some situations, the safety component 2329 may use data from the suspension weight sensor 2356 to determine whether or not to inhibit operation of one or more of the motors. For example, if the suspension weight sensor 2356 indicates no weight on the suspension, the implication is that the autonomously motile device 110 is no longer resting on its wheels, and thus operation of the motors may be inhibited. In another example, if the suspension weight sensor 2356 indicates weight that exceeds a threshold value, the implication is that something heavy is resting on the autonomously motile device 110 and thus operation of the motors may be inhibited.

One or more bumper switches 2357 provide an indication of physical contact between a bumper or other member that is in mechanical contact with the bumper switch 2357. The safety component 2329 utilizes sensor data 2347 obtained by the bumper switches 2357 to modify the operation of the autonomously motile device 110. For example, if the bumper switch 2357 associated with a front of the autonomously motile device 110 is triggered, the safety component 2329 may drive the autonomously motile device 110 backwards.

A floor optical motion sensor 2358 provides information indicative of motion of the autonomously motile device 110 relative to the floor or other surface underneath the autonomously motile device 110. In one implementation, the floor optical-motion sensors 2358 may comprise a light source such as light-emitting diode (LED), an array of photodiodes, and so forth. In some implementations, the floor optical-motion sensors 2358 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 2358 may provide other information, such as data indicative of a pattern present on the floor, composition of the floor, color of the floor, and so forth. For example, the floor optical-motion sensors 2358 may utilize an optoelectronic sensor that may detect different colors or shades of gray, and this data may be used to generate floor characterization data. The floor characterization data may be used for navigation.

An ultrasonic sensor 2359 utilizes sounds in excess of 20 kHz to determine a distance from the sensor 2354 to an object. The ultrasonic sensor 2359 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 2359 may provide information indicative of a presence of an object, distance to the object, and so forth. Two or more ultrasonic sensors 2359 may be utilized in conjunction with one another to determine a location within a two-dimensional plane of the object.

In some implementations, the ultrasonic sensor 2359 or a portion thereof may be used to provide other functionality. For example, the emitter of the ultrasonic sensor 2359 may be used to transmit data and the detector may be used to receive data transmitted that is ultrasonic sound. In another example, the emitter of an ultrasonic sensor 2359 may be set to a particular frequency and used to generate a particular waveform such as a sawtooth pattern to provide a signal that is audible to an animal, such as a dog or a cat.

An optical sensor 2360 may provide sensor data 2347 indicative of one or more of a presence or absence of an object, a distance to the object, or characteristics of the object. The optical sensor 2360 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 2360 may utilize one or more sensing elements. For example, the optical sensor 2360 may comprise a 4×4 array of light sensing elements. Each individual sensing element may be associated with a field of view that is directed in a different way. For example, the optical sensor 2360 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 2354 such as an image sensor or camera 312. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 2360 may operate as a depth camera, providing a two-dimensional image of a scene, as well as data that indicates a distance to each pixel.

Data from the optical sensors 2360 may be utilized for collision avoidance. For example, the safety component 2329 and the autonomous navigation component 2336 may utilize the sensor data 2347 indicative of the distance to an object in order to prevent a collision with that object.

Multiple optical sensors 2360 may be operated such that their field-of-view overlap at least partially. To minimize or eliminate interference, the optical sensors 2360 may selectively control one or more of the timing, modulation, or frequency of the light emitted. For example, a first optical sensor 2360 may emit light modulated at 30 kHz while a second optical sensor 2360 emits light modulated at 33 kHz.

A lidar 2361 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 2347 may be generated that is indicative of the presence of objects and the relative positions, shapes, and so forth that are visible to the lidar 2361. Data from the lidar 2361 may be used by various modules. For example, the autonomous navigation component 2336 may utilize point cloud data generated by the lidar 2361 for localization of the autonomously motile device 110 within the environment 390.

The autonomously motile device 110 may include a mast. A mast position sensor 2362 provides information indicative of a position of the mast of the autonomously motile device 110. For example, the mast position sensor 2362 may comprise limit switches associated with the mast extension mechanism that indicate whether the mast is at an extended or retracted position. In other implementations, the mast position sensor 2362 may comprise an optical code on at least a portion of the mast that is then interrogated by an optical emitter and a photodetector to determine the distance to which the mast is extended. In another implementation, the mast position sensor 2362 may comprise an encoder wheel that is attached to a mast motor that is used to raise or lower the mast. The mast position sensor 2362 may provide data to the safety component 2329. For example, if the autonomously motile device 110 is preparing to move, data from the mast position sensor 2362 may be checked to determine if the mast is retracted, and if not, the mast may be retracted prior to beginning movement.

A mast strain sensor 2363 provides information indicative of a strain on the mast with respect to the remainder of the autonomously motile device 110. For example, the mast strain sensor 2363 may comprise a strain gauge or load cell that measures a side-load applied to the mast or a weight on the mast or downward pressure on the mast. The safety component 2329 may utilize sensor data 2347 obtained by the mast strain sensor 2363. For example, if the strain applied to the mast exceeds a threshold amount, the safety component 2329 may direct an audible and visible alarm to be presented by the autonomously motile device 110.

The autonomously motile device 110 may include a modular payload bay. A payload weight sensor 2365 provides information indicative of the weight associated with the modular payload bay. The payload weight sensor 2365 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 2365 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 2365 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 2329 may utilize the payload weight sensor 2365 to determine if the modular payload bay has been overloaded. If so, an alert or notification may be issued.

One or more device temperature sensors 2366 may be utilized by the autonomously motile device 110. The device temperature sensors 2366 provide temperature data of one or more components within the autonomously motile device 110. For example, a device temperature sensor 2366 may indicate a temperature of one or more the batteries, one or more motors, and so forth. In the event the temperature exceeds a threshold value, the component associated with that device temperature sensor 2366 may be shut down.

One or more interlock sensors 2367 may provide data to the safety component 2329 or other circuitry that prevents the autonomously motile device 110 from operating in an unsafe condition. For example, the interlock sensors 2367 may comprise switches that indicate whether an access panel is open. The interlock sensors 2367 may be configured to inhibit operation of the autonomously motile device 110 until the interlock switch indicates a safe condition is present.

An inertial measurement unit (IMU) 2380 may include a plurality of gyroscopes 2381 and accelerometers 2382 arranged along different axes. The gyroscope 2381 may provide information indicative of rotation of an object affixed thereto. For example, a gyroscope 2381 may generate sensor data 2347 that is indicative of a change in orientation of the autonomously motile device 110 or a portion thereof.

The accelerometer 2382 provides information indicative of a direction and magnitude of an imposed acceleration. Data such as rate of change, determination of changes in direction, speed, and so forth may be determined using the accelerometer 2382. The accelerometer 2382 may comprise mechanical, optical, micro-electromechanical, or other devices. For example, the gyroscope 2381 in the accelerometer 2382 may comprise a prepackaged solid-state unit.

A magnetometer 2368 may be used to determine an orientation by measuring ambient magnetic fields, such as the terrestrial magnetic field. For example, the magnetometer 2368 may comprise a Hall effect transistor that provides output compass data indicative of a magnetic heading.

The autonomously motile device 110 may include one or more location sensors 2369. The location sensors 2369 may comprise an optical, radio, or other navigational system such as a global positioning system (GPS) receiver. For indoor operation, the location sensors 2369 may comprise indoor position systems, such as using Wi-Fi Positioning Systems (WPS). The location sensors 2369 may provide information indicative of a relative location, such as "living room" or an absolute location such as particular coordinates indicative of latitude and longitude, or displacement with respect to a predefined origin.

A photodetector 2370 provides sensor data 2347 indicative of impinging light. For example, the photodetector 2370 may provide data indicative of a color, intensity, duration, and so forth.

A camera 312 generates sensor data 2347 indicative of one or more images. The camera 312 may be configured to detect light in one or more wavelengths including, but not limited to, terahertz, infrared, visible, ultraviolet, and so forth. For example, an infrared camera 312 may be sensitive to wavelengths between approximately 700 nanometers and 1 millimeter. The camera 312 may comprise charge coupled devices (CCD), complementary metal oxide semiconductor (CMOS) devices, microbolometers, and so forth. The autonomously motile device 110 may use image data acquired by the camera 312 for object recognition, navigation, collision avoidance, user communication, and so forth. For example, a pair of cameras 312 sensitive to infrared light may be mounted on the front of the autonomously motile device 110 to provide binocular stereo vision, with the sensor data 2347 comprising images being sent to the autonomous navigation component 2336. In another example, the camera 312 may comprise a 10 megapixel or greater camera that is used for videoconferencing or for acquiring pictures for the user.

The camera 312 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 312, particularly those associated with navigation or autonomous operation, may utilize a global shutter. In other implementations, the camera(s) 312 providing images for use by the autonomous navigation component 2336 may be acquired using a rolling shutter and subsequently may be processed to mitigate image artifacts.

One or more microphones 2320 may be configured to acquire information indicative of sound present in the environment 390. In some implementations, arrays of microphones 2320 may be used. These arrays may implement beamforming techniques to provide for directionality of gain. The autonomously motile device 110 may use the one or more microphones 2320 to acquire information from acoustic tags, accept voice input from users, determine a direction of an utterance, determine ambient noise levels, for voice communication with another user or system, and so forth.

An air pressure sensor 2372 may provide information indicative of an ambient atmospheric pressure or changes in ambient atmospheric pressure. For example, the air pressure sensor 2372 may provide information indicative of changes in air pressure due to opening and closing of doors, weather events, and so forth.

An air quality sensor 2373 may provide information indicative of one or more attributes of the ambient atmosphere. For example, the air quality sensor 2373 may include one or more chemical sensing elements to detect the presence of carbon monoxide, carbon dioxide, ozone, and so forth. In another example, the air quality sensor 2373 may comprise one or more elements to detect particulate matter in the air, such as the photoelectric detector, ionization chamber, and so forth. In another example, the air quality sensor 2373 may include a hygrometer that provides information indicative of relative humidity.

An ambient light sensor 2374 may comprise one or more photodetectors or other light-sensitive elements that are used to determine one or more of the color, intensity, or duration of ambient lighting around the autonomously motile device 110.

An ambient temperature sensor 2375 provides information indicative of the temperature of the ambient environment 390 proximate to the autonomously motile device 110. In some implementations, an infrared temperature sensor may be utilized to determine the temperature of another object at a distance.

A floor analysis sensor 2376 may include one or more components that are used to generate at least a portion of floor characterization data. In one implementation, the floor analysis sensor 2376 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 2376 may be used by one or more of the safety component 2329, the autonomous navigation component 2336, the task component 2341, and so forth. For example, if the floor analysis sensor 2376 determines that the floor is wet, the safety component 2329 may decrease the speed of the autonomously motile device 110 and generate a notification alerting the user.

The floor analysis sensor 2376 may include other components as well. For example, a coefficient of friction sensor may comprise a probe that comes into contact with the surface and determines the coefficient of friction between the probe and the floor.

A caster rotation sensor 2377 provides data indicative of one or more of a direction of orientation, angular velocity, linear speed of the caster, and so forth. For example, the caster rotation sensor 2377 may comprise an optical encoder and corresponding target that is able to determine that the caster transitioned from an angle of 0° at a first time to 49° at a second time.

The sensors 2354 may include a radar 2378. The radar 2378 may be used to provide information as to a distance, lateral position, and so forth, to an object.

The sensors 2354 may include a passive infrared (PIR) sensor 2364. The PIR 2364 sensor may be used to detect the presence of users, pets, hotspots, and so forth. For example, the PIR sensor 2364 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 390 to provide landmarks for the autonomous navigation component 2336. One or more touch sensors may be utilized to determine contact with a user or other objects.

The autonomously motile device 110 may include one or more output devices. A motor (not shown) may be used to provide linear or rotary motion. A light 358 may be used to emit photons. A speaker 2312 may be used to emit sound. A display 314 may comprise one or more of a liquid crystal display, light emitting diode display, electrophoretic display, cholesteric liquid crystal display, interferometric display, and so forth. The display 314 may be used to present visible information such as graphics, pictures, text, and so forth. In some implementations, the display 314 may comprise a touchscreen that combines a touch sensor and a display 314.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 120 as described herein, are illustrative, and may be located as a stand-alone device or may be included, in whole or in part, as a component of a larger device or system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by an autonomously motile robot, first image data representing images captured using a first camera of the autonomously motile robot during a first time period, the first image data including a first representation of an environment of the autonomously motile robot and at least a portion of a user;
   receiving first audio data corresponding to the first image data, the first audio data representing audio captured using a first microphone of the autonomously motile robot during the first time period, the first audio data representing speech of the user;
   determining first user position data indicating a first position of the autonomously motile robot with respect to the user during the first time period;
   determining that the first audio data represents the speech;
   processing, using the first user position data, the first audio data to generate second audio data, the first audio data having a first volume level and the second audio data having a second volume level that is higher than the first volume level;
   determining first sensor position data indicating a second position of the first camera relative to a first point on the autonomously motile robot during the first time period, the first sensor position data corresponding to a first height of the first camera during the first time period;

processing, using the first sensor position data, the first image data to generate second image data, the second image data including a second representation of the environment that is different than the first representation;

processing a first portion of the second audio data and a first portion of the second image data using a trained model to determine a first sentiment category corresponding to the first image data; and associating the first sentiment category with the first image data.

2. The computer-implemented method of claim 1, further comprising:

performing speech processing on the second audio data to generate speech processing output data indicating text corresponding to the speech;

detecting that a face of the user is represented in the second image data;

determining that the face is orientated towards the autonomously motile robot; and generating interaction data indicating that the user is looking at the autonomously motile robot, wherein processing the first portion of the second audio data and the first portion of the second image data further comprises:

processing the first portion of the second audio data, the first portion of the second image data, the speech processing output data, and the interaction data using the trained model to generate the first sentiment category.

3. The computer-implemented method of claim 1, further comprising, prior to receiving the first image data:

receiving third image data from the first camera, the first camera in a third position relative to the autonomously motile robot, the third position corresponding to a first direction;

determining a first location of the user relative to the autonomously motile robot;

determining that at least a portion of the user is not represented in the third image data; and moving the first camera to fourth position relative to the autonomously motile robot, the fourth position corresponding to a second direction.

4. The computer-implemented method of claim 1, further comprising, prior to receiving the first image data:

receiving, by the autonomously motile robot, third image data;

receiving, by the autonomously motile robot, third audio data corresponding to the third image data;

determining, using at least one of the third image data or the third audio data, second position data indicating a third position of the autonomously motile robot with respect to the user;

determining, using the second position data, a first distance between the autonomously motile robot and the user;

determining that the first distance is greater than a threshold value; and moving, by the autonomously motile robot, to the first position, wherein the first position is associated with a second distance that is less than the threshold value.

5. A computer-implemented method, the method comprising:

receiving, by an autonomously motile device, input data including (i) first image data representing at least one image captured using a first image sensor of the autonomously motile device during a first time period, the first image data representing a user and a first representation of an environment and (ii) first audio data associated with the user, the first audio data corresponding to the first image data;

determining first sensor position data indicating a first position of the first image sensor relative to the autonomously motile device during the first time period;

processing, using the first sensor position data, the first image data to generate second image data, the second image data including a second representation of the environment that is different than the first representation;

processing, by the autonomously motile device, the second image data using a trained model to generate output data; and determining, using the output data, a first sentiment category, the first sentiment category being associated with the input data.

6. The computer-implemented method of claim 5, further comprising:

receiving lexical data corresponding to the first audio data, wherein processing the second image data further comprises:

processing, by the autonomously motile device, the second image data and the lexical data using the trained model to generate the output data.

7. The computer-implemented method of claim 5, further comprising:

detecting a face of the user represented in the first image data;

determining that the face is orientated towards the autonomously motile device;

generating interaction data indicating that the user is looking at the autonomously motile device; and determining, based on the interaction data, that the first sentiment category indicates a sentiment of the user that is directed toward the autonomously motile device.

8. The computer-implemented method of claim 5, wherein receiving the input data further comprises:

determining a location of the autonomously motile device;

determining room characteristic data associated with the location;

generating, using at least one microphone of the autonomously motile device, second audio data;

determining that a portion of the second audio data represents speech, the portion of the second audio data having a first volume level; and processing, using the room characteristic data, the second audio data to generate the first audio data, a portion of the first audio data representing the speech and having a second volume level that is higher than the first volume level.

9. The computer-implemented method of claim 5, further comprising, prior to receiving the input data:

determining a first location of the user relative to the autonomously motile device;

receiving third image data from the first image sensor, the first image sensor in a second position relative to a first point on the autonomously motile device;

determining that at least a portion of the user is not represented in the third image data;

moving the first image sensor to a third position relative to the first point, the third position corresponding to the first location; and capturing, by the first image sensor, the first image data.

10. The computer-implemented method of claim 5, further comprising, prior to receiving the input data:
- receiving, by the autonomously motile device, third image data and second audio data corresponding to the third image data;
- determining, using at least one of the third image data or the second audio data, first position data indicating a second position of the autonomously motile device with respect to the user;
- determining, using the first position data, a first distance between the autonomously motile device and the user;
- determining that the first distance is greater than a threshold distance from the user; and
- moving, by the autonomously motile device, to a third position that is at or within the threshold distance.

11. The computer-implemented method of claim 5, further comprising, prior to receiving the input data:
- receiving, by the autonomously motile device, third image data and second audio data corresponding to the third image data;
- determining, using at least one of the third image data or the second audio data, first position data indicating a second position of the autonomously motile device with respect to the user;
- determining a first audio quality value associated with the second audio data;
- determining that the first audio quality value is less than a threshold audio quality; and
- moving, by the autonomously motile device, to a third position that is associated with second audio quality at or above the threshold audio quality.

12. The computer-implemented method of claim 5, wherein the first sensor position data corresponds to a first height of the first image sensor during the first time period.

13. The computer-implemented method of claim 5, wherein the first sensor position data corresponds to a first angle of the first image sensor during the first time period.

14. A system comprising:
- at least one processor; and
- memory including instructions operable to be executed by the at least one processor to cause the system to:
  - receive, by an autonomously motile device, input data including (i) first image data representing at least one image captured using a first image sensor of the autonomously motile device during a first time period, the first image data representing a user and a first representation of an environment and (ii) first audio data associated with the user, the first audio data corresponding to the first image data;
  - determine first sensor position data indicating a first position of the first image sensor relative to the autonomously motile device during the first time period;
  - process, using the first sensor position data, the first image data to generate second image data, the second image data including a second representation of the environment that is different than the first representation;
  - process, by the autonomously motile device, the second image data using a trained model to generate output data; and
  - determine, using the output data, a first sentiment category, the first sentiment category being associated with the input data.

15. The system of claim 14, wherein the memory further comprises instructions that, when executed by the at least one processor, further cause the system to:
- receive lexical data corresponding to the first audio data; and
- process, by the autonomously motile device, the second image data and the lexical data using the trained model to generate the output data.

16. The system of claim 14, wherein the memory further comprises instructions that, when executed by the at least one processor, further cause the system to:
- detect a face of the user represented in the first image data;
- determine that the face is oriented towards the autonomously motile device;
- generate interaction data indicating that the user is looking at the autonomously motile device; and
- determine, based on the interaction data, that the first sentiment category indicates a sentiment of the user that is directed toward the autonomously motile device.

17. The system of claim 14, wherein the memory further comprises instructions that, when executed by the at least one processor, further cause the system to:
- determine a location of the autonomously motile device;
- determine room characteristic data associated with the location;
- generate, using at least one microphone of the autonomously motile device, second audio data;
- determine that a portion of the second audio data represents speech, the portion of the second audio data having a first volume level; and
- process, using the room characteristic data, the second audio data to generate the first audio data, a portion of the first audio data representing the speech and having a second volume level that is higher than the first volume level.

18. The system of claim 14, wherein the memory further comprises instructions that, when executed by the at least one processor, further cause the system to, prior to receiving the input data:
- determine a first location of the user relative to the autonomously motile device;
- receive third image data from the first image sensor, the first image sensor in a second position relative to a first point on the autonomously motile device;
- determine that at least a portion of the user is not represented in the third image data;
- move the first image sensor to a third position relative to the first point, the third position corresponding to the first location; and
- capture, by the first image sensor, the first image data.

19. The system of claim 14, wherein the memory further comprises instructions that, when executed by the at least one processor, further cause the system to, prior to receiving the input data:
- receive, by the autonomously motile device, third image data and second audio data corresponding to the third image data;
- determine, using at least one of the third image data or the second audio data, first position data indicating a second position of the autonomously motile device with respect to the user;
- determine, using the first position data, a first distance between the autonomously motile device and the user;
- determine that the first distance is greater than a threshold distance from the user; and
- move, by the autonomously motile device, to a third position that is at or within the threshold distance.

20. The system of claim 14, wherein the memory further comprises instructions that, when executed by the at least one processor, further cause the system to, prior to receiving the input data:
- receive, by the autonomously motile device, third image data and second audio data corresponding to the third image data;
- determine, using at least one of the third image data or the second audio data, first position data indicating a second position of the autonomously motile device with respect to the user;
- determine a first audio quality value associated with the second audio data;
- determine that the first audio quality value is less than a threshold audio quality value; and
- move, by the autonomously motile device, to a third position that is associated with second audio quality value at or above the threshold audio quality value.

* * * * *